(12) United States Patent
Takizawa

(10) Patent No.: US 7,531,667 B2
(45) Date of Patent: *May 12, 2009

(54) TWO-PHOTON ABSORPTION DYE-CONTAINING MATERIAL, THREE-DIMENSIONAL REFRACTIVE INDEX MODULATION MATERIAL, THREE-DIMENSIONAL ABSORPTION INDEX MODULATION MATERIAL AND THREE-DIMENSIONAL OPTICAL RECORDING MATERIAL

(75) Inventor: Hiroo Takizawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 664 days.

This patent is subject to a terminal disclaimer.

(21) Appl. No.: 10/892,306

(22) Filed: Jul. 16, 2004

(65) Prior Publication Data
US 2005/0019711 A1    Jan. 27, 2005

(30) Foreign Application Priority Data
Jul. 18, 2003  (JP)  ........................... P.2003-276684
Jul. 6, 2004   (JP)  ........................... P.2004-199005

(51) Int. Cl.
*C09B 35/00* (2006.01)
*G01J 1/58* (2006.01)

(52) U.S. Cl. ............ 548/219; 430/270.15; 430/270.18; 430/270.2

(58) Field of Classification Search ................. 548/219; 430/270.15, 270.18, 270.2
See application file for complete search history.

(56) References Cited

U.S. PATENT DOCUMENTS

| | | | | |
|---|---|---|---|---|
| 4,607,005 A | * | 8/1986 | Urata | ........................ 430/550 |
| 5,268,862 A | * | 12/1993 | Rentzepis | ................... 365/151 |
| 5,770,737 A | * | 6/1998 | Reinhardt et al. | ........... 546/285 |
| 5,859,251 A | * | 1/1999 | Reinhardt et al. | ........... 546/255 |
| 5,936,878 A | * | 8/1999 | Arsenov et al. | ............. 365/111 |
| 6,300,502 B1 | * | 10/2001 | Kannan et al. | ............. 548/156 |
| 6,432,610 B1 | * | 8/2002 | Rentzepis et al. | ...... 430/270.15 |
| 6,566,529 B1 | * | 5/2003 | Kim et al. | ................... 548/145 |
| 7,001,708 B1 | * | 2/2006 | Belfield | ................... 430/280.1 |
| 7,022,840 B2 | * | 4/2006 | Kobuke et al. | ............. 540/145 |
| 2003/0162124 A1 | * | 8/2003 | Akiba et al. | ........... 430/270.18 |
| 2004/0191679 A1 | * | 9/2004 | Shibuya | .................. 430/270.1 |
| 2004/0245432 A1 | * | 12/2004 | Takizawa | ................. 250/208.1 |

FOREIGN PATENT DOCUMENTS

| | | |
|---|---|---|
| JP | 6-28672 A | 2/1994 |
| JP | 6-118306 A | 4/1994 |
| JP | 2000-512061 A | 9/2000 |
| JP | 2001-508221 A | 6/2001 |
| JP | 2001-522119 A | 11/2001 |
| JP | 2001-524245 A | 11/2001 |

OTHER PUBLICATIONS

Kasatani et al., Chemistry Letters, 8, 1633-1636, 1987.*
Belfield et al., Chemistry of Materials, 14(9), 3656-3662, 2002.*
Dvornikkov et al., IEEE Transactions on Components, Packaging, and Manufacturing Technology, Part A, 20(2), 203-212, 1997.*

* cited by examiner

*Primary Examiner*—Fiona T Powers
(74) *Attorney, Agent, or Firm*—Sughrue Mion, PLLC

(57) ABSTRACT

To provide a two-photon absorption dye-containing material having a great off-resonant two-photon absorption cross section and comprising a two-photon absorption dye capable of decoloring itself through off-resonant two-photon absorption, useful for a three-dimensional refractive index or absorption index modulation material, a three-dimensional optical recording medium, three-dimensional refractive index modulation method and recording and reproducing method for a three-dimensional optical recording medium a two-photon absorption dye-containing material comprising at least a two-photon absorption dye capable of decoloring itself through two-photon absorption.

10 Claims, No Drawings

TWO-PHOTON ABSORPTION DYE-CONTAINING MATERIAL, THREE-DIMENSIONAL REFRACTIVE INDEX MODULATION MATERIAL, THREE-DIMENSIONAL ABSORPTION INDEX MODULATION MATERIAL AND THREE-DIMENSIONAL OPTICAL RECORDING MATERIAL

BACKGROUND OF THE INVENTION

1. Field of the Invention

The present invention relates to a two-photon absorption dye-containing material which has a great off-resonant two-photon absorption cross section and contains an off-resonant two-photon absorption dye capable of decoloring itself, and to a three-dimensional refractive index or absorption index modulation material and a three-dimensional optical recording material which each utilize the aforesaid decoloring material.

2. Background Art

In general, nonlinear optical effects are nonlinear optical responses that are proportional to an applied photoelectric field raised to the second power, the third power or the power of higher order. Known second-order nonlinear optical effects proportional to the square of an applied photoelectric field include second-harmonic generation (SHG), photo-rectification, photorefractive effect, Pockels effect, parametric amplification, parametric oscillation, sum-frequency photomixing and difference-frequency photomixing. And known third-order nonlinear optical effects proportional to the cube of an applied photoelectric field include third-harmonic generation, optical Kerr effect, self-induced refractive index change and two-photon absorption.

A great many inorganic materials have so far been found functioning as nonlinear optical materials showing those nonlinear optical effects. However, inorganic substances are difficult to prepare the so-called molecular designs for optimization of the intended nonlinear optical characteristics and various physical properties required for device fabrication, so that it is very difficult to put them to practical use. On the other hand, organic compounds permit molecular designs for not only optimization of the intended nonlinear optical characteristics but also control of other various physical properties, so they have high practicability and attention is being given to them as promising nonlinear optical materials.

Of the nonlinear optical characteristics of organic compounds, the third-order nonlinear optical effects have attracted attention in recent years. Among all those effects, particular attention is focused on off-resonant two-photon absorption. The term "two-photon absorption" refers to a phenomenon that a compound is excited by simultaneous absorption of two photons, and the term "off-resonant two-photon absorption" indicates a case where two-photon absorption takes place in an energy region in which a compound has no (linear) absorption band. Incidentally, the term "two-photon absorption" as used in the following description signifies the off-resonant two-photon absorption unless otherwise specified.

Additionally, the probability of off-resonant two-photon absorption is proportional to the square of a photoelectric field applied (square characteristic of two-photon absorption). When a two-dimensional plane is irradiated with laser, therefore, absorption of two photons takes place only at the position of high electric field strength in the center of a laser spot, and it does not take place at all on the periphery area where electric field strength is weak. In a three-dimensional space, on the other hand, two-photon absorption takes place only in the region of great electric field strength in a focus of a lens by which laser beams are gathered, and it does not take place at all in the out-of-focus region because the electric field strength is weak in such a region. In contrast to linear absorption originating in excitation taking place at every position in proportion to the strength of a photoelectric field applied, off-resonant two-photon absorption is characterized in that excitation takes place at only one point in the interior of a space because this absorption has the square characteristic; as a result, remarkable enhancement of spatial resolution can be achieved.

For induction of off-resonant two-photon absorption, short-pulse laser of wavelengths in the near-infrared region where no absorption by a compound is present, which are longer than those in the region where (linear) absorption bands of the compound are present, is used in many general cases. As near-infrared rays in the so-called transparent region are used, exciting light can reach to the interior of a sample without undergoing absorption and scattering and excite one point inside the sample with an extremely high spatial resolution owing to the square characteristic of off-resonant two-photon absorption.

On the other hand, optical information recording media (optical disks) on which information is recordable only once by means of laser light have so far been known, and write-once CDs (the so-called CD-Rs) and write-once DVDs (the so-called DVD-Rs) have been brought to the commercial stage.

For instance, a typical structure of DVD-R is made up of a transparent disk-form substrate in which a pregroove narrowed to no more than one-half (0,74 to 0.8 μm) that of CD-R is cut for tracking laser light applied, a dye-containing recording layer, a light reflection layer generally provided on the recording layer, and further a protective layer as required.

Information is recorded on a DVD-R by irradiating the DVD-R with visible laser light (generally ranging in wavelength from 630 nm to 680 nm). Upon the irradiation, the irradiated area of the recording layer absorbs the light and causes a local rise in temperature to undergo a physical or chemical change (e.g., formation of pits), and by extension to a change in optical characteristics; as a result, a record of the change is kept therein. On the other hand, reading (reproducing or playback) of the recorded information is carried out also by irradiation with laser light of the same wavelength as the laser light used for recording has, and the information is played back by detecting reflectivity differences between the optical characteristic-changed regions of the recording layer (recorded regions) and the unchanged regions of the recording layer (unrecorded regions). As these reflectivity differences are based on the so-called refractive index modulation, greater differences in refractive index between recorded regions and unrecorded regions result in the greater reflectivity ratios of light, namely the greater S/N ratios favorable for playback.

Resent years have seen proliferations of communications network, such as the Internet, and Hi-Vision (HDTV, or High Definition Television). In addition, HDTV broadcasts are imminent, and there is the growing need for consumer-oriented large-capacity recording mediums on which at least 50 gigabytes, preferably at least 100 gigabytes, of image information can be simply recorded at low cost.

Further, for business uses, such as a computer backup use and a broadcast backup use, optical recording medium on which bulk information of the order of 1 terabytes or above can be recorded at high speed and low cost are in increasing demand.

However, two-dimensional optical recording mediums currently in use, such as DVD-Rs, have capacities of the order of at most 25 gigabytes from their physical principle even when the wavelengths of light for record and playback are shortened. Accordingly, those recording mediums have a situation in which it cannot be said that they promise to deliver recording capacities large enough to meet future requirements.

Under these circumstances, attention has focused suddenly on three-dimensional optical recording mediums as ultimate high-density, large-capacity recording mediums. By stacking tens or hundreds layers of record in the direction of the third dimension (layer thickness), the three-dimensional optical recording medium are intended for achievement of recording with ultra-high density and capacity increased by a factor of tens or hundreds, compared with those of two-dimensional optical recording mediums currently in use. For making the three-dimensional recording medium available, the ability to access arbitrary points in the direction of the third order (layer thickness) and write thereon is essential. As a means of access and write, the method of using a two-photon absorption material or the method of using holography (interference) can be adopted.

The three-dimensional optical recording medium using two-photon absorption materials enable the so-called bit recording multiplied by a factor of tens or hundreds on the basis of the physical principle mentioned above, and pave the road to higher-density recording. Therefore, it can be said that they are just the ultimate high-density, large-capacity optical recording medium.

For achieving three-dimensional optical recording by use of two-photon absorption materials, the methods in which fluorescent materials are used for record and playback and their fluorescence is utilized for reading (JP-T-2001-524245 to Levich, Eugene, Boris, et al. (the term "JP-T" as used herein means a published Japanese translation of a PCT patent application), and JP-T-2000-512061 to Pavel, Eugen, et al.) and the methods in which absorption by photochromic compounds or fluorescence from them is utilized for reading (JP-T-2001-522119 to Koroteev, Nicolai, I, et al., and JP-T-2001-508221 to Arsenov, Vladimir, et al.) have been proposed. Therein, however, no two-photon absorption materials are presented specifically, but the compound examples abstractly presented are two-photon absorption compounds having extremely low efficiencies of two-photon absorption. In addition, those methods have problems with nondestructive read, long-term storage of recordings and SIN ratios during playback, and so it cannot be said that they are practical for optical recording.

From the viewpoint of nondestructive read and long-term storage of recordings in particular, utilization of reflectivity (refractive index) changes caused in irreversible materials is desirable for playback. However, there have been no cases of specifically disclosing two-photon absorption materials having such capabilities.

The recording devices capable of three-dimensional recording by refractive index modulation, and the playback devices and the reading methods applied thereto, are disclosed in JP-A-6-28672 to Satoshi Kawada and Yoshimasa Kawada and JP-A-6-118306 to Satoshi Kawada, Yoshimasa Kawada, et al., but these documents have no description of a method of using a two-photon absorption dye-containing material.

SUMMARY OF THE INVENTION

If decoloring can be induced by excitation energy obtained from off-resonant two-photon absorption and, as a result thereof, refractive index or absorption index can be modulated in the laser-focused region alone, the refractive index modulation or the absorption index modulation can be performed in an extremely high spatial resolution at arbitrary positions in a three-dimensional space, and such a decoloring mechanism becomes applicable to three-dimensional optical recording medium regarded as the ultimate high-density recording medium. Further, the resultant recording medium permit nondestructive read and good keeping quality can be expected from them because they are irreversible materials. So they are eminently practical. In addition, such recording mediums are applicable to three-dimensional displays.

However, since the two-photon absorption materials available at present are low in two-photon absorption power, it is necessary to use lasers of very high power as light sources and the time required for recording is long.

In application to the three-dimensional optical recording medium in particular, it is required for achievement of high transfer rate that two-photon absorption dyes be structured so as to ensure high-sensitivity decoloring.

In addition, neither two-photon absorption dyes having the function of decoloring themselves by use of excitation energy derived from two-photon absorption, thereby achieving three-dimensional refractive index modulation or three-dimensional absorption index modulation, nor discoloring agents or their precursors usable in combination with those dyes have ever been disclosed, so that it is also required to structure such materials.

An object of the invention is to provide a two-photon absorption dye-containing material having a great off-resonant two-photon absorption cross section and comprising a two-photon absorption dye capable of decoloring itself through off-resonant two-photon absorption, and a three-dimensional refractive index or absorption index modulation material and a three-dimensional optical recording medium using the aforesaid two-photon absorption dye-containing material. And other objects of the invention are to provide a method for three-dimensional refractive index modulation and a recording and reproducing method for a three-dimensional optical recording medium.

As a result of our intensive studies, it has been found that the foregoing objects of the invention can be attained with materials and methods described below:

(1) A two-photon absorption dye-containing material, comprising at least a two-photon absorption dye capable of decoloring itself through two-photon absorption.

(2) A two-photon absorption dye-containing material, comprising at least a two-photon absorption dye that can be decolored by reaction in an excited state reached by two-photon absorption.

(3) A two-photon absorption dye-containing material as described in (1), further comprising a decoloring agent precursor (other than the two-photon absorption dye).

(4) A two-photon absorption dye-containing material, comprising a two-photon absorption dye and a decoloring agent precursor other than the two-photon absorption dye, wherein energy or electron transfer from the two-photon absorption dye to the decoloring agent precursor takes places when the dye moves into an excited state by two-photon absorption, thereby generating a decoloring agent from the decoloring agent precursor, and the decoloring agent decolors the two-photon absorption dye.

(5) A two-photon absorption dye-containing material as described in (4), wherein the decoloring agent is at least one selected from the group of radicals, acids, bases, nucleophilic agents, electrophilic agents and singlet-state oxygen.

(6) A two-photon absorption dye-containing material as described in any of (3) to (5), wherein the decoloring agent precursor is at least one substance selected from the group consisting of a radical generator, an acid generator, a base generator, a nucleophilic agent generator, an electrophilic agent generator and a triplet-state oxygen.

(7) A two-photon absorption dye-containing material as described in any of (3) to (6), wherein the decoloring agent precursor is at least one selected from the group of a radical generator, an acid generator and a base generator.

(8) A two-photon absorption dye-containing material as described in any of (3) to (7), wherein the decoloring agent precursor has a function as a radical generator, an acid generator or both and selected from 1) a radical generator containing a ketone, 2) a radical generator containing an organic peroxide, 3) a radical generator containing a bisimidazole, 4) a radical-and-acid generator containing a trihalomethyl-substituted triazine, 5) a radical-and-acid generator containing a diazonium salt, 6) a radical-and-acid generator containing a diaryliodonium salt, 7) a radical-and-acid generator containing a sulfonium salt, 8) a radical generator containing a borate, 9) a radical generator containing a diaryliodonium-organoboron complex, 10) a radical generator containing a sulfonium-organoboron complex, 11) a radical generator containing a organoboron complex which is a cationic two-photon absorption dye, 12) a radical generator containing an onium salt complex which is an anionic two-photon absorption dye, 13) a radical-and-acid generator containing a metal-arene complex or 14) an acid generator containing a sulfonate, wherein the radical generators 11) and 12) act as two-photon absorption dyes also.

(9) A two-photon absorption dye-containing material as described in any of (3) to (8), wherein the decoloring agent precursor is a radical generator selected from 1) a ketone radical generator, 2) a radical generator containing an organic peroxide, 3) a radical generator containing a bisimidazole, 4) a radical generator containing a trihalomethyl-substituted triazine, 5) a radical generator containing a diazonium salt, 6) a radical generator containing a diaryliodonium salt, 7) a radical generator containing a sulfonium salt, 8) a radical generator containing a borate, 9) a radical generator containing a diaryliodonium-organoboron complex, 10) a radical generator containing a sulfonium-organoboron complex, a radical generator containing a organoboron complex which is a cationic two-photon absorption dye, 12) a radical generator containing an onium salt complex which is an anionic two-photon absorption dye or 13) a radical generator containing a metal-arene complex, wherein the radical generators 11) and 12) act as two-photon absorption dyes also.

(10) A two-photon absorption dye-containing material as described in any of (3) to (8), wherein the decoloring agent precursor is an acid generator selected from 4) a acid generator containing a trihalomethyl-substituted triazine, 5) a acid generator containing a diazonium salt, 6) a acid generator containing a diaryliodonium salt, 7) a acid generator containing a sulfonium salt, 13) a acid generator containing a metal-arene complex or 14) a acid generator containing a sulfonate.

(11) A two-photon absorption dye-containing material as described in any of (3) to (8), wherein the decoloring agent precursor has functions both as a radical generator and as an acid generator and is selected from 4) a radical-and-acid generator containing a trihalomethyl-substituted triazine, 5) a radical-and-acid generator containing a diazonium salt, 6) a radical-and-acid generator containing a diaryliodonium salt, 7) a radical-and-acid generator containing a sulfonium salt or 13) a radical-and-acid generator containing a metal-arene complex.

(12) A two-photon absorption dye-containing material as described in any of (3) to (7), wherein the decoloring agent precursor is a base generator which is a compound represented by the following formula (21-1), (21-2), (21-3) or (21-4):

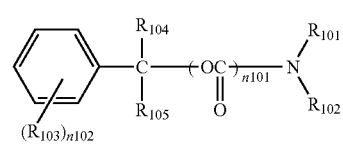

Formula (21-1)

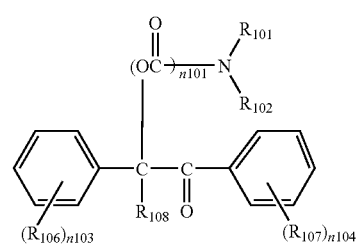

Formula (21-2)

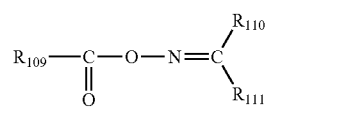

Formula (21-3)

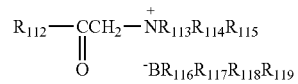

Formula (21-4)

wherein $R_{101}$, $R_{102}$, $R_{113}$, $R_{114}$ and $R_{115}$ each independently represents a hydrogen atom, an alkyl group, an alkenyl group, a cycloalkyl group, an aryl group or a heterocyclic group, or $R_{101}$ and $R_{102}$ combine to form a ring, or $R_{113}$, $R_{114}$ and $R_{115}$ combine to form a ring; $R_{103}$, $R_{106}$, $R_{107}$ and $R_{109}$ each independently represents a substituent; $R_{104}$, $R_{105}$, $R_{108}$, $R_{110}$ and $R_{111}$ each independently represents a hydrogen atom or a substituent, or $R_{110}$ and $R_{111}$ combine to form a ring; $R_{116}$, $R_{117}$, $R_{118}$ and $R_{119}$ each independently represents an alkyl group or an aryl group; $R_{112}$ represents an aryl group or a heterocyclic group; n101 represents 0 or 1; and n102, n103 and n104 each independently represents an integer of 0 to 5.

(13) A two-photon absorption dye-containing material as described in (12), with the n101 in formulae (21-1) and (21-2) each being 1.

(14) A two-photon absorption dye-containing material as described in (12) or (13), with the $R_{101}$ and the $R_{102}$ in each of formulae (21-1) and (21-2) representing a hydrogen atom, an alkyl group or a cycloalkyl group independently of each other.

(15) A two-photon absorption dye-containing material as described in any of (12) to (14), with the $R_{104}$ and the $R_{105}$ in formula (21-1) representing a hydrogen atom, a methyl group or a 2-nitrophenyl group independently of each other.

(16) A two-photon absorption dye-containing material as described in any of (12) to (15), with the $(R_{103})_{n102}$ in formula (21-1) being a nitro group situated in the 2-position of the benzene ring, nitro groups situated in the 2- and 6-positions of the benzene ring or alkoxy groups situated in the 3- and 5-positions of the benzene ring.

(17) A two-photon absorption dye-containing material as described in any of (12) to (14), with the $R_{108}$ in formula (21-2) being a hydrogen atom or an aryl group.

(18) A two-photon absorption dye-containing material as described in any of (12) to (14) or (17), with the $(R_{106})_{n103}$ being alkoxy groups situated in the 3- and 5-positions of the benzene ring.

(19) A two-photon absorption dye-containing material as described in (12), with the $R_{109}$ in formula (21-3) being an alkyl group, an aryl group, a benzyl group or an amino group.

(20) A two-photon absorption dye-containing material as described in (12) or (19), with the $R_{110}$ and the $R_{111}$ in formula (21-3) being an alkyl group or an aryl group independently of each other.

(21) A two-photon absorption dye-containing material as described in (12), with the $R_{112}$ in formula (21-4) being an aryl or heterocyclic group illustrated below:

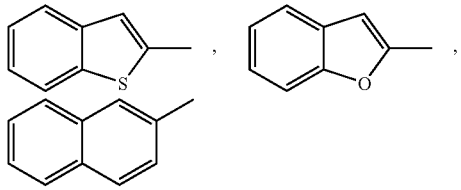

(22) A two-photon absorption dye-containing material as described in (12) or (21), with the $R_{113}$, the $R_{114}$ and the $R_{115}$ in formula (21-4) being alkyl groups.

(23) A two-photon absorption dye-containing material as described in (12), (21) or (22), with the $R_{116}$, the $R_{117}$ and the $R_{118}$ in formula (21-4) being phenyl groups and the $R_{119}$ in formula (21-4) being an n-butyl group or a phenyl group.

(24) A two-photon absorption dye-containing material as described in any of (12) to (16), (19) and (20), wherein the base generator is a photo-base generator represented by the formula (21-1) or (21-3).

(25) A two-photon absorption dye-containing material as described in any of (12) to (16) and (24), wherein the base generator is a photo-base generator represented by formula (21-1).

(26) A two-photon absorption dye-containing material as described in any of (1) to (25), wherein the two-photon absorption dye is a methine dye or a phthalocyanine dye.

(27) A two-photon absorption dye-containing material as described in any of (1) to (26), wherein the two-photon absorption dye is a cyanine dye, a merocyanine dye, an oxonol dye, a phthalocyanine dye or a compound represented by the following

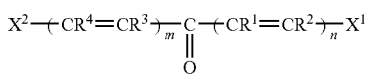

wherein $R^1$, $R^2$, $R^3$ and $R^4$ each represents a hydrogen atom or a substituent independently, or some of $R^1$, $R^2$, $R^3$ and $R^4$ combine to form a ring; n and m each independently represents an integer of 0 to 4, provided that at least one of m and n is not zero, and when m is 2 or more, $R^3$s and $R^4$s are independently the same or different, and when n is 2 or more, $R^1$s and $R^2$s are independently the same or different; and $X^1$ and $X^2$ each independently represents an aryl group, a heterocyclic group or a group represented by the following formula (2):

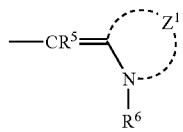

wherein $R^5$ represents a hydrogen atom or a substituent, $R^6$ represents a hydrogen atom, an alkyl group, an alkenyl group, an aryl group or a heterocyclic group, and $Z^1$ represents atoms forming a 5- or 6-membered ring.

(28) A two-photon absorption dye-containing material as described in (27), with the $R^1$ and the $R^3$ in the compound represented by formula (1) combining with each other to form a ring.

(29) A two-photon absorption dye-containing material as described in (27) or (28), with the $R^1$ and the $R^3$ in the compound represented by formula (1) combining to form a cyclopentanone ring together with the carbonyl group.

(30) A two-photon absorption dye-containing material as described in any of (27) to (29), with either the $X^1$ or the $X^2$, preferably both, in the compound represented by formula (1) being represented by formula (2).

(31) A two-photon absorption dye-containing material as described in any of (27) to (30), with the compound represented by formula (1) containing as either the $X^1$ or the $X^2$, preferably both, a group represented by formula (2), as $R^6$ an alkyl group, and as a ring formed by $Z^1$ an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, a thiadiazole ring or a quinoline ring.

(32) A two-photon absorption dye-containing material as described in any of (27) to (31), with the compound represented by formula (1) containing as either the $X^1$ or the $X^2$, preferably both, a group represented by formula (2), as $R^6$ an alkyl group, and as a ring formed by $Z^1$ an indolenine ring, an azaindolenine ring, abenzothiazole ring, abenzoxazole ring or a benzimidazole ring.

(33) A two-photon absorption dye-containing materialas described in (27), with the cyanine dye being represented by the following formula (3), with the merocyanine dye being represented by the following formula (4) and with the oxonol dye being represented by the following formula (5):

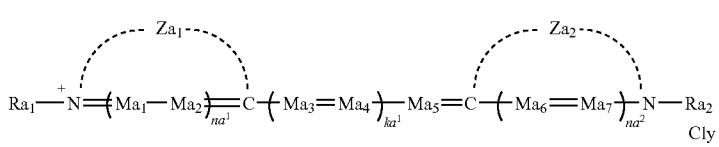

Formula (3)

-continued

Formula (4)

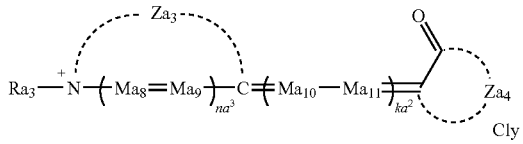

Formula (5)

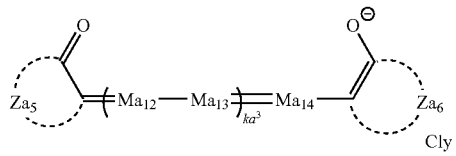

wherein $Z_{a1}$, $Z_{a2}$ and $Z_{a3}$ each represents atoms forming a 5- or 6-membered nitrogen-containing hetero ring; Za4, Za5 and Za6 each represents atoms forming a 5-or 6-membered ring; $R_{a1}$, $R_{a2}$ and $R_{a3}$ each independently represents a hydrogen atom, an alkyl group, an alkenyl group, an aryl group or a heterocyclic group;

$M_{a1}$ to $M_{a14}$ each independently represents a methine group, which may have a substituent or may be combined with another methine group to form a ring; $na^1$, $na^2$ and $na^3$ each represents 0 or 1; $ka^1$ and $ka^3$ each represents an integer of 0 to 3, wherein $Ma_3$s and $Ma_4$s is the same or different when $ka^1$ is 2 or 3 and $Ma_{12}$s and $Ma_{13}$s is the same or different when $ka^3$ is 2 or 3; $ka^2$ represents an integer of 0 to 8, wherein $Ma_{10}$s and $Ma_{11}$s is the same or different when $ka^2$ is 2 or above;

CI represents a charge-neutralizing ion; and y represents a number of the ions required for charge neutralization.

(34) A two-photon absorption dye-containing material as described in any of (1) to (33), wherein the two-photon absorption dye has at least one group capable of forming a hydrogen bond.

(35) A two-photon absorption dye-containing material as described in (34), wherein the group capable of forming a hydrogen bond is —COOH group or —CONH₂ group.

(36) A two-photon absorption dye-containing material as described in any of (1) to (35), wherein the two-photon absorption dye is decolored in a photon mode without undergoing thermal decomposition reaction.

(37) A three-dimensional refractive index modulation material, comprising a two-photon absorption dye-containing material as described in any of (1) to (36).

(38) A three-dimensional absorption index modulation material, comprising a two-photon absorption dye-containing material as described in any of (1) to (36).

(39) A three-dimensional optical recording material, comprising a two-photon absorption dye-containing material as described in any of (1) to (36).

(40) A write-once three-dimensional optical recording medium, comprising a two-photon absorption dye-containing material as described in any of (1) to (36).

(41) A three-dimensional display, comprising a two-photon absorption dye-containing material as described in any of (1) to (36).

(42) A method for three-dimensional refractive index modulation, comprising decoloring a two-photon absorption dye capable of decoloring itself through two-photon absorption, wherein the two-photon absorption is caused by irradiating the dye with a laser light, and the laser light has a wavelength free of linear absorption for the dye and a longer wavelength than a linear absorption band of the dye.

(43) A three-dimensional optical recording method, comprising decoloring a two-photon absorption dye capable of decoloring itself through two-photon absorption, wherein the two-photon absorption is caused in a region where a laser light is focused, and the laser light has a wavelength free of linear absorption for the dye and a longer wavelength than a linear absorption band of the dye, so as to make a difference in a refractive index between the region (recorded region) and a region where the laser light is not focused (unrecorded or undecolored region).

(44) A three-dimensional optical recording method, comprising decoloring a two-photon absorption dye capable of decoloring itself through two-photon absorption, wherein the two-photon absorption is caused in a region where a laser light is focused, and the laser light has a wavelength free of linear absorption for the dye and a longer wavelength than a linear absorption band of the dye, so as to make a difference in a absoption index between the region (recorded region) and a region where the laser light is not focused (unrecorded or undecolored region).

(45) A three-dimensional optical reproducing method, comprising irradiating a three-dimensional optical recording medium recorded by a recording method described in (43); and detecting a difference in reflectivity between a recorded region and an unrecorded region.

(46) A three-dimensional optical reproducing method, comprising irradiating a three-dimensional optical recording medium recorded by a recording method described in (43) with the same laser light as used in recording, irrespective of whether the power and the pulse shape of the laser light is the same or different from the laser light as used in recording; and detecting a difference in reflectivity or transmittance between a recorded region and an unrecorded region.

(47) A three-dimensional optical reproducing method, comprising irradiating a three-dimensional optical recording medium recorded by a recording method described in (43); and detecting a difference in absorption index between a recorded region and an unrecorded region.

(48) A three-dimensional optical reproducing method, comprising: irradiating a three-dimensional optical recording medium pre-recorded by a recording method described in (43) with the same laser light as used in recording, irrespective of whether the power and the pulse shape of the laser light is the same or different from the laser light as used in recording; and detecting a difference in absorption index between a recorded region and an unrecorded region.

By use of a two-photon absorption dye-containing material according to the invention, differences in refractive index or absorption index can be caused between laser-focused regions (recorded regions) and out-of-focus regions (unrecorded regions) to achieve three-dimensional modulation of refractive index or absorption index. Therefore, the present two-photon absorption dye-containing material is applicable to a three-dimensional optical recording medium and a three-dimensional display.

DETAILED DESCRIPTION OF THE INVENTION

The present two-photon absorption dye-containing material characterized by decoloring of a two-photon absorption dye itself through two-photon absorption is illustrated below.

The present two-photon absorption dye-containing material has at least a two-photon absorption dye.

As a preferred embodiment of the invention, there is a two-photon absorption dye-containing material characterized in that the material has at least a two-photon absorption dye and the two-photon absorption dye is decolored by reaction in an excited state reached by two-photon absorption.

The reaction therein maybe a self-decomposition reaction or a reaction with another component, specifically including oxidation reaction, reduction reaction, electrophilic reaction, nucleophilic reaction, radical reaction, hydrolysis and solvent addition reaction.

As another preferred embodiment of the invention, there is a two-photon absorption dye-containing material containing at least a two-photon absorption dye and a decoloring agent precursor other than the two-photon absorption dye, characterized in that energy transfer or electron transfer from the two-photon absorption dye to the decoloring agent precursor takes place when the dye moves into an excited state by two-photon absorption, thereby generating a decoloring agent from the decoloring agent precursor, and the decoloring agent decolors the two-photon absorption dye.

The energy transfer mechanism may be Förster mechanism, namely a mechanism of energy transfer taking place from a singlet excited state resulting from absorption of two photons by the two-photon absorption dye, or Dexter mechanism, namely a mechanism of energy transfer taking place from a triplet excited state of the two-photon absorption dye.

For inducing the foregoing energy transfer with a large probability, it is desirable that the excitation energy of the two-photon absorption dye be greater than that of the decoloring agent precursor.

On the other hand, the electron transfer mechanism may be a mechanism of electron transfer taking place from a singlet excited state resulting from absorption of two photons by the two-photon absorption dye, or a mechanism of electron transfer taking place from a triplet excited state of the two-photon absorption dye.

In addition, the two-photon absorption dye in an excited state may donate an electron to the decoloring agent precursor, or may accept an electron from the decoloring agent precursor. For inducing electron transfer with a large probability in the case where the two-photon absorption dye in an excited state donates an electron, it is desirable that the energy level of an orbital in which an excited electron of the excited two-photon absorption dye is present, or LUMO (Lowest Unoccupied Molecular Orbital), be higher than that of the LUMO of the decoloring agent precursor.

For inducing electron transfer with a large probability in the case where the two-photon absorption dye in an excited state accepts an electron, it is desirable that the energy level of an orbital in which a hole of the excited two-photon absorption dye is present, or HOMO (Highest Occupied Molecular Orbital), be lower than that of the HOMO of the decoloring agent precursor.

In addition to a two-photon absorption dye and a decoloring agent precursor, additives including a high molecular compound as a binder, a polymerizable monomer, a polymerizable oligomer, a cross-linking agent, a thermal stabilizer, a plasticizer and a solvent can be preferably used in the present two-photon absorption dye-containing material on an as needed basis.

It is appropriate that each decolored spot formed in the present two-photon absorption dye-containing material have its diameter within the range of 10 nm to 100 μm, preferably 50 nm to 5 μm, far preferably 50 nm to 2 μm.

In order to enable the present material to be played back by changes in reflection, scattering or diffraction of light, thereby making the present material function as an optical material, it is further appropriate to adjust the diameter of each decolored spot to 1/20 to 20 times, preferably 1/10 to 10 times, particularly preferably 1/5 to 5 times, the wavelength of irradiation light used.

From the viewpoint of increasing sensitivity in particular, it is advantageous that the decoloring of the present two-photon absorption dye-containing material by two-photon absorption takes place without undergoing thermal decomposition, namely in a photon-mode.

In other words, it is appropriate particularly in view of the speeds of writing on and transferring from the recording material that the two-photon absorption dye is decolored by a mechanism different from methods practically applied to available CD-Rs and DVD-Rs.

In the first place, two-photon absorption dyes in the present two-photon absorption dye discoloring materials are illustrated below.

Two-photon absorption dyes applicable to the invention are compounds capable of causing off-resonant two-photon absorption (a phenomenon in which each compound is excited by simultaneous absorption of two photons in an energy region where the compound has no linear absorption bands).

In applying the present two-photon absorption dye-containing materials to three-dimensional optical recording medium and three-dimensional displays in particular, two-photon absorption dyes capable of making two-photon absorption at high sensitivity and moving into excited states with efficiency are required for achieving a high transfer (recording) rate.

The two-photon absorption probability of a two-photon absorption dye is defined as two-photon absorption cross section δ expressed in GMs ($1 GM = 1 \times 10^{-50}$ $cm^4$ s/photon). Viewed from improvement in writing rate and reduction in size and price of a laser device, it is appropriate that the two-photon absorption dyes applied to the present two-photon absorption dye-containing materials have two-photon absorption cross section δ of at 100 GMs or more, preferably 1,000 GMs or more, far preferably 5,000 GMs or more, particularly preferably 10,000 GMs or more.

The present two-photon absorption dyes are preferably organic compounds.

When a specified moiety is termed "a group" in the invention, the term "group" means that the group may have no substituent or at least one substituent (up to the greatest possible number of substituents) unless otherwise noted. For instance, the term "alkyl group" is intended to include unsubstituted and substituted alkyl groups. And substituents usable for the compounds relating to the invention may be any substituents, irrespective of whether they further have substituents or not.

When a specified moiety is termed "a ring" or "a group" contains "a ring" in the invention, the ring may be a single ring or a condensed ring, or may have at least one or no substituent.

For instance, "an aryl group" may be a phenyl group or a naphthyl group, and the phenyl group may be a substituted phenyl group.

The term "dyes" as used herein is a generic name for compounds having part of their individual absorption in an ultraviolet region (preferably a region of 200 to 400 nm), the visible region (of 400 to 700 nm) or a near infrared region (preferably a region of 700 to 2,000 nm), preferably for compounds having part of their individual absorption in the visible region.

Two-photon absorption dyes used in the invention may be any dyes, with examples including cyanine dyes, hemicyanine dyes, streptocyanine dyes, styryl dyes, pyrylium dyes, merocyanine dyes, trinuclear merocyanine dyes, tetranuclear merocyanine dyes, rhodacyanine dyes, complex cyanine dyes, complex merocyanine dyes, allopolar dyes, arylidene dyes, oxonol dyes, hemioxonoldyes, squaryliumdyes, croconiumdyes, azuleniuadyes, coumarin dyes, ketocoumarin dyes, styrylcoumarin dyes, pyran dyes, anthraquinone dyes, quinone dyes, triphenylmethane dyes, diphenylmethane dyes, xanthene dyes, thioxanthene dyes, phenothiazine dyes, phenoxazine dyes, phenazine dyes, azo dyes, azomethine dyes, fluorenone dyes, diraylethene dyes, spiropyran dyes, fulgide dyes, perylene dyes, phthaloperylene dyes, indigoid dyes, polyene dyes, acridine dyes, acridinone dyes, diphenylamine dyes, quinacridone dyes, quinophthalone dyes, porphyrin dyes, azaporphyrin dyes, chlorophyll dyes, phthalocyanine dyes, aromatic condensed-ring dyes, styrene dyes, metallocene dyes, metal complex dyes, phenylenevinylene dyes and stilbazolium dyes. Of these dyes, the dyes used to advantage include cyanine dyes, hemicyanine dyes, streptodyanine dyes, styryl dyes, pyrylium dyes, merocyanine dyes, trinuclear merocyanine dyes, tetranuclear merocyanine dyes, rhodacyanine dyes, complexcyaninedyes, complexmerocyaninedyes, allopolar dyes, arylidene dyes, oxonol dyes, hemioxonol dyes, squarylium dyes, croconium dyes, azulenium dyes, coumarin dyes, ketocoumarin dyes, styrylcoumarin dyes, pyran dyes, anthraquinone dyes, quinone dyes, triphenylmethane dyes, diphenylmethane dyes, thioxanthene dyes, phenothiazine dyes, phenoxazine dyes, phenazine dyes, arylidene dyes, oxonol dyes, squaryliumdyes, ketocoumarin dyes, styrylcoumarin dyes, pyran dyes, thioxanthene dyes, phenothiazine dyes, phenoxazine dyes, phenazine dyes, azo dyes, polyene dyes, azaporphyrin dyes, chlorophyll dyes, phthalocyanine dyes and metal complex dyes; particularlypreferably include cyanine dyes, merocyanine dyes, arylidene dyes, oxonol dyes, squarylium dyes, azo dyes and phthalocyanine dyes. Above all, cyanine dyes, merocyanine dyes and oxonol dyes (which are included in preferred methine dyes), notably cyanine dyes, are used to greater advantage.

Details of those dyes are described, e.g., in F. M. Harmer, *Heterocyclic Compounds—Cyanine Dyes and Related Compounds*, John Wiley & Sons, New York, London (1964); D. M. Sturmer, *Heterocyclic Compounds—Special Topics in Heterocyclic Chemistry*, chap. 18, par. 14, pp. 482-515, John Wiley & Sons, New York, London (1977); and *Rodd's Chemistry of Carbon Compounds*, 2nd. Ed., vol. 4, part B, chap. 15, pp. 369-422, Elsevier Science Publishing Company Inc. (1977).

Examples of cyanine dyes, merocyanine dyes and oxonol dyes include the dyes described in F. M. Harmer, *Heterocyclic Compounds—Cyanine Dyes and Related Compounds*, John Wiley & Sons, New York, London (1964).

As formulae of cyanine dyes and merocyanine dyes, the formulae (XI) and (XII) illustrated in U.S. Pat. No. 5,340,694, pages 21 and 22, are suitable. Therein, however, n12 and n15 are not limited to specified ranges, but they may be integers of no smaller than 0 (although they are preferably integers of 0 to 4).

When the present two-photon absorption dye is a cyanine dye, it is preferably represented by the following formula (3):

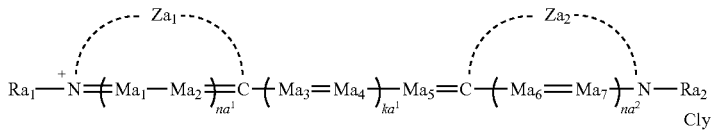

azo dyes, azomethine dyes, perylene dyes, phthaloperylene dyes, indigoid dyes, polyene dyes, acridine dyes, acridinone dyes, diphenylamine dyes, quinacridone dyes, quinophthalone dyes, porphyrin dyes, azaporphyrin dyes, chlorophyll dyes, phthalocyanine dyes, aromatic condensed-ring dyes, styrene dyes, metallocene dyes, metal complex dyes and stilbazolium dyes; preferably include cyanine dyes, hemicyanine dyes, streptodyanine dyes, styryl dyes, pyrylium dyes, merocyanine dyes, trinuclear merocyanine dyes, tetranuclear merocyanine dyes, rhodacyanine dyes, complex cyanine dyes, complex merocyanine dyes, allopolar dyes, arylidene dyes, oxonol dyes, hemioxonol dyes, squarylium dyes, croconium dyes, azulenium dyes, ketocoumarin dyes, styrylcoumarin dyes, pyran dyes, anthraquinone dyes, quinone dyes, triphenylmethane dyes, diphenylmethane dyes, thioxanthene dyes, phenothiazine dyes, phenoxazine dyes, phenazinedyes, azodyes, azomethinedyes, indigoiddyes, polyene dyes, acridine dyes, acridinone dyes, diphenylamine dyes, quinacridone dyes, quinophthalone dyes, azaporphyrin dyes, chlorophyll dyes, phthalocyanine dyes, aromatic condensed-ring dyes, metallocene dyes and metal complex dyes; far preferably include cyanine dyes, hemicyanine dyes, streptodyanine dyes, styryl dyes, pyrylium dyes, merocyanine dyes, In formula (3), $Za_1$ and $Za_2$ independently represent atoms forming a 5- or 6-membered nitrogen-containing heterocyclic ring. Suitable examples of the 5- or 6-membered nitrogen-containing heterocyclic ring completed in the above formula include oxazole nuclei containing 3 to 25 carbon atoms (hereinafter expressed as "3-25C"), such as 2-3-methyloxazolyl, 2-3-ethyloxazolyl, 2-3,4-diethyloxazolyl, 2-3-methylbenzoxazolyl, 2-3-ethylbenzoxazolyl, 2-3-sulfoethylbenzoxazolyl, 2-3-sulfopropylbenzoxazolyl, 2-3-methylthioethylbenzoxazolyl, 2-3-methoxyethylbenzoxazolyl, 2-3-sultobutylbenzoxazolyl, 2-3-methyl-β-naphthoxazolyl, 2-3-methyl-α-naphtoxazolyl, 2-3-sulfopropyl-β-naphthoxazolyl, 2-3-(3-naphthoxyethyl)benzoxazolyl, 2-3,5-dimethylbenzoxazolyl, 2-6-chloro-3-methylbenzoxazolyl, 2-5-bromo-3-methylbenzoxazolyl, 2-3-ethyl-5-methoxybenzoxazolyl, 2-5-phenyl-3-sulfopropylbenzoxazolyl, 2-5-(4-bromophenyl)-3-sulfobutylbenzoxazolyl, 2-3-methyl-5,6-dimethylthiobenzoxazolyl, 2-3-sulfopropyloxazolyl, 2-3-sulfopropyl-α-naphthoxazolyl, 2-3-ethyl-α-naphthoxazolyl, 2-5-chloro-3-ethyl-α-naphthoxazolyl, 2-5-chloro-3-ethylbenzoxazolyl, 2-5-chloro-3-sulfopropylbenzoxazolyl, 2-5,6-dichloro-3-sulfopropylbenzoxazolyl, 2-5-bromo-3- sulfopropylbenzoxazolyl, 2-3-ethyl-5-phenylbenzoxazolyl, 2-5-(1-pyrrolyl)-3-sulfopropylbenzoxazolyl, 2-5,6-dimethyl-3-sulfopropylbenzoxazolyl and 2-3-ethyl-5-sulfopropylbenzoxazolyl; 3-25C thiazole nuclei, such as 2-3-methylthiazolyl, 2-3-ethylthiazolyl, 2-3-sulfopropylthiazolyl, 2-3-sulfobutylthiazolyl, 2-3,4-dimethylthiazolyl, 2-3,4,4-trimethylthiazolyl, 2-3-carboxyethylthiazolyl, 2-3-methylbenzothiazolyl, 2-3-ethylbenzothiazolyl, 2-3-butylbenzothiazolyl, 2-3-sulfopropylbenzothiazolyl, 2-3-sulfobutylbenzothiazolyl, 2-3-methyl-β-naphthothiazolyl, 2-3-sulfopropyl-γ-naphthothiazolyl, 2-3-(1-naphthoxyethyl)benzothiazolyl, 2-3,5-dimethylbenzothiazolyl, 2-6-chloro-3-methylbenzothiazolyl, 2-6-iodo-3-ethylbenzothiazolyl, 2-5-bromo-3-methylbenzothiazolyl, 2-3-ethyl-5-methoxybenzothiazolyl, 2-5-phenyl-3-sulfopropylbenzothiazolyl, 2-5-(4-bromophenyl)-3-sulfobutylbenzothiazolyl, 2-3-methyl-5,6-dimethylbenzothiazolyl, 2-5-chloro-3-ethylbenzothiazolyl, 2-5-chloro-3-sulfopropylbenzothiazolyl, and 2-3-ethyl-5-iodobenzothiazolyl; 3-25C imidazole nuclei, such as 2-1,3-diethylimidazolyl, 2-1,3-dimethylimidazolyl, 2-1-methylbenzimidazolyl, 2-1,3,4-triethylitidazolyl, 2-1,3-diethylbenzimidazolyl, 2-1,3,5-trimethylbenzimidazolyl, 2-6-chloro-1,3-dimethylbenzimidazolyl, 2-5,6-dichloro-1,3-diethylbenzimidazolyl 2-1,3-disulfopropyl-5-cyano-6-chlorobenzimidazolyl, 2-5,6-dichloro-3-ethyl-1-sulfopropylbenzimidazolyl, 2-5-chloro-6-cyano-1,3-diethylbenzimidazolyl, and 2-5-chloro-1,3-diethyl-6-trifluoromethylbenzimidazolyl; 10-30C indolenine nuclei, such as 3,3-dimethyl-1-pentylindolenine, 3,3-dimethyl-1-sulfopropylindolenine, 5-carboxy-1,3,3-trimethylindolenine, 5-carbamoyl-1,3,3-trimethylindolenine, and 1,3,3-trimethyl-4,5-benzindolenine; 9-25C quinoline nuclei, such as 2-1-methylquinolyl, 2-1-ethylquinolyl, 2-1-methyl-6-chloroquinolyl, 2-1,3-diethylquinolyl, 2-1-methyl-6-methylthioquinolyl, 2-1-sulfopropylquinolyl, 4-1-methylquinolyl, 4-1-pentylquinolyl, 4-1-sulfoethylquinolyl, 4-1-methyl-7-chloroquinolyl, 4-1,8-diethylquinolyl, 4-1-methyl-6-methylthioquinolyl and 4-1-sulfopropylquinolyl; 3-25C selenazole nuclei, such as 2-3-methylbenzoselenazolyl; and 5-25C pyridine nuclei, such as 2-pyridyl. In addition to these nuclei, the 5- or 6-membered nitrogen-containing heterocyclic rings formed may further include thiazoline nuclei, oxazoline nuclei, selenazoline nuclei, tellurazoline nuclei, tellurazole nuclei, benzotellurazole nuclei, imidazoline nuclei, imidazo[4,5-quinoxaline] nuclei, oxadiazole nuclei, thiadiazole nuclei, tetrazole nuclei and pyrimidine nuclei.

Those nuclei may have substituents. Suitable examples of such substituents include alkyl groups (preferably containing 1 to 20 carbon atoms, such as methyl, ethyl, n-propyl, isopropyl, n-butyl, n-pentyl, benzyl, 3-sulfopropyl, 4-sulfobutyl, carboxymethyl and 5-carboxypentyl), alkenyl groups (preferably containing 2 to 20 carbon atoms, such as vinyl, allyl, 2-butenyl and 1,3-butadienyl), cycloalkyl groups (preferably containing 3 to 20 carbon atoms, such as cyclopentyl and cyclohexyl), aryl groups (preferably containing 6 to 20 carbon atoms, such as phenyl, 2-chlorophenyl, 4-methoxyphenyl, 3-methylphenyl and 1-naphthyl), heterocyclic groups (preferably containing 1 to 20 carbon atoms, such as pyridyl, thienyl, furyl, thiazolyl, imidazolyl, pyrazolyl, pyrrolidino, piperidino andmorpholino), alkynyl groups (preferably containing 2 to 20 carbon atoms, such as ethynyl, 2-propynyl, 1,3-butadiynyl and 2-phenylethynyl), halogen atoms (e.g., F, Cl, Br, I), amino groups (preferably containing 0 to 20 carbon atoms, such as amino, dimethylamino, diethylamino, dibutylamino and anilino), a cyano group, a nitro group, a hydroxyl group, a mercapto group, a carboxyl group, a sulfo group, a phospho group, acyl groups (preferably containing 1 to 20 carbon atoms, such as acetyl, benzoyl, salicyloyl and pivaloyl), alkoxy groups (preferably containing 1 to 20 carbon atoms, such as methoxy, butoxy and cyclohexyloxy), aryloxy groups (preferably containing 6 to 26 carbon atoms, such as phenoxy and 1-naphthoxy), alkylthio groups (preferably containing 1 to 20 carbon atoms, such as methylthio and ethylthio), arylthio groups (preferably containing 6 to 20 carbon atoms, such as phenylthio and 4-chlorophenylthio), alkylsulfonyl groups (preferably containing 1 to 20 carbon atoms, such as methanesulfonyl and butanesulfonyl), arylsulfonyl groups (preferably containing 6 to 20 carbon atoms, such as benzenesulfonyl and paratoluenesulfonyl), sulfamoyl groups (preferably containing 0 to 20 carbon atoms, such as sulfamoyl, N-methylsulfamoyl and N-phenylsulfamoyl), carbamoyl groups (preferably containing 1 to 20 carbon atoms, such as carbamoyl, N-methylcarbamoyl, N,N-diemthylcarbaqmoyl and N-phenylcarbamoyl), acylamino groups (preferably containing 1 to 20 carbon atoms, such as acetylamino and benzoylamino), imino groups (preferably containing 2 to 20 carbon atoms, such as phthalimino), acyloxy groups (preferably containing 1 to 20 carbon atoms, such as acetyloxy and benzoyloxy), alkoxycarbonyl groups (preferably containing 2 to 20 carbon atoms, such as methoxycarbonyl and phenoxycarbonyl), and carbamoylamino groups (preferably containing 1 to 20 carbon atoms, such as carbamoylamino, N-methylcarbamoylamino and N-phenylcarbamoylamino). Of these substituents, alkyl groups, aryl groups, heterocyclic groups, halogen atoms, a cyano group, a carboxyl group, a sulfo group, alkoxy groups, sulfamoyl groups, carbamoyl groups or alkoxycarbonyl groups is preferred.

Those heterocyclic rings may further be fused with other rings. Suitable examples of rings which can fuse with the heterocyclic rings include benzene rings, benzofuran rings, pyridine rings, pyrrole rings, indole rings and thiophene rings.

The 5- or 6-membered nitrogen-containing heterocyclic rings formed from $Za_1$ and $Za_2$ are preferably oxazole ring, imidazole nuclei, thiazole nuclei or indolenine nuclei, far preferably oxazole nuclei, imidazole nuclei or indolenine nuclei, and particularly preferably oxazole nuclei.

$Ra_1$ and $Ra_2$ each independently represents a hydrogen atom, an alkyl group (preferably containing 1 to 20 carbon atoms, such as asmethyl, ethyl, n-propyl, isopropyl, n-butyl, n-pentyl, benzyl, 3-sulfopropyl, 4-sulfobutyl, 3-methyl-3-sulfopropyl, 2'-sulfobenzyl, carboxylmethyl or 5-carboxypentyl), an alkenyl group (preferably containing 2 to 20 carbon atoms, such as vinyl or allyl), an aryl group (preferably containing 6 to 20 carbon atoms, such as phenyl, 2-chlorophenyl, 4-methoxyphenyl, 3-methylphenyl or 1-naphthyl), or a heterocyclic group (preferably containing 1 to 20 carbon atoms, such as pyridyl, thienyl, furyl, thiazolyl, imidazolyl, pyrazolyl, pyrrolidino, piperidino or morpholino), advantageously an alkyl group (preferably containing 1 to 6 carbon atoms) or a sulfoalkyl group (preferably 3-sulfopropyl, 4-sulfobutyl, 3-methyl3-sulfopropyl or 2'-sulfobenzyl).

$Ma_1$ to $Ma_7$ each represents a methine group, which may have a substituent (with suitable examples including the same ones as the rings formed from $Za_1$ and $Za_2$ may have). More specifically, such a methine group may be substituted with an alkyl group, a halogen atom, a nitro group, an alkoxy group, an aryl group, a heterocyclic group, an aryloxy group, an acylamino group, a carbamoyl group, a sulfo group, a hydroxyl group, a carboxyl group, an alkylthio group or a cyano group. Of these substituents, an alkyl group is preferred.

$Ma_1$ to $Ma_7$ each is preferably an unsubstituted methine group or a methine group substituted with an alkyl (preferably 1-6C alkyl) group, particularly preferably an unsubstituted methine group, an ethyl-substituted methine group or a methyl-substituted methine group.

Any of $Ma_1$ to $Ma_7$ may combine with each other to form a ring. Suitable examples of such a ring include a cyclohexene ring, a cyclopentene ring, a benzene ring and a thiophene ring.

$na^1$ and $na^2$ are each 0 or 1, and both are preferably 0.

$ka^1$ represents an integer of 0 to 3, preferably an integer of 1 to 3, far preferably 1 or 2.

When $ka^1$ is 2 or above, two or more $Ma_3$s are the same or different and two or more $Ma_4$s are the same or different.

CI represents an ion for charge neutralization, and y is a number of ions required for charge neutralization.

When the present two-photon absorption dye is a merocyanine dye, it is preferably represented by the following formula (4):

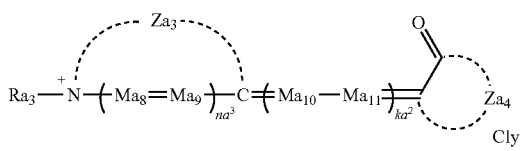

In formula (4), $Za_3$ represents atoms forming a 5- or 6-membered nitrogen-containing heterocyclic ring (with suitable examples including the same rings as $Za_1$ and $Za_2$ can form), which may have a substituent (with suitable examples including the same substituents as $Za_1$ and $Za_2$ may have). Such a heterocyclic ring may further be fused with another ring.

Examples of a ring more suitable as the 5- or 6-membered nitrogen-containing heterocyclic ring formed of $Za_3$ include an oxazole nucleus, an imidazole nucleus, a thiazole nucleus and an indolenine nucleus, preferably an oxazole nucleus and an idolenine nucleus.

$Za_4$ represents a 5- or 6-membered ring. The ring formed from $Za_4$ is a moiety generally referred to as an acidic nucleus, which is defined in THE THEORY OF THE PHOTOGRAPHIC PROCESS, fourth edition, page 198, edited by T. H. James, published by Macmillan Publishing co., Inc. in 1977.

Suitable examples of the ring formed from $Za_4$ include a 2-pyrazolone-5-one nucleus, a pyrazolidine-3,5-dione nucleus, an imidazoline-5-one nucleus, a hydantoin nucleus, a 2- or 4-thiohydantoin nucleus, a 2-iminooxazolidine-4-one nucleus, a 2-oxazoline-5-one nucleus, a 2-thiooxazoline-2,4-dione nucleus, an isorhodanine nucleus, a rhodanine nucleus, an indane-1,3-dione nucleus, a thiophene-3-one nucleus, a thiophene-3-one-1,1-dioxide nucleus, an indoline-2-one nucleus, an indoline-3-one nucleus, a 2-oxoindazolium nucleus, a 5,7-dioxo-6,7-dihydrothiazolo[3,2-a]pyrimidine nucleus, a 3,4-dihydroisoquinoline-4-one nucleus, a 1,3-dioxane-4,6-dione nucleus, a barbituric acid nucleus, a 2-thiobarbituric acid nucleus, a coumarin-2,4-dione nucleus, an indazoline-2-one nucleus, a pyrido[1,2-a]pyrimidine-1,3-dione nucleus, a pyrazolo[1,5-b]quinazolone nucleus and a pyrazolopyridone nucleus.

Of those nuclei which can be formed from $Za_4$, 2-pyrazolone-5-one, pyrazolidine-3,5-dione, rhodanine, indane-1,3-dione, thiophene-3-one, thiophene-3-one-1,1-dioxide, 1,3-dioxane-4,6-dione, barbituric acid, 2-thiobarbituric acid or coumarin-2,4-dione is preferred. Of these nuclei, pyrazolidine-3,5-dione, indane-1,3-dione, 1,3-dioxane-4,6-dione, barbituric acid or 2-thiobarbituric acid is preferable by far. Above all, pyrazolidine-3,5-dione, barbituric acid or 2-thiobarbituric acid is most suitable as the nucleus formed from $Za_4$.

The ring formed from $Za_4$ may have a substituent (with suitable examples including the same substituents as $Za_3$ may have). As such a substituent, an alkyl group, an aryl group, a heterocyclic group, a halogen atom, a cyano group, a carboxyl group, a sulfo group, an alkoxy group, a sulfamoyl group, a carbamoyl group or an alkoxycarbonyl group is more suitable.

The heterocyclic rings as recited above may further be fused with other rings. Suitable examples of rings capable of fusing with those heterocyclic rings include benzene, benzofuran, pyridine, pyrrole, indole and thiophene rings.

$Ra_3$ represents a hydrogen atom, an alkyl group, an alkenyl group, an aryl group or a heterocyclic group (with the same suitable examples as those of $Ra_1$ and $Ra_2$). The group more suitable as $Ra_3$ is an alkyl group (preferably containing 1 to 6 carbon atoms) or a sulfoalkyl group (preferably 3-sulfopropyl, 4-sulfobutyl, 3-methyl-3-sulfopropyl or 2'-sulfobenzyl).

$Ma_8$ to $Ma_{11}$ each represenst a methine group, which may have a substituent (with suitable examples including the same substituents as $Za_1$ and $Za_2$ may have). More specifically, such a methine group may be substituted with an alkyl group, a halogen atom, a nitro group, an alkoxy group, an aryl group, a heterocyclic group, an aryloxy group, an acylamino group, a carbamoyl group, a sulfo group, a hydroxyl group, a carboxyl group, an alkylthio group or a cyano group. Of these substituents, an alkyl group is preferred.

Each of $Ma_8$ to $Ma_{11}$ is preferably an unsubstituted methine group or a methine group substituted with an alkyl group (preferably containing 1 to 6 carbon atoms), far preferably an unsubstituted, ethyl-substituted or methyl-substituted methine group.

Any of $Ma_8$ to $Ma_{11}$ may combine with each other to form a ring. Suitable examples of such a ring include a cyclohexene ring, a cyclopentene ring, a benzene ring and a thiophene ring.

$na^3$ is 0 or 1, preferably 0.

$ka^2$ represents an integer of 0 to 8, preferably an integer of 0 to 4, far preferably 1, 2 or 3.

When $ka^2$ is 2 or above, two or more $Ma_{10}$s may be the same or different and two or more Malls may be the same or different.

CI represents an ion for charge neutralization, and y is a number of ions required for charge neutralization.

When the present two-photon absorption dye is an oxonol dye, it is preferably represented by the following formula (5):

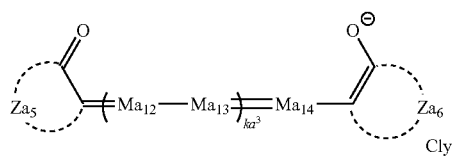

In formula (5), $Za_5$ and $Za_6$ each represents atoms forming a 5- or 6-membered heterocyclic ring (with suitable examples including the same rings as $Za_4$ can form), which may have a substituent (with suitable examples including the same substituents as $Za_4$ may have). Such a heterocyclic ring may further be fused with another ring.

Examples of rings more suitable as those formed from $Za_5$ and $Za_6$ include 2-pyrazolone-5-one, pyrazolidine-3,5-dione, rhodanine, indane-1,3-dione, thiophene-3-one, thiophene-3- one-1,1-dioxide, 1,3-dioxane-4,6-dione, barbituric acid, 2-thiobarbituric acid and coumarin-2,4-dione, preferably barbituric acid and 2-thiobarbituric acid, particularly preferably barbituric acid.

$Ma_{12}$ to $Ma_{14}$ each represents a methine group, which may have a substituent (with suitable examples including the same substituents as $Za_5$ and $Za_6$ may have). More specifically, such a methine group may be substituted with an alkyl group, a halogen atom, a nitro group, an alkoxy group, an aryl group, a heterocyclic group, an aryloxy group, an acylamino group, a carbamoyl group, a sulfo group, a hydroxyl group, a carboxyl group, an alkylthio group or a cyano group. Of these substituents, an alkyl group, a halogen atom, an alkoxy group, an aryl group, a heterocyclic group, a carbamoyl group or a carboxyl group is preferred. In particular, an alkyl group, an aryl group or a heterocyclic group is favorable.

Each of $Ma_{12}$ to $Ma_{14}$ is preferably an unsubstituted methine group.

Any of $Ma_{12}$ to $Ma_{14}$ may combine with each other to form a ring. Suitable examples of such a ring include a cyclohexene ring, a cyclopentene ring, a benzene ring and a thiophene ring.

$ka^3$ is an integer of 0 to 3, preferably an integer of 0 to 2, far preferably 1 or 2.

When $ka^3$ is 2 or above, two or more $Ma_{12}$s may be the same or different and two or more $Ma_{13}$s may be the same or different.

CI represents an ion for charge neutralization, and y is a number of ions required for charge neutralization.

It is also preferable that the present two-photon absorption dye is represented by the following formula (1):

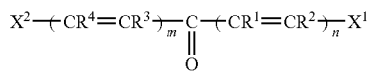

In formula (1), $R^1$, $R^2$, $R^3$ and $R^4$ each independently represents a hydrogen atom or a substituent. Suitable examples of such a substituent include an alkyl group (preferably containing 1 to 20 carbon atoms, such as methyl, ethyl, n-propyl, isopropyl, n-butyl, n-pentyl, benzyl, 3-sulfopropyl, 4-sulfobutyl, 3-methyl-3-sulfopropyl, 2'-sulfobenzyl, carboxylmethyl or 5-carboxypentyl), an alkenyl group (preferably containing 2 to 20 carbon atoms, such as vinyl or allyl), a cycloalkyl group (preferably containing 3 to 20 carbon atoms, such as cyclopentyl or cyclohexyl), an aryl group (preferably containing 6 to 20 carbon atoms, such as phenyl, 2-chlorophenyl, 4-methoxyphenyl, 3-methylphenyl or 1-naphthyl) or a heterocyclic group (preferably containing 1 to 20 carbon atoms, such as pyridyl, thietnyl, furyl, thiazolyl, imidazolyl, pyrazolyl, pyrrolidino, piperidino or morpholino).

As $R^1$, $R^2$, $R^3$ and $R^4$ each, a hydrogen atom or an alkyl group is suitable. Some (preferably two) of $R^1$, $R^2$, $R^3$ and $R^4$ may combine with each other to form a ring. Herein, it is particularly preferable that $R^1$ and $R^3$ combine with each other to form a ring. The ring $R^1$ and $R^3$ form together with the carbonyl carbon atom is preferably a 6-, 5- or 4-membered ring, far preferably a 5- or 4-membered ring, particularly preferably a 5-membered ring.

In formula (1), n and m independently represent an integer of 0 to 4, preferably an integer of 1 to 4, provided that at least one of m and n is not zero.

When n is 2 or above, $R^1$s may be the same or different and $R^2$s may be the same or different. When m is 2 or above, $R^3$s may be the same or different and $R^4$s maybe the same or different.

$X^1$ and $X^2$ independently represent an aryl group [preferably a 6-20C substituted aryl group (e.g., a substituted phenyl group or a substituted naphthyl group, and suitable examples of a substituent of such a group are the same as in the case of substituents $Ma_1$ to $Ma_7$ may have), far preferably an aryl group substituted with an alkyl group, an aryl group, a heterocyclic group, a halogen atom, an amino group, a hydroxyl group, an alkoxy group, an aryloxy group or an acylamino group, farther preferably an aryl group substituted with an alkyl group, an amino group, a hydroxyl group, an alkoxy group or an acylamino group, particularly preferably an phenyl group substituted by a dialkylamino or diarylamino group at the 4-position, wherein two or more substituents may combine to form a ring, preferably a julolidine ring], a heterocyclic group (preferably 1-20C 3- to 8-membered ring, especially 5- or 6-membered ring, with examples including pyridyl, thienyl, furyl, thiazolyl, imidazolyl, pyrazolyl, pyrrolyl, indolyl, carbazoyl, phenothiadino, pyrrolidino, peperidino and morpholino, preferably indolyl, carbazolyl, pyrrolyl and phenothiadino, which each may have such a substituent as the foregoing aryl group can have), or a group represented by the following formula (2):

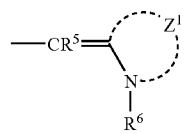

In formula (2), $R^5$ represents a hydrogen atom or a substituent (suitable examples of which are the same as in the cases of $R^1$ to $R^4$), preferably a hydrogen atom or an alkyl group, far preferably a hydrogen atom.

$R^6$ represents a hydrogen atom, an alkyl group, an alkenyl group, an aryl group or a heterocyclic group (suitable examples of these substituents are the same as in the cases of $R^1$ to $R^4$), preferably an alkyl group (far preferably a 1-6C alkyl group).

$Z^1$ represents atoms forming a 5- or 6-membered ring.

Suitable examples of a heterocyclic ring completed by $Z^1$ include an indolenine ring, an azaindolenine ring, a pyrazoline ring, a benzothiazole ring, a thiazole ring, a thiazoline ring, a benzoxazole ring, an oxazole ring, an oxazoline ring, a benzimidazole ring, an imidazole ring, a thiadiazole ring, a quinoline ring and a pyridine ring, preferably an indolenine ring, an azaindolenine ring, a pyrazoline ring, a benzothiazole ring, a thiazole ring, a thiazoline ring, a benzoxazole ring, na oxazole ring, an oxazoline ring, a benzimidazole ring, a thiadiazole ring and a quinoline ring, particularly preferably an indolenine ring, an azaindolenine ring, abenzothiazole ring, a benzoxazole ring and a benzimidazole ring.

The heterocyclic ring completed by $Z^1$ may have a substituent (with suitable examples including the same substituents as $Za_1$ and $Za_2$ may have). As such a substituent, an alkyl group, an aryl group, a heterocyclic group, a halogen atom, a carboxyl grouop, a sulfo group, an alkoxy group, a carbamoyl group or an alkoxycarbonyl group is more suitable.

$X^1$ and $X^2$ preferably represent aryl groups or groups represented by formula (2), far preferably aryl groups substituted by dialkylamino or diarylamino groups at their respective 4-positions, or groups represented by formula (2).

It is also preferable that the two-photon absorption dyes according to the invention contain groups capable of forming hydrogen bonds (hereinafter expressed as hydrogen bonding groups) in their individual molecules. The term "hydrogen bonding group" as used herein signifies a group capable of donating or accepting a hydrogen atom for a hydrogen bond, preferably a group having both of the those properties.

It is advantageous that the present compounds having hydrogen bonding groups produce associative interaction through interaction of the hydrogen bonding groups in a sate of solution or solid. Although the interaction may be intramolecular or intermolecular interaction, the intermolecular interaction is preferable.

It is appropriate that the present hydrogen bonding groups be represented by any of —COOH, —CONHR$^{11}$, —SO$_3$H, —SO$_2$NHR$^{12}$, —P(O)(OH)OR$^{13}$—OH, —SH, —NHR$^{14}$, —NHCOR$^{15}$ and —NR$^{16}$C(O)NHR$^{17}$. Herein, R$^{11}$ and R$^{12}$ independently represent a hydrogen atom, an alkyl group (preferably a 1-20C alkyl group, such as methyl, ethyl, n-propyl, isopropyl, n-butyl, n-pentyl, benzyl, 3-sulfopropyl, 4-sulfobutyl, carboxymethyl or 5-carboxypentyl)$_1$ an alkenyl group (preferably a 2-20C alkenyl group, such as vinyl or allyl), an aryl group (preferably a 6-20C aryl group, such as phenyl, 2-chlorophenyl, 4-methoxyphenyl, 3-methylphenyl or 1-naphthyl), a heterocyclic group (preferably a 1-20C heterocyclic group, such as pyridyl, thienyl, furyl, thiazolyl, imidazolyl, pyrazolyl, pyrrolidino, piperidino or morpholino), —COR$^{18}$ or —SO$_2$R$^{19}$. R$^{13}$ to R$^{19}$ each independently represents a hydrogen atom, an alkyl group, an alkenyl group, an aryl group or a heterocyclic group (suitable examples of these groups are the same as in the cases of R$^{11}$ and R$^{12}$).

R$^{11}$ preferably represents a hydrogen atom, an alkyl group, an aryl group, —COR$^{10}$ or —SO$_2$R$^{19}$. Herein, R$^{18}$ and R$^{19}$ each independently represents an alkyl group or an aryl group.

It is preferable by far that R$^{11}$ be a hydrogen atom, an alkyl group or —SO$_2$R$^{19}$, especially a hydrogen atom.

R$^{12}$ preferably represents a hydrogen atom, an alkyl group, an aryl group, —COR$^{18}$ or —SO$_2$R$^{19}$. Herein, R$^{18}$ and R$^{19}$ each independently represents an alkyl group or an aryl group.

It is preferable by far that R$^{12}$ be a hydrogen atom, an alkyl group or —COR$^{18}$, especially a hydrogen atom.

R$^{13}$ is preferably a hydrogen atom, an alkyl group or an aryl group, especially a hydrogen atom.

R$^{14}$ is preferably a hydrogen atom, an alkyl group or an aryl group.

R$^{15}$ is preferably an alkyl group or an aryl group.

R$^{16}$ is preferably a hydrogen atom, and R$^{17}$ is preferably a hydrogen atom, an alkyl group or an aryl group.

Of the hydrogen bonding groups recited above, —COOH, —CONHR$^{11}$, —SO$_2$NHR$^{12}$, —NHCOR$^{15}$ or —NR$^{16}$C(O)NHR$^{17}$ is preferred. Among these groups, —COOH, —CONHR$^{11}$ or —SO$_2$NHR$^{12}$, especially-COOH or —CONH$_2$, is preferable by far.

The present two-photon absorption dyes may be used in a monomeric state, or they may be used in an associated state.

The term "associated state (or aggregated state)" as used herein generally refers to the state in which the chromophores of dyes are fixed to their particular spatial arrangements by bonding forces between them, such as a covalent bonding force, a coordinate bonding force or intermolecular forces (e.g., hydrogen bonding force, Van der Waals force, Coulomb force).

Each of the present two-photon absorption dyes may be used in a state of intermolecular association, or it may be used in a state of intramolecular association formed from two or more of two-photon absorption chromophores present in its molecule.

For reference purposes, aggregates formed by such association are illustrated below. Detailed descriptions of the aggregates can be found, e.g., in *THE THEORY OF THE PHOTOGRAPHIC PROCESS*, 4th Ed. edited by T. H. James, Macmillan Publishing Co., Inc., 1997, chap. 8, pp. 218-222; and Takayoshi Kobayasi, *J-Aggregates*, World Scientific Publishing Co. Pte. Ltd., 1996.

From the standpoint of absorption wavelengths of aggregates, the aggregates whose absorption maxima sift to shorter wavelengths than those of their respective monomers are referred to as H-aggregates (including dimers), and the aggregates whose absorption maxima shit to longer wavelengths than those of their respective monomers are referred to as J-aggregates.

From the standpoint of aggregate structure, namely in aggregates in brickstone-work arrangement, the aggregates small in angle of maximum overlap between dye molecules are referred to as J-aggregates, while the aggregates great in angle of maximum overlap between dye molecules are referred to as H-aggregates. Detailed descriptions of aggregates in brickstone-work arrangement can be found in *Chemical Physics Letters*, vol. 6, p. 183 (1970). Further, there are ladder or staircase arrangements as variations of the brickstone-work arrangement. Detailed descriptions of aggregates in those arrangements can be found in *Zeitschrift für Pysikalische Chemie*, vol. 49, p. 324 (1941).

As aggregates in an arrangement different from the brickstone-work arrangement, there are known aggregates in the herringbone arrangement (which can be referred to as herringbone aggregates).

The herringbone aggregates are described in Charles Reich, *Photographic Science and Engineering*, vol. 18, No. 3, p. 335 (1974). They have two absorption maxima of aggregate origin.

Whether or not dye molecules are in an aggregated state can be checked, as mentioned above, by detecting any variation from the absorption (absorption maximal wavelength ($\lambda$max), $\epsilon$, absorption spectral shape) of dye molecules in a monomeric state.

By aggregation, the present compounds may produce spectral shifts to shorter wavelength (H-aggregation) or spectral shifts to longer wavelength (J-aggregation) or both. In the invention, however, formation of J-aggregates is preferable.

The state in which the compounds form intermolecular aggregates can be created by various methods.

Examples of the method applicable to a solution system include a method of dissolving a compound (e.g., in a concentration of $10^{-4}$ M) in an aqueous solution to which a matrix, such as gelatin, is added (e.g., in a gelatin concentration of 0.5 wt %), a method of dissolving a compound (e.g., in a contentration of $2\times10^{-3}$ M) in an aqueous solution to which a salt, such as KCl, is added (e.g., in a KCl concentration of 15%), and a method of dissolving a compound in a good solvent and then adding thereto a poor solvent (wherein a DMF-water combination or a chloroform-toluene combination is used as the combination of good and poor solvents).

Examples of the method applicable to the film system include methods of forming a compound into a polymer dispersion system, an amorphous system, a crystalline system and a LB film system, respectively.

In addition, the state of intermolecular aggregation can be formed by adsorbing or chemically bonding a compound to bulk or fine-grain (of the order of μm-nm in size) semiconductor (e.g., silver halide, titanium dioxide) or bulk or fine-grain metal (e.g., gold, silver, platinum), or self-organizing a compound into such bulk or fine-grain semiconductor or metal. These techniques are utilized in silver salt color photography for spectral sensitization by adsorption of J-aggregated cyanine dyes onto silver halide crystals.

The number of compound molecules involved in intermolecular aggregation may be two or far greater than two.

Examples of two-photon absorption dyes usable in the invention are illustrated below, but these examples should not be construed as limiting the scope of the invention.

| | $R_{51}$ | Cl |
|---|---|---|
| D-1 | $-(CH_2)_3-SO_3^-$ | $Na^+$ |
| D-2 | $-C_2H_5$ | $I^-$ |
| D-3 | $-(CH_2^+)_3-N(CH_3)_3$ | $(Br^-)_3$ |

| | $R_{51}$ | $R_{52}$ | Cl |
|---|---|---|---|
| D-4 | $-(CH_2)_4-SO_3^-$ | $-H$ | (bicyclic amidinium structure) |
| D-5 | $-C_2H_5$ | " | $CH_3-C_6H_4-SO_3^-$ |
| D-6 | $-(CH_2)_3-SO_3^-$ | $-C_2H_5$ | $K^+$ |
| D-7 | $-(CH_2)_3-N^+(CH_3)_3$ | $-CH_3$ | $(Br^-)_3$ |

D-8

D-9

D-10

-continued
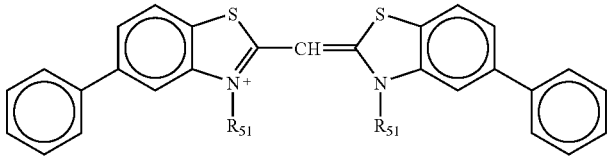
·Cl
| | R51 | Cl |
|---|---|---|
| D-11 | ―(CH₂)₃―SO₃⁻ | HN⁺(C₂H₅)₃ |
| D-12 | ―C₂H₅ |  |
| D-13 | ―(CH₂)₄―NH−C(=NH₂⁺)−NH₂ | (Br⁻)₃ |
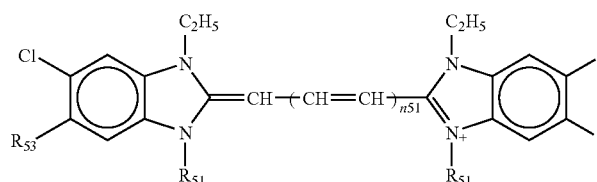
Cl
| | R51 | R53 | n51 | Cl |
|---|---|---|---|---|
| D-14 | ―(CH₂)₃―SO₃⁻ | ―Cl | 1 | Na⁺ |
| D-15 | ―C₂H₅ | " | 1 | I⁻ |
| D-16 | ―(CH₂)₄―SO₃⁻ | ―CF₃ | " | K⁺ |
| D-17 | " | ―CN | " | HN⁺(C₂H₅)₃ |
| D-18 | " | ―Cl | 2 | 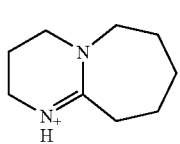 |
| D-19 | ―(CH₂)₃―SO₃⁻ | ―CN | " | " |
| D-20 | ―C₂H₅ | " | " |  |
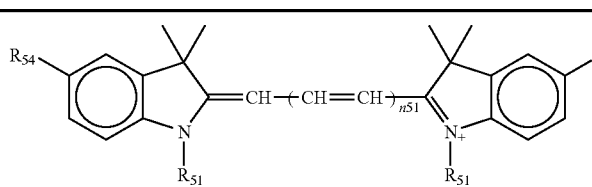
Cl
| | R51 | R54 | n51 | Cl |
|---|---|---|---|---|
| D-21 | ―(CH₂)₃―SO₃⁻ | ―H | 1 | 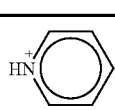 |
| D-22 | ―C₄H₉ | ―COOH | " | 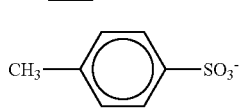 |
| D-23 | ―CH₃ | ―H | 2 | I⁻ |
| D-24 | ―(CH₂)₃―SO₃⁻ | ―COOH | " | Na⁺ |
| D-25 | ―(CH₂)₄―SO₃⁻ | ―H | 3 | K⁺ |
| D-26 | ―(CH₂)₃―SO₃⁻ | ―COOH | " | " |

-continued

| | | | | |
|---|---|---|---|---|
| D-27 | —CH$_3$ | —CONH$_2$ | " | 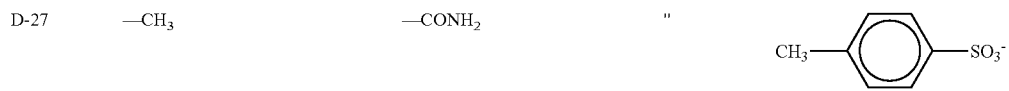 |

D-28

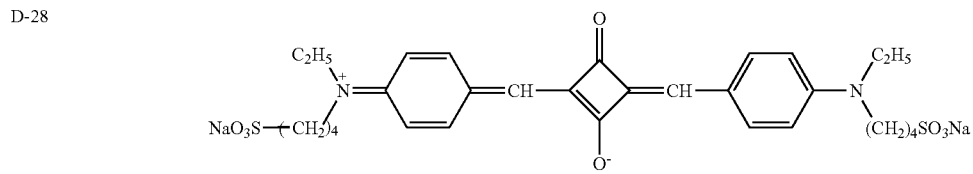

D-29

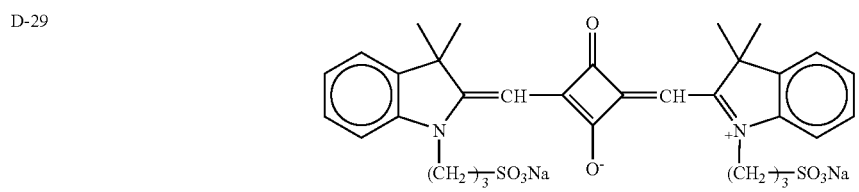

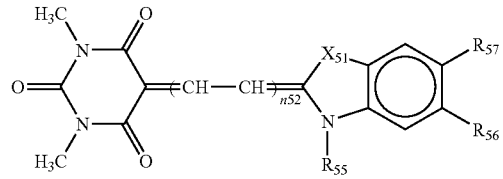

| | R$_{55}$ | R$_{56}$ | R$_{57}$ | X$_{51}$ | n$_{52}$ |
|---|---|---|---|---|---|
| D-30 | —(CH$_2$)$_3$—SO$_3^-$ HN$^+$(C$_2$H$_5$)$_3$ | —Cl | —H | —O— | 1 |
| D-31 | —C$_2$H$_5$ | —H | —COOH | " | 2 |
| D-32 | —(CH$_2$)$_3$—$^+$N(CH$_3$)$_3$ Br$^-$ | 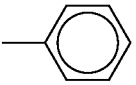 | —H | " | " |
| D-33 | —(CH$_2$)$_4$—SO$_3^-$ HN$^+$(C$_2$H$_5$)$_3$ | —CH$_3$ | —CH$_3$ | —S— | " |
| D-34 | —(CH$_2$)$_3$—SO$_3^-$ HN$^+$(C$_2$H$_5$)$_3$ | —H | —H | —C(CH$_3$)$_2$— | " |
| D-35 | —CH$_3$ | " | " | " | " |
| D-36 | —(CH$_2$)$_3$—SO$_3$Na | " | —COOH | " | " |
| D-37 | —CH$_3$ | " | —CONH$_2$ | " | " |
| D-38 | —(CH$_2$)$_3$—SO$_3^-$ HN$^+$(C$_2$H$_5$)$_3$ | " | —H | " | 3 |

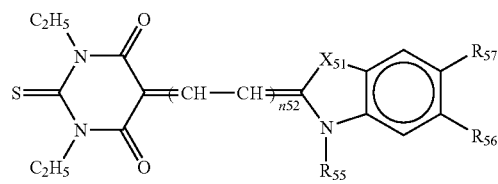

| | R$_{55}$ | R$_{56}$ | R$_{57}$ | X$_{51}$ | n$_{52}$ |
|---|---|---|---|---|---|
| D-39 | —(CH$_2$)$_3$—SO$_3^-$ HN$^+$(C$_2$H$_5$)$_3$ | —Cl | —H | —S— | 1 |
| D-40 | —C$_2$H$_5$ | —H | —CONH$_2$ | —O— | 2 |
| D-41 | —(CH$_2$)$_4$—SO$_3^-$ HN$^+$(C$_2$H$_5$)$_3$ | —CH$_3$ | —CH$_3$ | —S— | " |
| D-42 | —(CH$_2$)$_3$—SO$_3^-$ HN$^+$(C$_2$H$_5$)$_3$ | —H | —H | —C(CH$_3$)$_2$— | " |
| D-43 | —(CH$_2$)$_3$—SO$_3$Na | " | —COOH | " | " |
| D-44 | —CH$_3$ | " | —CONH$_2$ | " | " |
| D-45 | " | " | " | " | 3 |

-continued
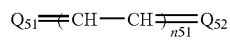
| | $Q_{51}$ | $Q_{52}$ | $n_{51}$ |
|---|---|---|---|
| D-46 | | | 2 |
| D-47 | | | 1 |
| D-48 | | | 1 |
| D-49 | | | 2 |
| D-50 | | | 2 |
| D-51 | | " | 2 |
| D-52 | | | 3 |

-continued

| | | | |
|---|---|---|---|
| D-53 | (structure: 1,2-bis(4-sulfonatophenyl)pyrazolidine-3,5-dione methylene, KO₃S groups) | (structure: 3,3-dimethyl-2-methylene-1-(CH₂)₂SO₃K-indoline-5-sulfonate K) | 3 |
| D-54 | (structure: 3-(4-KOOC-phenyl)-4-methylene-isoxazol-5(4H)-one) | (structure: 1,1-dimethyl-2-methylene-benz[e]indoline with N-(CH₂)₄SO₃K) | 3 |
| D-55 | (structure: 1,3-dimethyl-5-methylene-barbituric acid) | (structure: 1,1-dimethyl-2-methylene-benz[e]indoline with N-(CH₂)₃SO₃⁻ ⁺HN(C₂H₅)₃) | 2 |

| | $Q_{53}=CH\!-\!(\!-\!CH\!=\!CH\!-\!)_{n_{53}} Q_{54}$ CI | | | |
|---|---|---|---|---|
| | $Q_{53}$ | $Q_{54}$ | $n_{53}$ | CI |
| D-56 | (1,3-dimethylbarbituric acid methylene) | (1,3,5-trimethyl-6-oxido-pyrimidine-2,4-dione) | 2 | H⁺ |
| D-57 | (1,3-diethyl-2-thiobarbituric acid methylene) | (1,3-diethyl-5-methyl-6-oxido-2-thioxopyrimidin-4(1H)-one) | 1 | HN⁺(pyridinium) |
| D-58 | " | " | 2 | HN⁺(C₂H₅)₃ |
| D-59 | (cyclohexane-spiro-1,3-dioxane-4,6-dione 5-methylene) | (cyclohexane-spiro-1,3-dioxane-4,6-dione 5-methyl-6-oxido) | 2 | H⁺ |
| D-60 | (2-phenyl-3,3-dicyano-prop-1-en-1-ylidene methylene, CN groups) | (2-phenyl-1-methyl-3,3-dicyano-prop-2-enide, CN groups) | 1 | HN⁺(C₂H₅)₃ |

-continued
| | | | |
|---|---|---|---|
| D-61 | 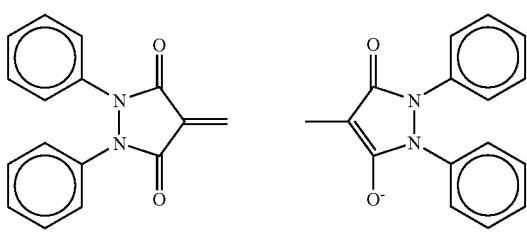 | 2 | H+ |
| D-62 | 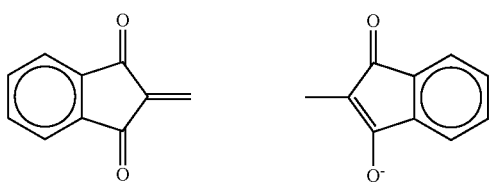 | 2 | HN+(C2H5)3 |
| D-63 | 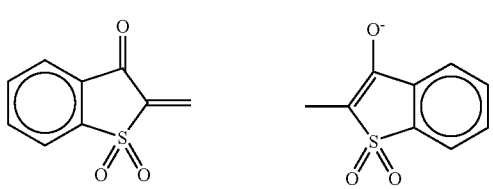 | 2 | " |
| D-64 | 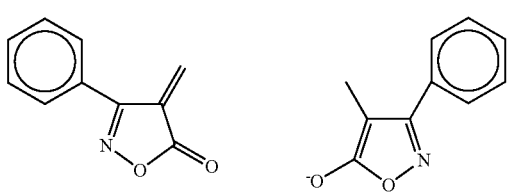 | 2 | H+ |
| D-65 | 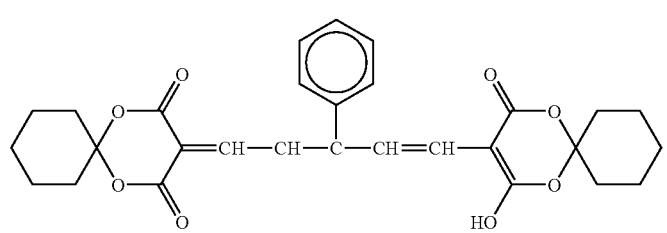 | | |
| D-66 | 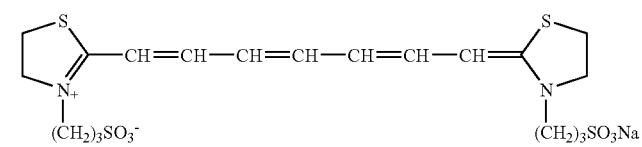 | | |
| D-67 | 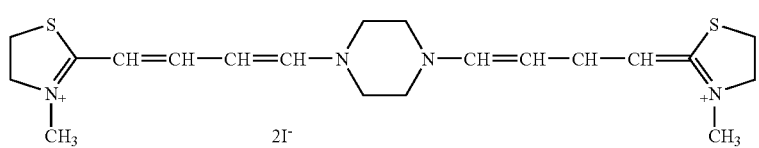 | | |
| D-68 | 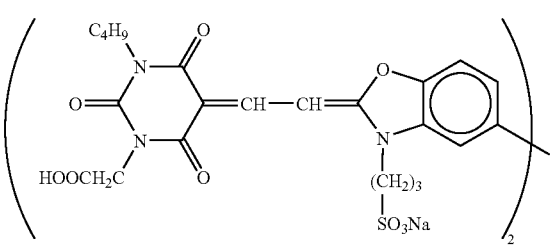 | | |

-continued
D-69 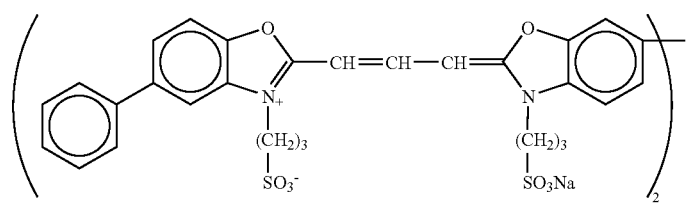
D-70 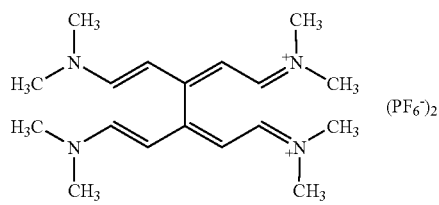
D-71 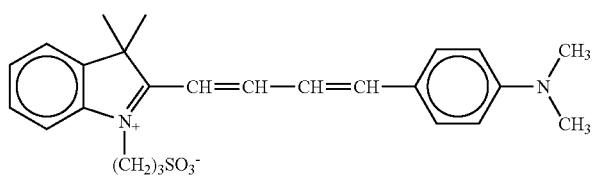
D-72 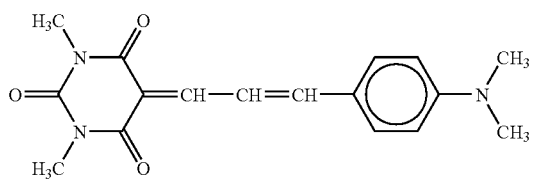
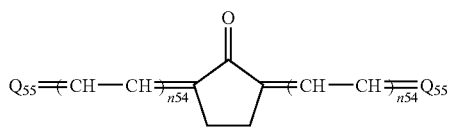
| | $Q_{55}$ | $n_{54}$ |
|---|---|---|
| D-73 | 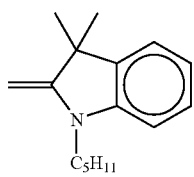 | 2 |
| D-74 | 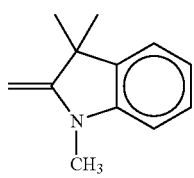 | 1 |
| D-75 | 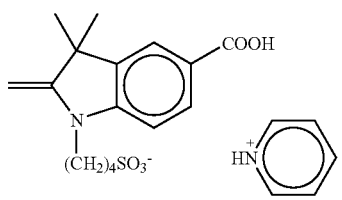 | 1 |

| | | |
|---|---|---|
| D-76 | 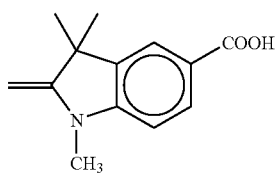 | 2 |
| D-77 | 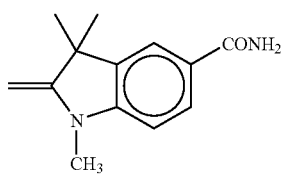 | 2 |
| D-78 | 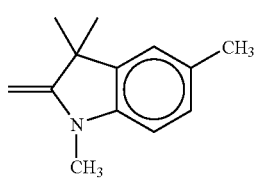 | 2 |
| D-79 | 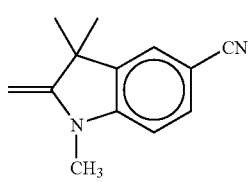 | 2 |
| D-80 | 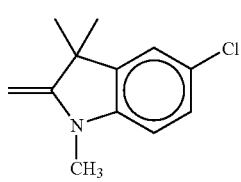 | 2 |
| D-81 | 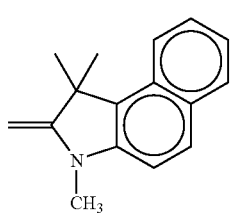 | 2 |
| D-82 | 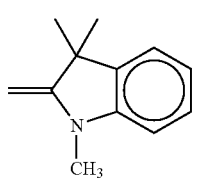 | 2 |
| D-83 | 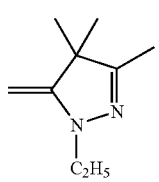 | 2 |

-continued
D-84 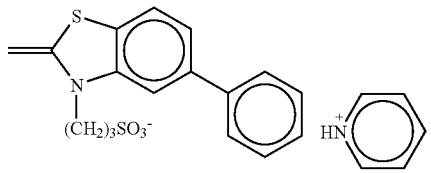 1
D-85 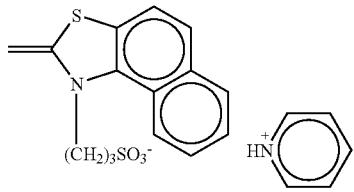 1
D-86 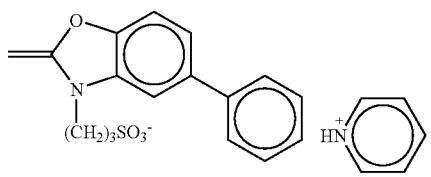 1
D-87 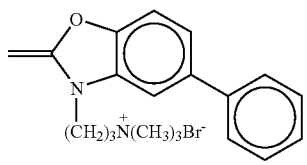 1
D-88 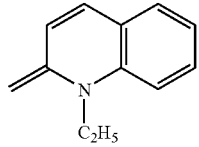 1
D-89 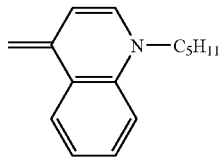 1
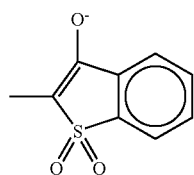
| | $n_{55}$ |
|---|---|
| D-90 | 0 |
| D-91 | 1 |
| D-92 | 3 |
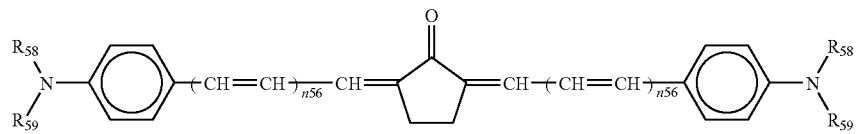
| | $R_{58}$ | $R_{59}$ | $n_{56}$ |
|---|---|---|---|
| D-93 | —$C_2H_5$ | —$C_2H_5$ | 0 |
| D-94 | —$CH_3$ | —$CH_3$ | 1 |

-continued
| | | | |
|---|---|---|---|
| D-95 | " | —(CH₂)₃—SO₃Na | 4 |
| D-96 | " | —CH₃ | 2 |
| D-97 | " | —COOH | " |
| D-98 | " | —CH₃ | 3 |
| D-93 | 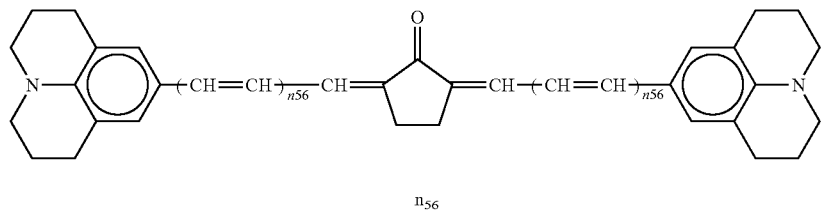 | | 2 |
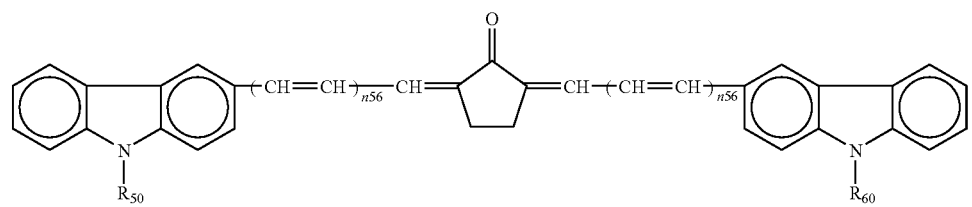
| | $n_{56}$ |
|---|---|
| D-100 | 1 |
| D-101 | 2 |
| D-102 | 3 |
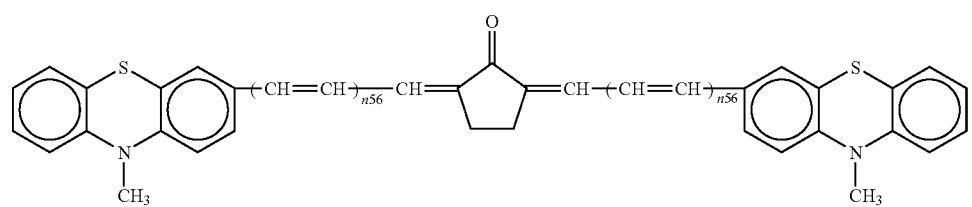
| | $R_{60}$ | $n_{56}$ |
|---|---|---|
| D-103 | —C₂H₅ | 0 |
| D-104 | " | 1 |
| D-105 | " | 2 |
| D-106 | —CH₂COOH | " |
| D-107 | —(CH₂)₃—SO₃Na | " |
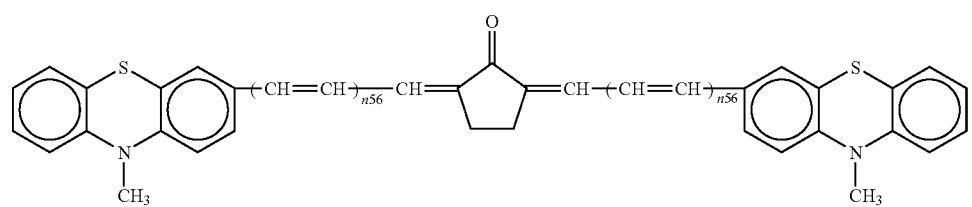
| | $n_{56}$ |
|---|---|
| D-108 | 1 |
| D-109 | 2 |
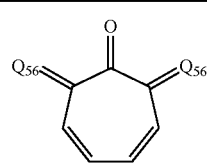
| | $Q_{56}$ |
|---|---|
| D-110 | =CH—CH=CH—⌬—N(CH₃)₂ |

-continued
D-111 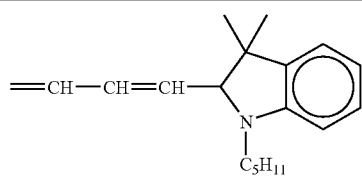
D-112 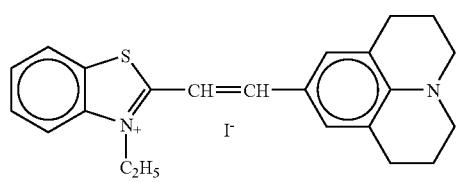
D-113 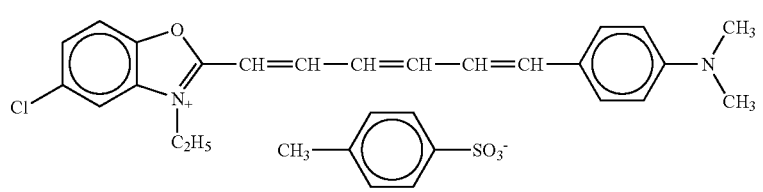
D-114 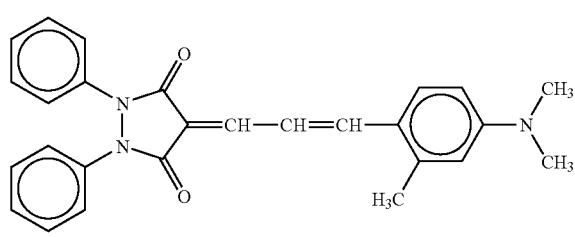
D-115 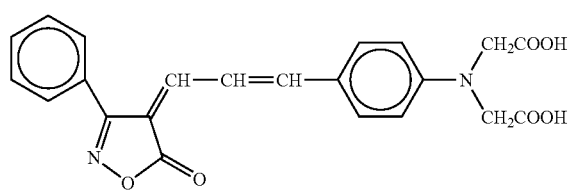
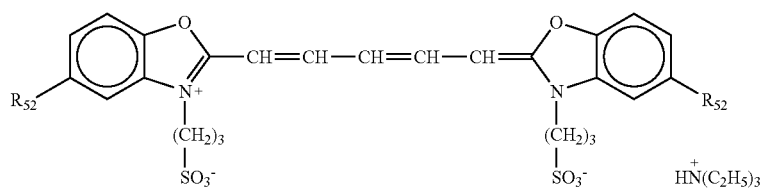
| | $R_{52}$ |
|---|---|
| D-116 | —F |
| D-117 | —Cl |
| D-118 | —Br |
| D-119 | —I |
| D-120 | H |
| D-121 | 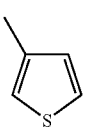 |
| D-122 | 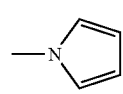 |

D-123 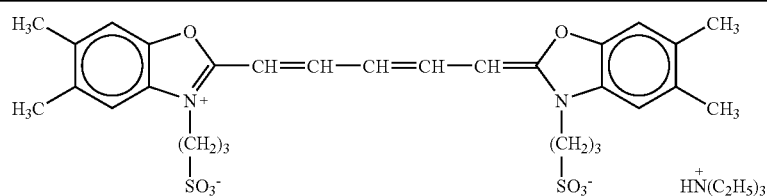
D-124 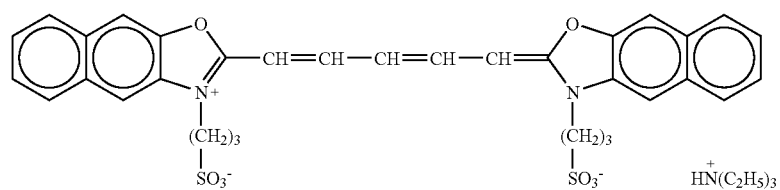
D-125 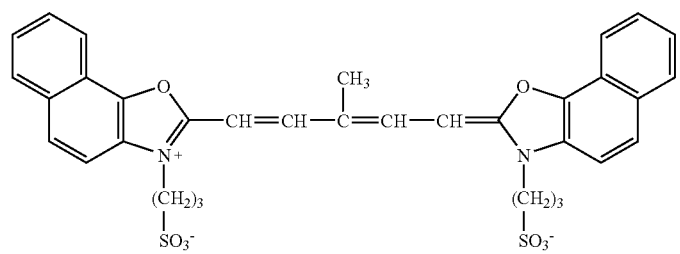
D-126 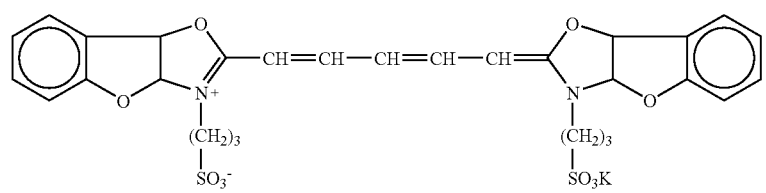
D-127 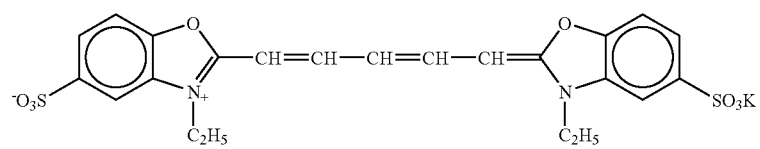
D-128 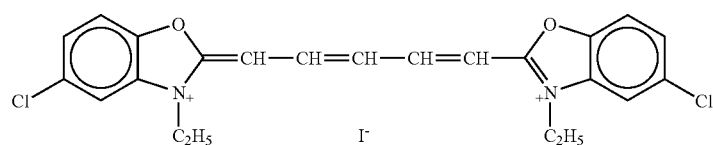
D-129 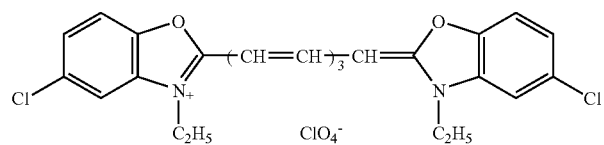
D-130 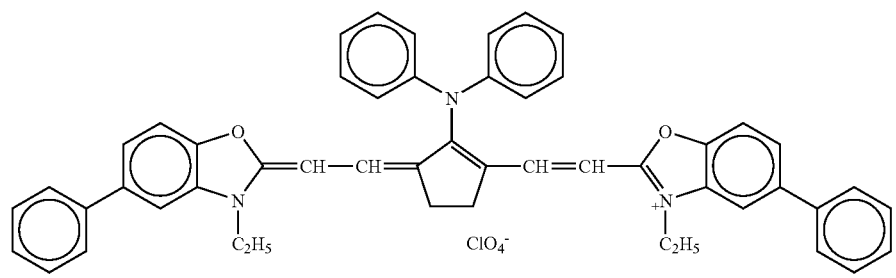

-continued
D-131 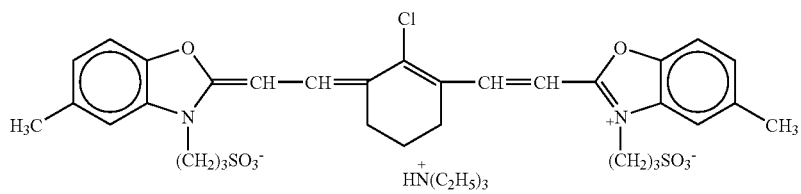
D-132 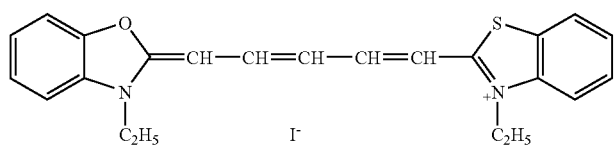
D-133 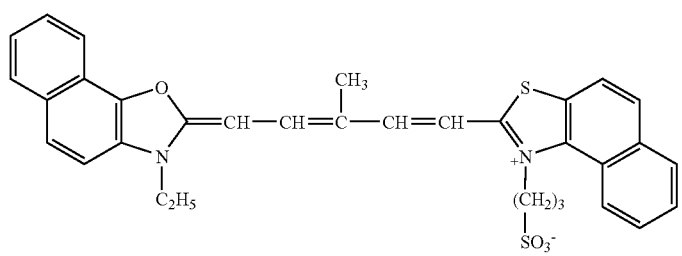
D-134 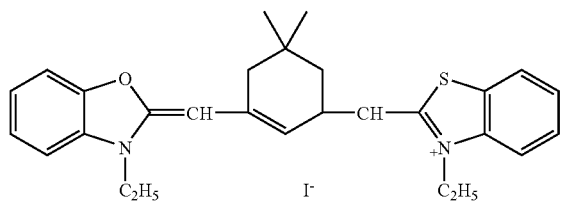
D-135 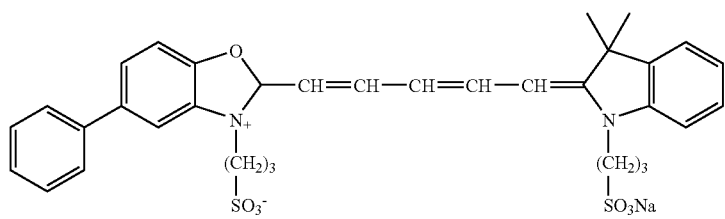
D-136 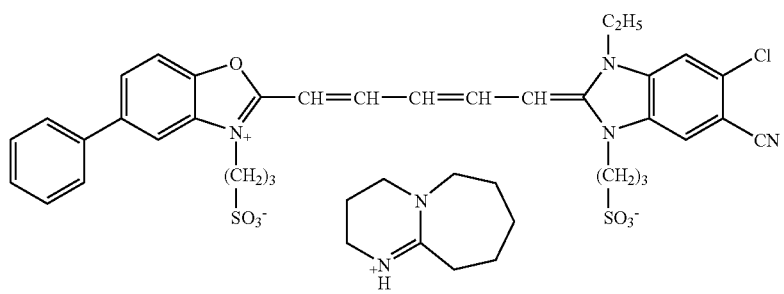
D-137 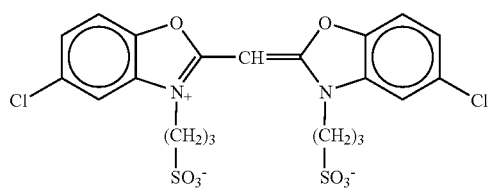

-continued
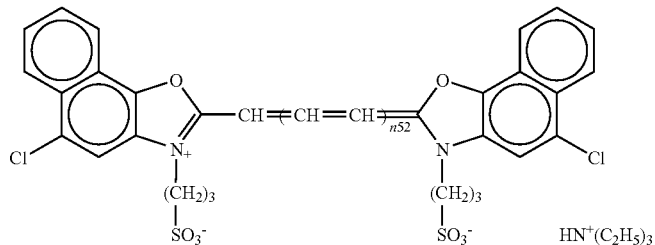
n52
| | n52 |
|---|---|
| D-138 | 1 |
| D-139 | 2 |
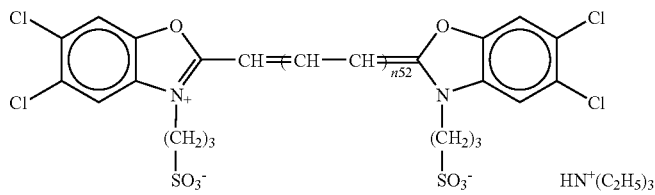
n52
| | n52 |
|---|---|
| D-140 | 1 |
| D-141 | 2 |
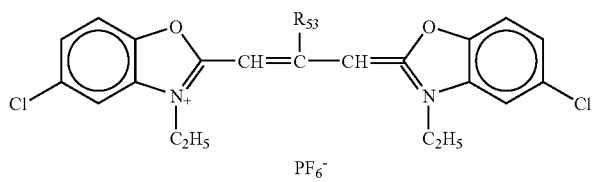
R53
| | R53 |
|---|---|
| D-142 | H |
| D-143 | CH3 |
D-144
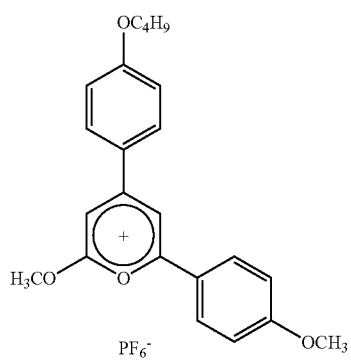

-continued
D-145
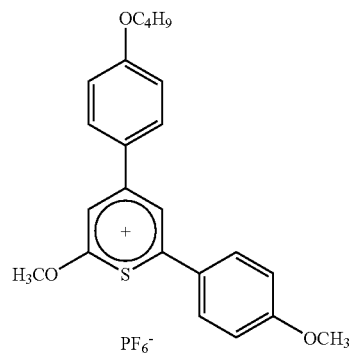
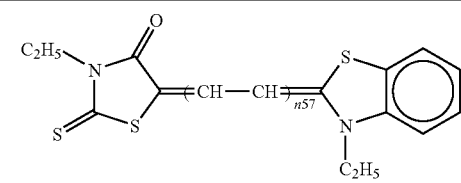
n57
| | n57 |
|---|---|
| D-146 | 0 |
| D-147 | 1 |
| D-148 | 2 |
D-149 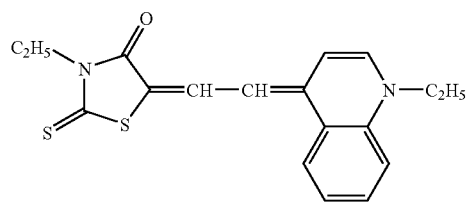
D-150 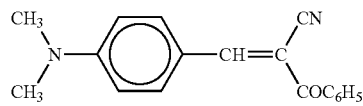
D-151 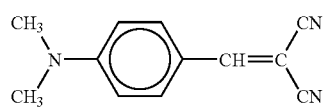
D-152 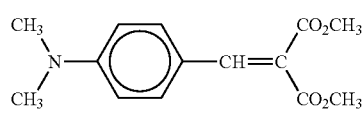
D-153 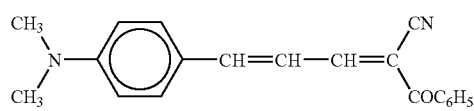
D-154 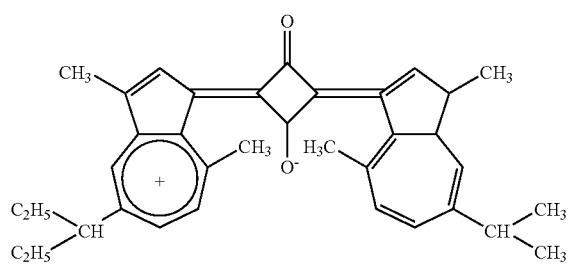

| | |
|---|---|
| D-155 | 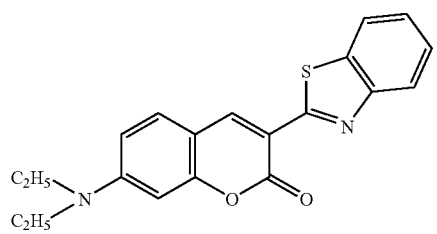 |
| D-156 | 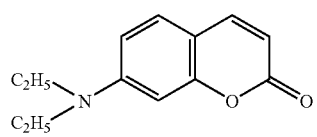 |
| D-157 | 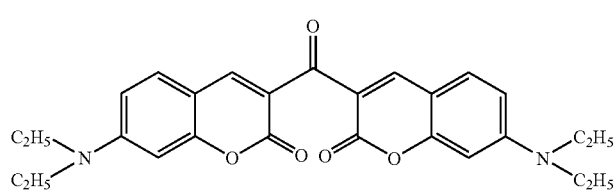 |
| D-158 | 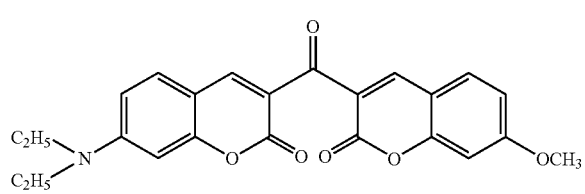 |
| D-159 | 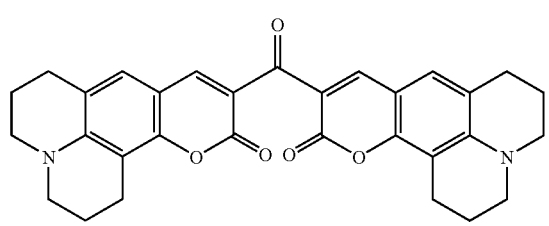 |
| D-160 | 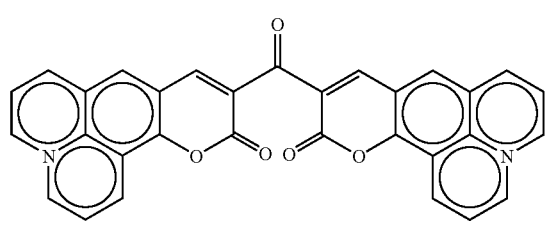 |
| D-161 | 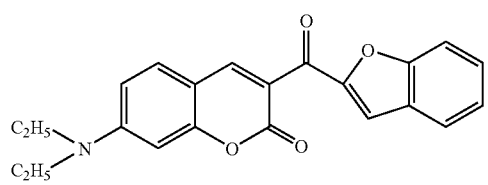 |
| D-162 | 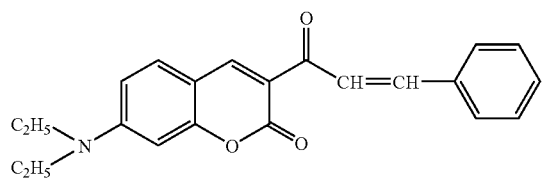 |

-continued
D-163 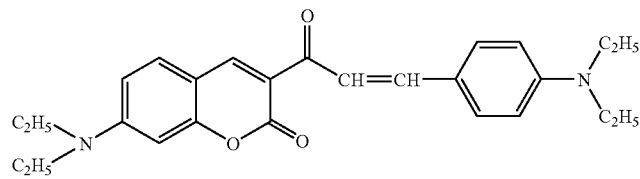
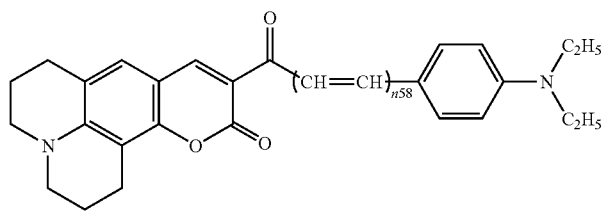
| | n58 |
|---|---|
| D-164 | 2 |
| D-165 | 3 |
| D-166 | 4 |
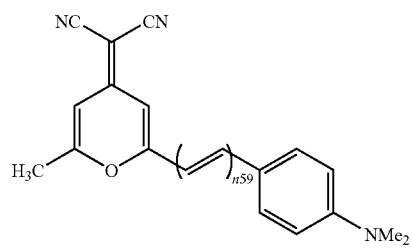
| | n59 |
|---|---|
| D-167 | 1 |
| D-168 | 2 |
| D-169 | 3 |
| D-170 | 4 |
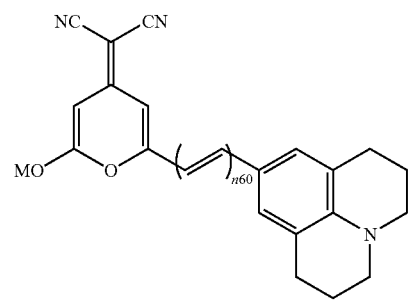
| | n60 |
|---|---|
| D-171 | 1 |
| D-172 | 2 |
| D-173 | 3 |

-continued
D-174 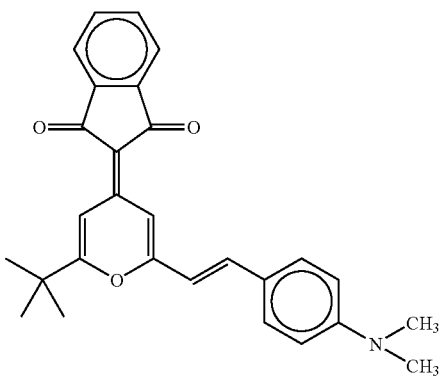
D-175 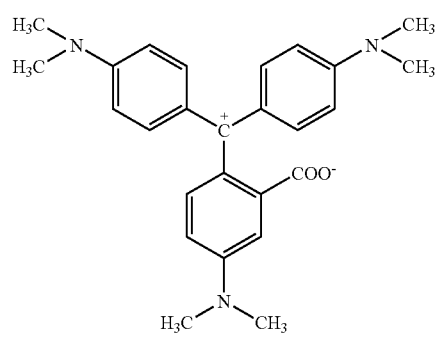
D-176 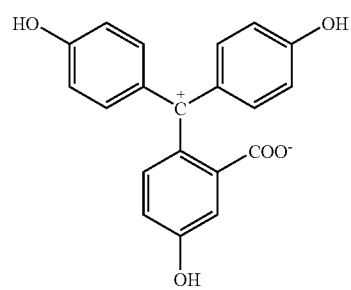
D-177 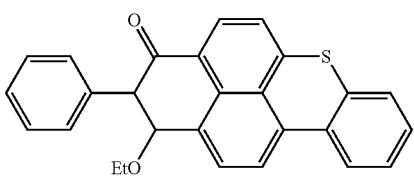
D-178 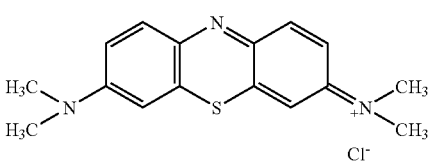
D-179 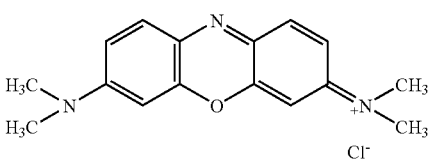

D-180 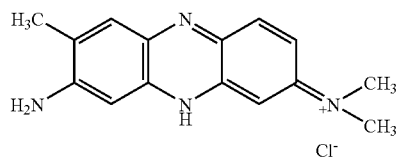
D-181 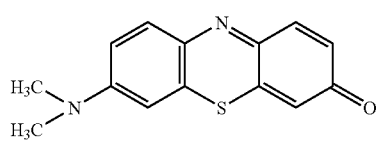
D-182 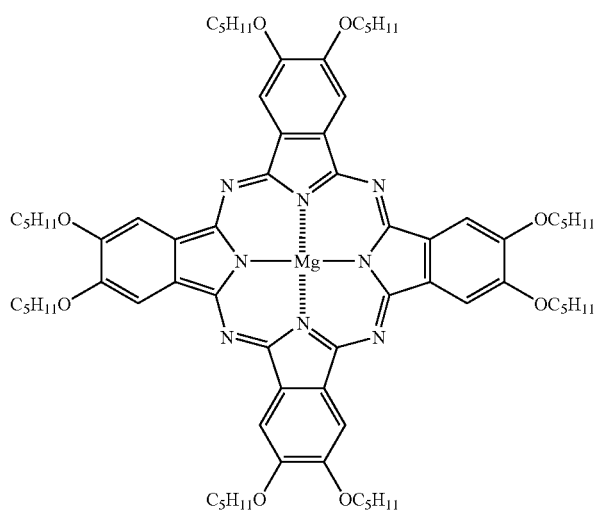
D-183 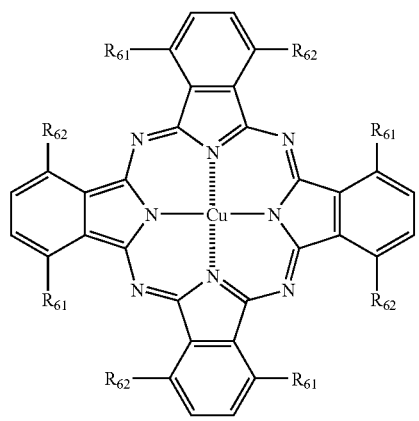
$R_{61}/R_{62}$ どちらかH、どちらか— $SO_2C_4H_9^{-1}$ (mixture)

D-184
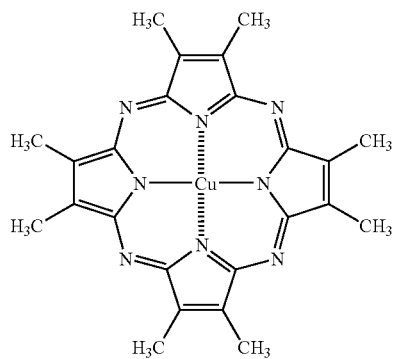
D-185
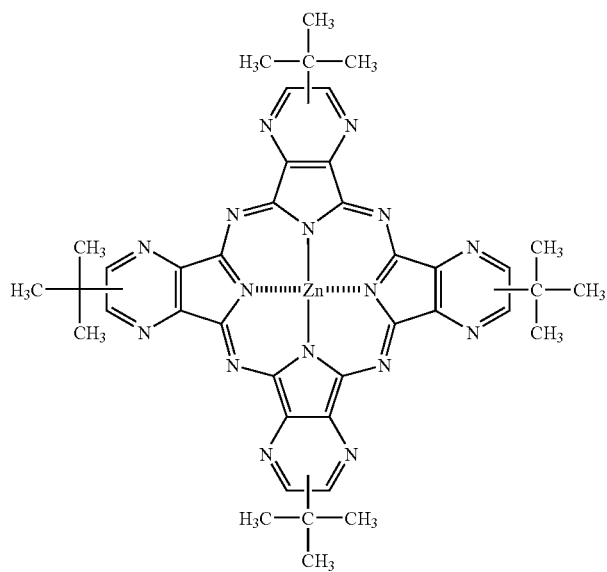
D-186
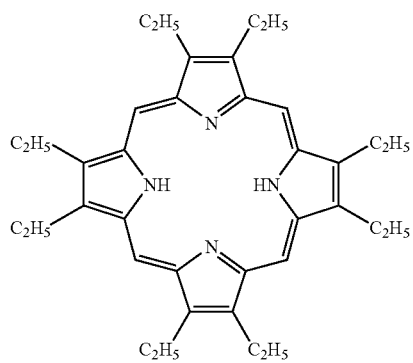

D-187
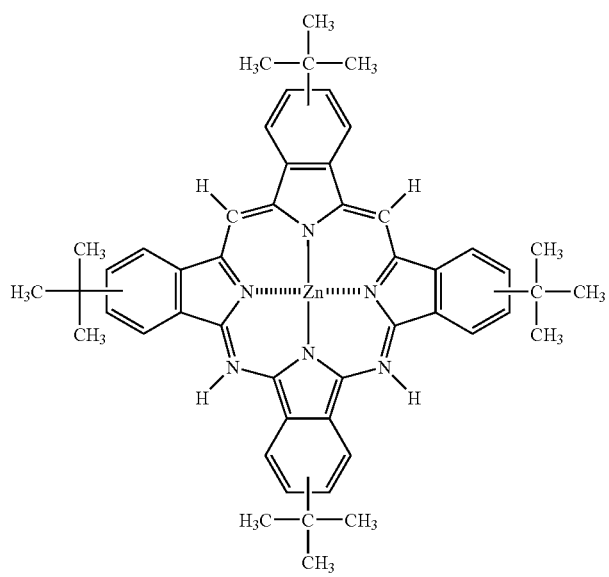
D-188
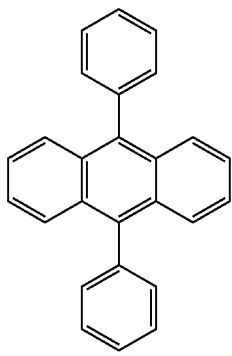
D-189
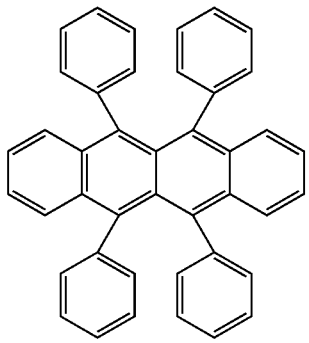

-continued
D-190
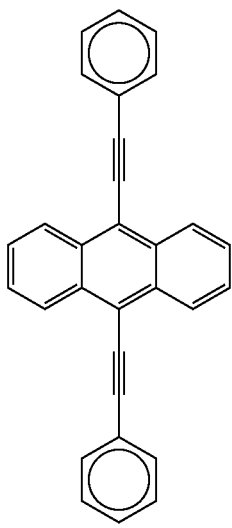
D-191
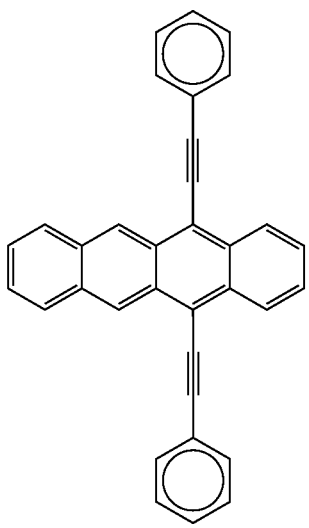
D-192
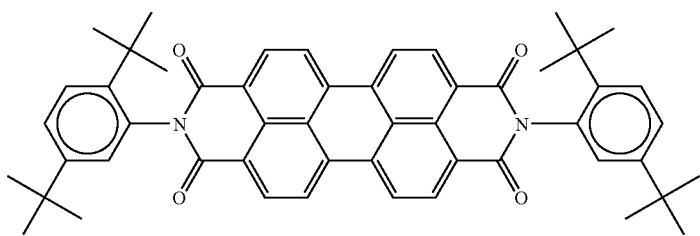
D-193
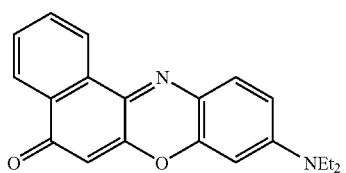

-continued
D-194 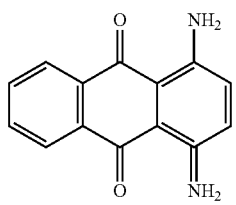
D-195 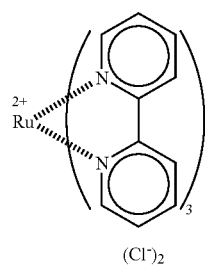
D-196 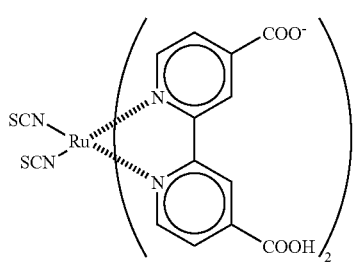
D-197 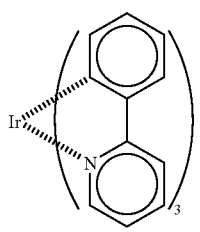
D-198 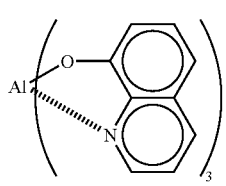

D-199 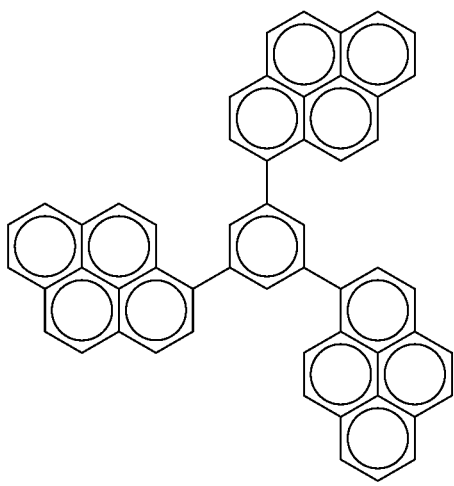
D-200 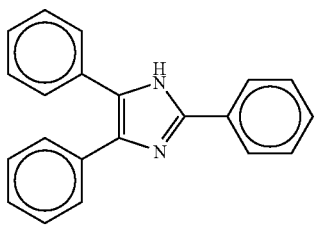
D-201 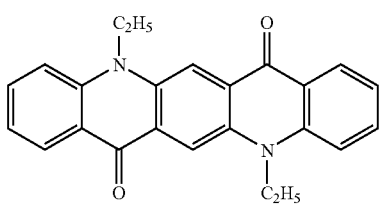
D-202 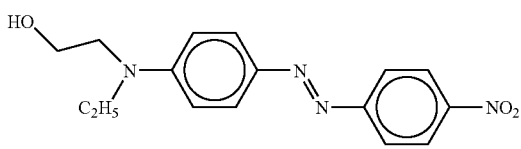
D-203 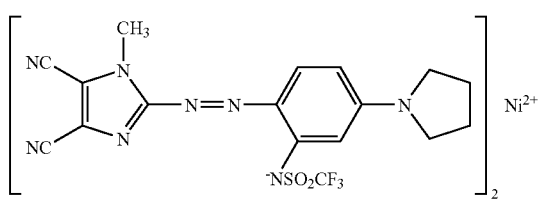
D-204 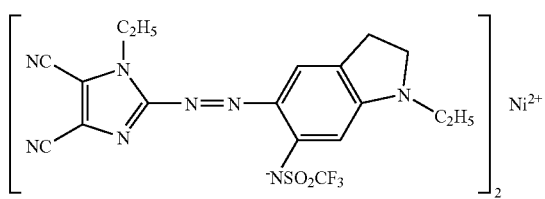

-continued
D-205 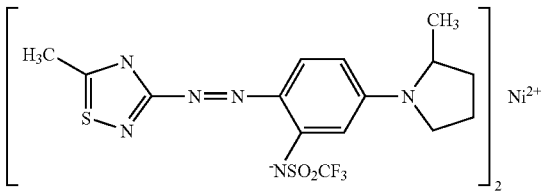
D-206 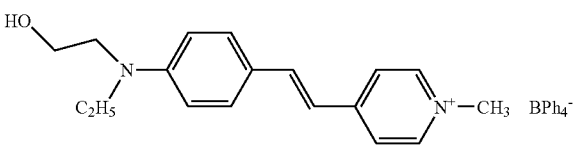
D-207 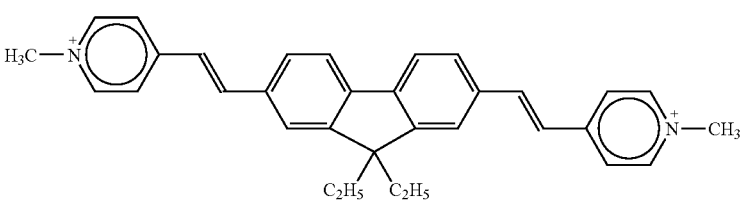
D-208 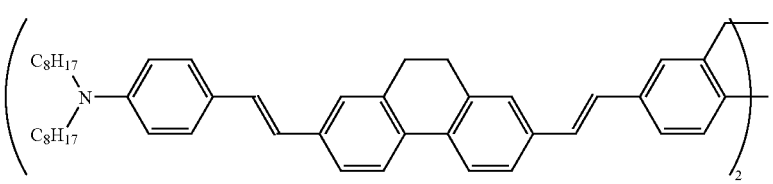
D-209 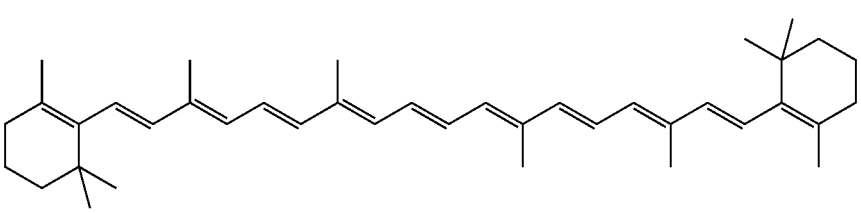
D-210 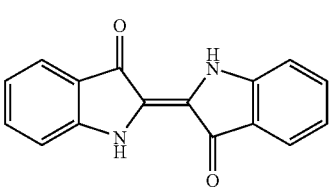
D-211 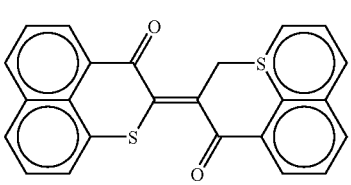
D-212 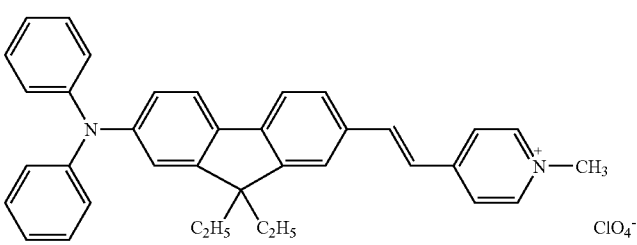

D-213 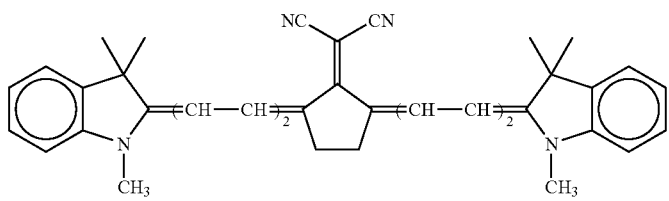
D-214 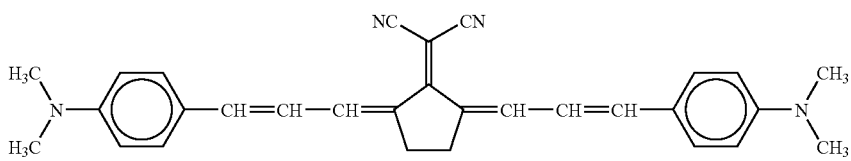
D-215 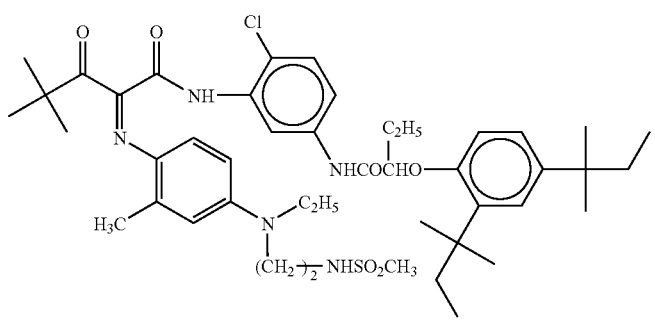
D-216 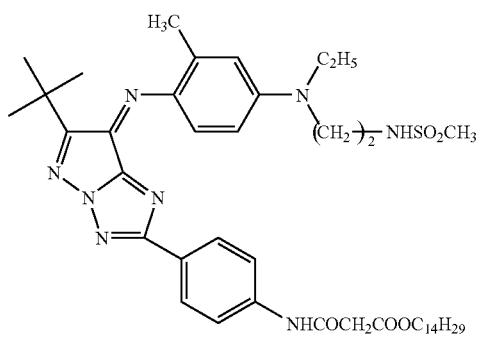
D-217 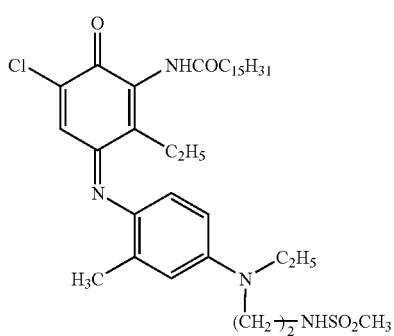

D-218 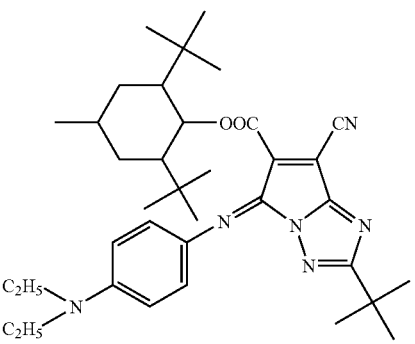

D-219 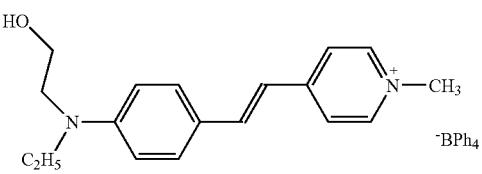

D-220 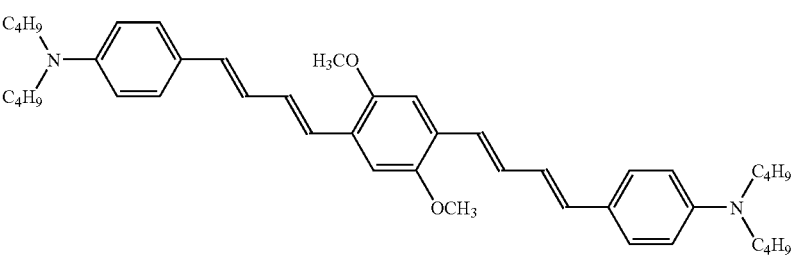

D-221 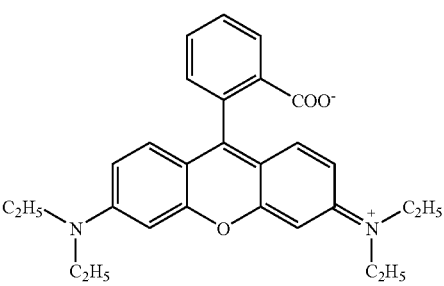

In the second place, the decoloring agent precursors in the present two-photon absorption dye-containing materials are illustrated in detail.

The present decoloring agent precursors are compounds capable of producing decoloring agents by energy transfer or electron transfer from a two-photon absorption dye in the state of excitation by two-photon absorption.

Although the present decoloring agent precursors may be any of compounds capable of performing either of the foregoing functions, it is appropriate that they be selected from radical generators, acid generators, base generators, nucleophilic agent generators, electrophilic agent generators, or triplet-state oxygen. The decoloring agents produced from their precursors are preferably any of radicals, acids, bases, nucleophilic agents, electrophilic agents and singlet-state oxygen.

The decoloring agent precursors preferred in the invention are any of radical generators, acid generators and base generators.

Of the present decoloring agent precursors, those having a radical generator function or an acid generator function or both are illustrated first.

The term "radical generator" as used herein refers to the compounds capable of generating radicals by energy transfer or electron transfer (donation or acceptance of electron) from a two-photon absorption dye in the state of excitation generated by two-photon absorption.

The term "acid generator" as used herein refers to the compounds capable of generating acids (Bronsted acids or Lewis acids) by energy transfer or electron transfer (donation or acceptance of electron) from a two-photon absorption dye in the state of excitation generated by two-photon absorption.

When the present decoloring agent precursors are compounds having a radical generator function or an acid generator function or both, it is preferable that they are any of:
1) ketone radical generators,
2) organic peroxide radical generators,
3) bisimidazole radical generators,
4) trihalomethyl-substituted triazine radical-and-acid generators, 5) diazonium salt radical-and-acid generators,
6) diaryliodonium salt radical-and-acid generators,
7) sulfonium salt radical-and-acid generators,
8) borate radical generators,
9) diaryliodonium-organoboron complex radical generators 10) sulfonium-organoboron complex radical generators,
11) cationic two-photon absorption dye-organoboron complex radical generators,
12) anionic two-photon absorption dye-onium salt complex radical generators,
13) metal-arene complex radical-and-acid generators, and
14) sulfonate acid generators.

Incidentally, the radical generators (11) and (12) also function as two-photon absorption dyes.

Suitable examples of generators of the foregoing types are illustrated below.

1) Ketone Radical Generators

Ketone radical generators are preferably aromatic ketones or aromatic diketones.

Suitable examples of radical generators of such ketone types include benzophenone derivatives (such as benzophenone and Michler's ketone), benzoin derivatives (such as benzoin methyl ether, benzoin ethyl ether, α-methylbenzoin, α-allylbenzoin and α-phenylbenzoin), acetoin derivatives (such as acetoin, pivaloin, 2-hydroxy-2-methylpropiophenone and 1-hydroxycyclohexyl phenyl ketone), acyloin ether derivatives (such as diethoxyacetophenone), α-diketone derivatives (such as diacetyl, benzil, 4,4'-dimethoxybenzil, benzildimethylketal, 2,3-bornanedione (camphorquinone), and 2,2,5,5-tetramethyltetrahydro-3,4-furanic acid (imidazoletrione)), xanthone derivatives (such as xanthone), thioxanthone derivatives (such as thioxanthone and 2-chlorothioxanthone), and ketocoumarin derivatives.

Examples of a commercial ketone radical generator include Irgacure 184, Irgacure 651 and Irgacure 907 manufactured by Ciba Geigy, which are represented by the following formulae, respectively:

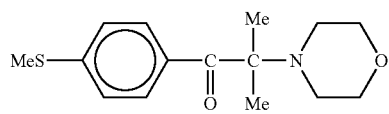
Irgacure 907

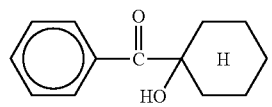
Irgacure 184

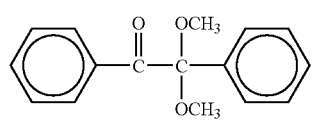
Irgacure 651

Other examples of suitable ketone radical generators include quinone radical generators (such as 9,10-anthraquinone, 1-chloroanthraquinone, 2-chloroanthraquinone, 2-methylanthraquinone, 2-ethylanthraquinone, 2-t-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinOne, 2,3-dichloronaphthoquinone, 1,4-diemthylanthraquinone, 2,3-dimethylqnthraquinone, 2-phenylanthraquinone, sodium anthraquinone-α-sulfonate, 3-chloro-2-methylanthraquinone, retenequinone, 7,8,9,10-tetrahydronaphthacenequinone and 1,2,3,4-tetrahydrobenz(a)anthracene-7,12-dione).

2) Organic Peroxide Radical Generators

Suitable examples of a radical generator of the organic peroxide type include benzoyl peroxide, di-t-butyl peroxide, and 3,3',4,4'-tetra(t-butylperoxycarbonyl)benzophenone described in JP-A-59-189340 and JP-A-60-76503.

3) Bisimidazole Radical Generators

As the bisimidazole radical generators, bis(2,4,5-triphenyl)imidazole derivatives are suitable. Examples thereof include bis(2,4,5-tirphenyl)imidazole, 2-(o-chlorophenyl)-4,5-bis(m-methoxyphenyl)imidazole dimer (CDM-HABI), 1,1'-biimidazole-2,2'-bis(o-chlorophenyl)-4, 4',5,5'-tetraphenyl (o-Cl-HABI), and 1H-imidazole-2,5-bis(o-chlorophenyl)-4-[3,4-dimethoxyphenyl] dimer (TCTM-HABT).

It is appropriate that the bisimidazole radical generators be used in combination with hydrogen donors. Suitable examples of a hydrogen donor include 2-mercaptobenzoxazole, 2-mercaptobenzothiazole and 4-methyl-4H-1,2,4-triazole-3-thiol.

4) Trihalomethyl-Substituted Triazine Radical-and-Acid Generators

The trihalomethyl-substituted triazine radical-and-acid generators are preferably represented by the following formula (11):

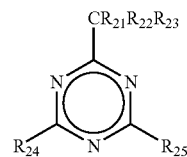

In formula (11), $R_{21}$, $R_{22}$ and $R_{23}$ each independently represents a halogen atom, preferably a chlorine atom. $R_{24}$ and $R_{25}$ each independently represents a hydrogen atom, —$CR_{21}R_{22}R_{23}$ or another substituent (with suitable examples including the same ones as $Za_1$ may have). $R_{24}$ is preferably —$CR_{21}R_{22}R_{23}$, far preferably —$CCl_3$, and $R_{25}$ is preferably —$CR_{21}R_{22}R_{23}$, analkyl group, an alkenyl group or an aryl group.

Examples of a trihalomethyl-substituted triazine radical-and-acid generator include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2-(4'-methoxyphenyl)-4,6-bis(trichloromethyl)-1,3,5-triazine, 2-(4'-trifluoromethylphenyl)-4,6-bis(trichloromethyl)-1,3,5-triazine, 2,4-bis (trichloromethyl)-6-(p-methoxyphenylvinyl) -1,3,5-triazine and 2-(4'-methoxy-1'-naphthyl)-4,6-bis(tri-chloromethyl)-1,3,5-triazine. In addition, the compounds disclosed in U.K. Patent No. 1,388,492 and the compounds disclosed in JP-A-53-133428 are suitable examples of such a radical-and-acid generator.

5) Diazonium Salt Radical-and-Acid Generators

The diazonium salt radical-and-acid generators are preferably represented by the following formula (12):

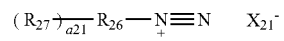

$R_{26}$ represents an aryl group or a heterocyclic group (with suitable examples including the same ones as in the case of $Za_1$), preferably an aryl group, far preferably a phenyl group.

$R_{27}$ represents a substituent (with suitable examples including the same substituents as $Za_1$ may have). a21 represents an integer of 0 to 5, preferably an integer of 0 to 2. When a21 is 2 or above, two or more $R_{27}$s may be the same or different, and they may combine with each other to form a ring.

$X_{21}^-$ is an anion forming an acid $HX_{21}$ having pKa (in 25° C. water) of 4 or below, preferably 3 or below, far preferably 2 or below, with suitable examples including chloride, bromide, iodide, tetrafluoroborate, hexafluorophosphate, hexafluoroarsenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate and tosylate.

Examples of a radical-and-acid generator of the diazonium salt type include the salts formed from the diazonium, such as benzenediazonium, 4-methoxydiazonium and 4-methyldiazonium; and the anions $X_{21}^-$ recited above.

6) Diaryliodonium Salt Radical-and-Acid Generators

The diaryliodonium salt radical-and-acid generators are preferably represented by the following formula (13):

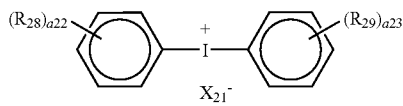

In formula (13), $X_{21}^-$ has the same meaning as in formula (12). $R_{28}$ and $R_{29}$ independently represent a substituent (with suitable examples including the same substituents as $Za_1$ may have), preferably an alkyl group, an alkoxy group, a halogen atom, a cyano group or a nitro group.

a22 and a23 independently represent an integer of 0 to 5, preferably 0 or 1. When a22 or a23 is 2 or above, two or more $R_{28}$s or two or more $R_{29}$s may be the same or different, and they may combine with each other to form a ring.

Examples of a radical-and-acid generator of the diaryliodonium salt type include the salts formed from diphenyliodoniums, such as diphenyliodonium, 4,4'-dichlorodiphenyliodonium, 4,4'-dimethoxydiphenyliodonium, 4,4'-dimethyldiphenyliodonium, 4,4'-di-t-butyldiphenyliodonium, 3,3'-dinitrodiphenyliodonium, phenyl(p-methoxyphenyl)iodonium and bis(p-cyanophenyl)iodonium; and anions such as chloride, bromide, iodide, tetrafluoroborate, hexafluorophosphate, hexafluoroarsenate, hexafluoroantimonate, perchlorate, trifluoromethanesulfonate, 9,10-dimethoxyanthracene-2-sulfonate, methanesulfonate, benzenesulfonate, 4-trifluoromethylbenzenesulfonate, tosylates, tetra(pentafluorophenyl)phorate, perfluorobutanesulfonate and pentafluorobenzenesulfonate.

Other examples of a radical-and-acid generator of this type include the compounds described in *Macromolecules*, vol. 10, p. 1307 (1977), and the diaryliodonium salts disclosed in JP-A-1-287105 and Japanese Application No. 3-5569.

7) Sulfonium Salt Radical-and-Acid Generators

The sulfonium salt radical-and-acid generators are preferably represented by the following formula (14):

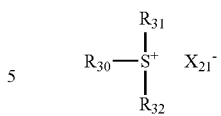

In formula (14), $X_{21}^-$ has the same meaning as in formula (12). $R_{30}$, $R_{31}$, $R_{32}$ each independently represents an alkyl group, an aryl group or a heterocyclic group (with suitable examples including the same ones as in the case of $Za_1$), preferably an alkyl group, a phenacyl group or an aryl group.

Examples of a radical-and-acid generator of the sulfonium salt type include the salts formed from sulfoniums, such as triphenylsulfonium, diphenylphenacylsulfonium, dimethylphenacylsulfonium, benzyl-4-hydroxyphenylmethylsulfonium, 4-t-butyltriphenylsulfonium, tris(4-methylphenyl)sulfonium, tris(4-methoxyphenyl)sulfonium and 4-thiophenyltriphenylsulfonium; and anions such as chloride, bromide, tetrafluoroborate, hexafluqrophosphate, hexafluoroarsenate, hexafluoroantimonate, perchlorate, trifluoromethanesulfonate, 9,10-dimethoxyanthracene-2-sulfonate, methanesulfonate, benzensulfonate, 4-trifluoromethylbenzenesulfonate, tosylates, tetra(pentafluorophenyl)phorate, perfluorobutanesulfonate and pentafluorobenzenesulfonate.

8) Borate Radical Generators

The borate radical generators are preferably represented by the following formula (15):

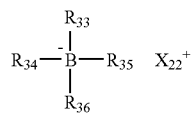

In formula (15), $R_{33}$, $R_{34}$, $R_{35}$ and $R_{36}$ each independently represents an alkyl group, an alkenyl group, an alkynyl group, a cycloalkyl group or an aryl group (with suitable examples including the same ones as in the case of $Za_1$), preferably an alkyl group, or an aryl group, provided that cases where all of $R_{33}$, $R_{34}$, $R_{35}$ and $R_{36}$ represent aryl groups are excluded. $X_{22}^+$ represents a cation.

Among the compounds of the above formula, the cases where all of $R_{33}$, $R_{34}$ and $R_3$s are aryl groups and $R_{36}$ is an alkyl group (specifically triphenylalkylborate radical generators) are preferable, and the case where $R_{33}$, $R_{34}$ and $R_{35}$ are phenyl groups and $R_{36}$ is a t-butyl group is preferred by far.

Examples of a radical generator of the borate type include tetrabutylammonium n-butyltriphenylborate, and tetramethylammonium sec-butyltriphenylborate.

9) Diaryliodonium-Organoboron Complex Radical Generators

The diaryliodonium-organoboron complex radical generators are preferably represented by the following formula (16):

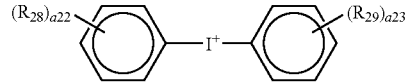

-continued

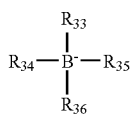

In formula (16), $R_{28}$, $R_{29}$, a22 and a23 have the same meanings as those in formula (13), respectively, and $R_{33}$, $R_{34}$, $R_{35}$ and $R_{36}$ have the same meanings as those in formula (15), respectively.

Examples of a radical generator of the diaryliodonium-organoboron complex type include the following compounds I-1, I-2 and I-3;

I-1
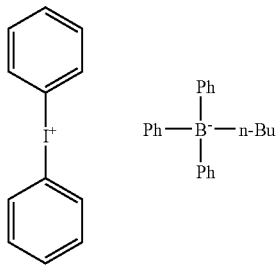

I-2
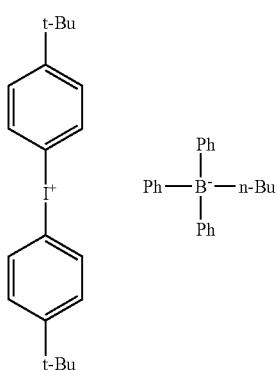

I-3
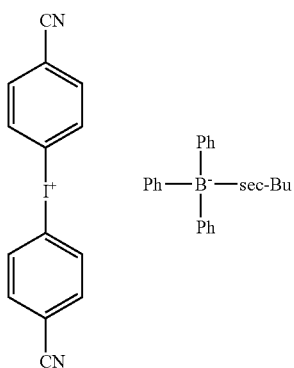

In addition to the above compounds, the diphenyliodonium (n-butyl)triphenylborates disclosed in JP-A-3-704 are also suitable examples of a radical generator of the iodonium-organoboron complex type.

10) Sulfonium-Organoboron Complex Radical Generators

The sulfonium-organoboron complex radical generators are preferably represented by the following formula (17):

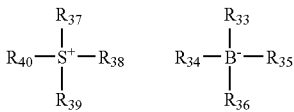

In formula (17), $R_{33}$, $R_{34}$, $R_{35}$ and $R_{36}$ have the same meanings as in formula (15), respectively. $R_{37}$, $R_{38}$ and $R_{39}$ independently represent an alkyl group, an aryl group, an alkenyl group, an alkynyl group, a cycloalkyl group, an alkoxy group, an aryloxy group, an alkylthio group, an arylthio group or an amino group (with suitable examples including the same ones as in the case of $Za_1$), preferably an alkyl group, a phenacyl group, an aryl group or an alkenyl group. Further, $R_{37}$, $R_{38}$ and $R_{39}$ may combine with each other to form a ring. $R_{40}$ represents an oxygen atom or a lone pair of electrons.

Examples of a radical generator of the sulfonium-organoboron complex type include the following compounds I-4 to I-10:

I-4
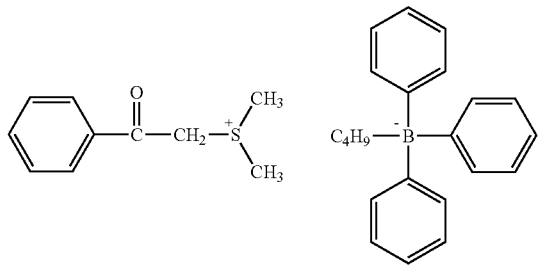

I-5
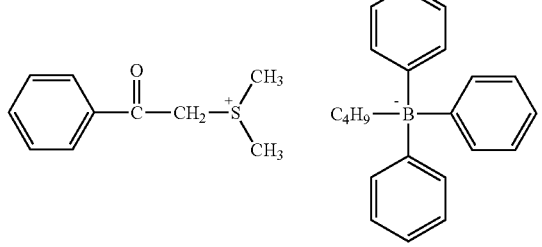

I-6
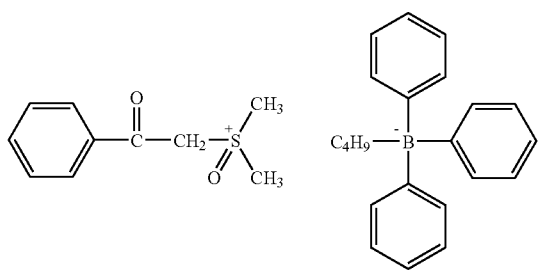

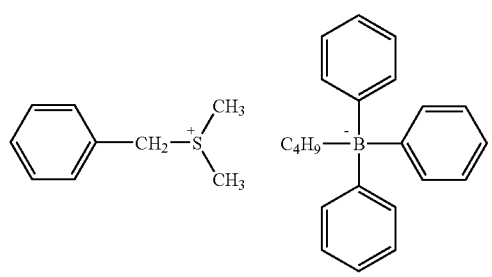

I-7

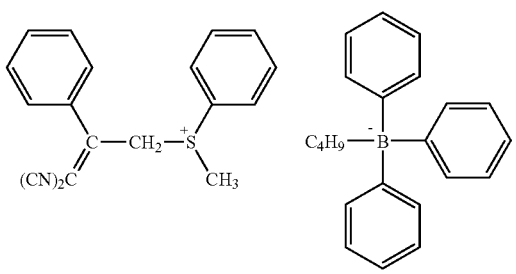

I-10

In addition to the above compounds, the sulfonium-organoboron complexes disclosed in JP-A-5-255347 and JP-A-5-213861 are also suitable examples.

11) Cationic Two-Photon Absorption Dye-Organoboron Complex Radical Generators

When the present generators are cationic two-photon absorption dye-organoboron complex radical generators, the cationic two-photon absorption dyes may function as the present two-photon absorption dyes.

The cationic two-photon absorption dye-organoboron complex radical generators are preferably represented by the following formula (18):

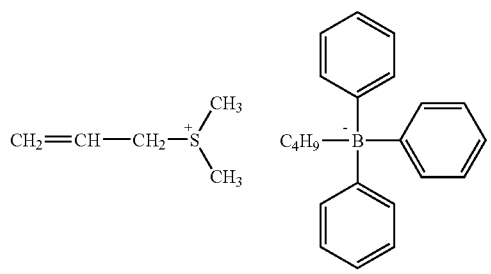

I-8

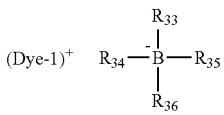

I-9

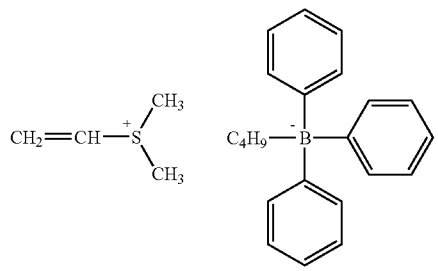

In formula (18), (Dye-1)$^+$ is a cationic dye capable of making off-resonant two-photon absorption, and suitable examples thereof are included in the foregoing exemplifications of the present dyes. $R_{33}$, $R_{34}$, $R_{35}$ and $R_{36}$ have the same meanings as in formula (15), respectively.

Examples of a radical generator of the cationic two-photon absorption dye-organoboron complex type include the following compounds I-11 to I-14:

I-11

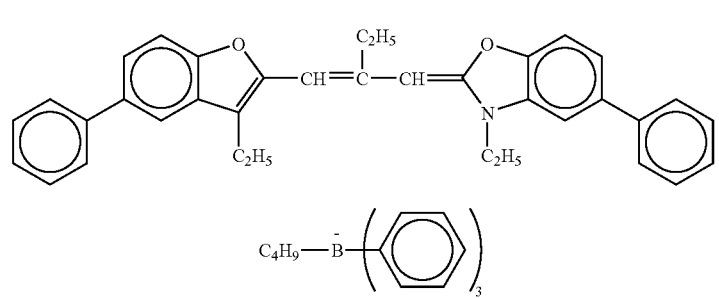

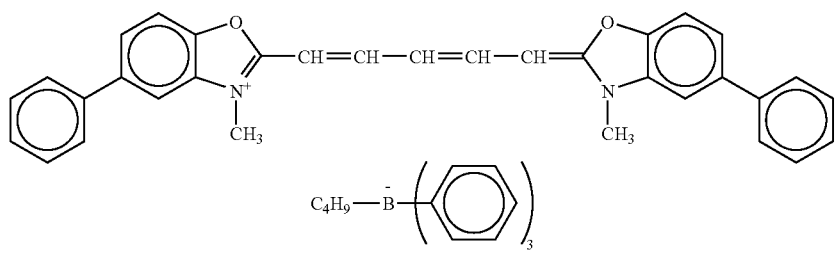

I-12

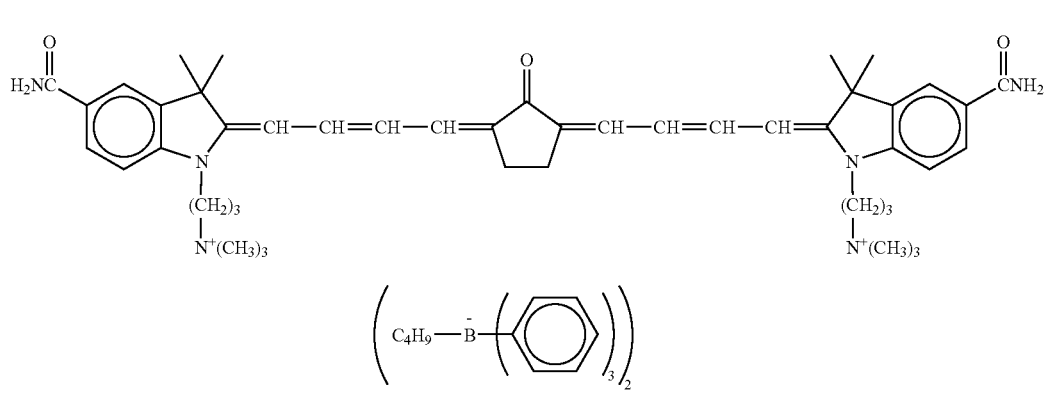

I-13

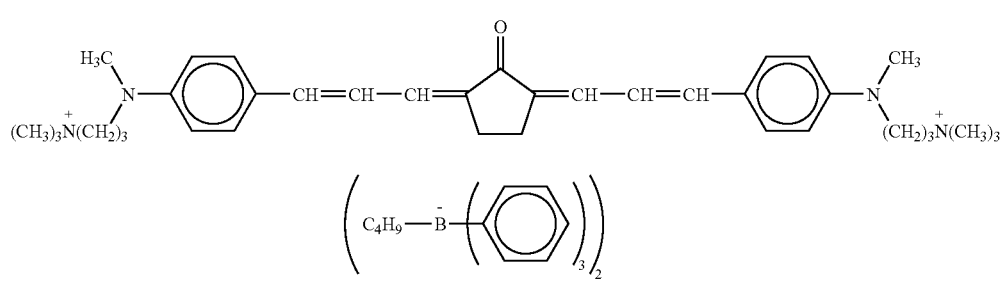

I-14

In addition to the above compounds, the cationic dye-borate anion complexes disclosed in JP-A-62-143044 and JP-A-62-150242 are also suitable examples.

12) Anionic Two-Photon Absorption Dye-Onium Salt Complex Radical Generators

When the present generators are anionic two-photon absorption dye-onium salt complex radical generators, the anionic two-photon absorption dyes may function as the present two-photon absorption dyes.

The anionic two-photon absorption dye-onium salt complex radical generators are preferably represented by the following formula (19):

(Dye-2)⁻X₂₃⁺

In formula (19), (Dye-2)⁻ is an anionic dye capable of making off-resonant two-photon absorption, and suitable examples thereof are included in the foregoing exemplifications of the present dyes. $X_{23}^+$ represents a cationic part of the diazonium salt of formula (12), a cationic part of the diaryliodonium salt of formula (13), or a cationic part of the sulfonium salt of formula (14) (suitable examples of each cationic part are those which are mentioned above), preferably a cationic part of the diaryliodonium salt of formula (13) or a cationic part of the sulfonium salt of formula (14).

Examples of a radical generator of the anionic two-photon absorption dye-onium salt complex type include the following compounds I-15 to I-32:

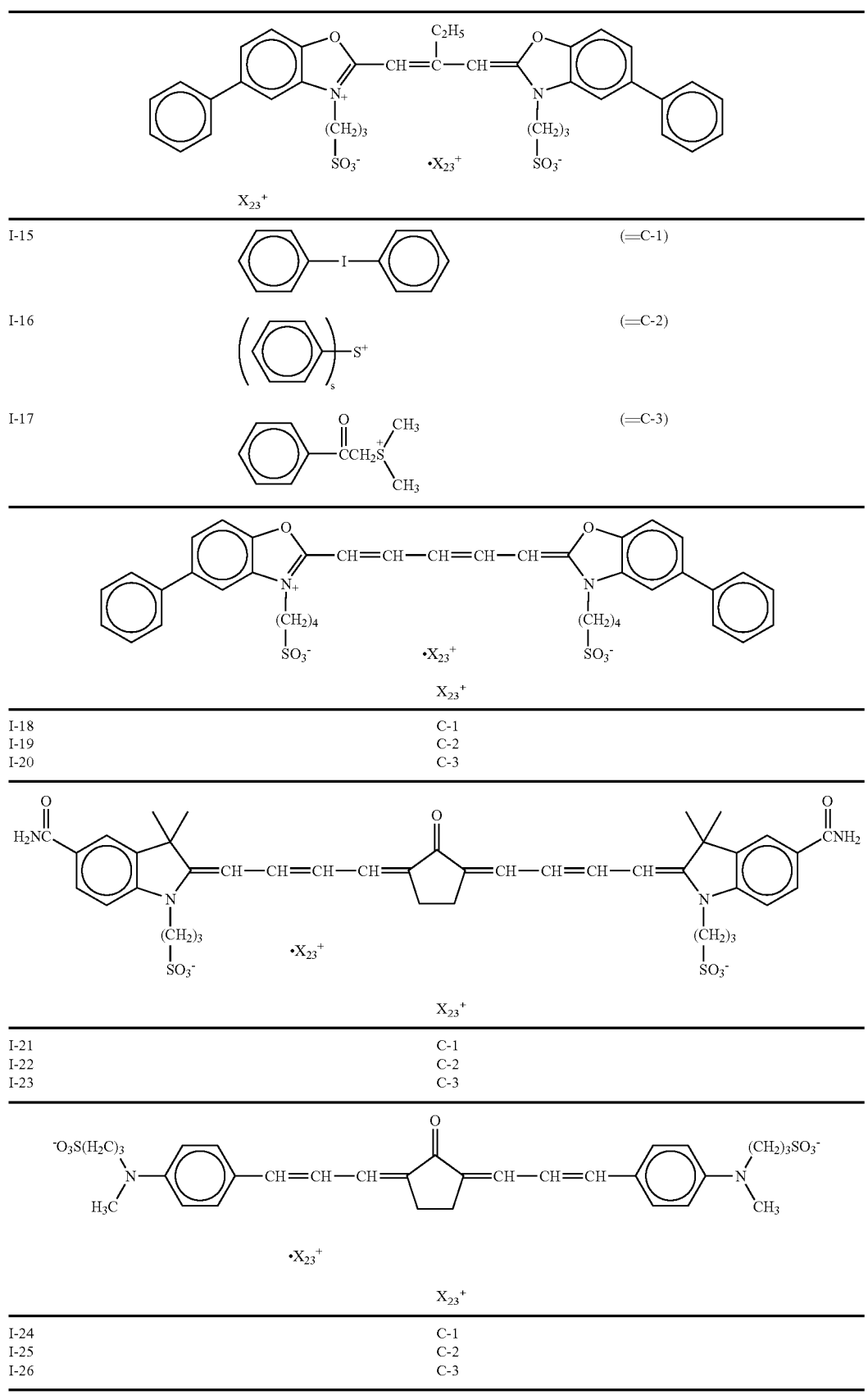

-continued

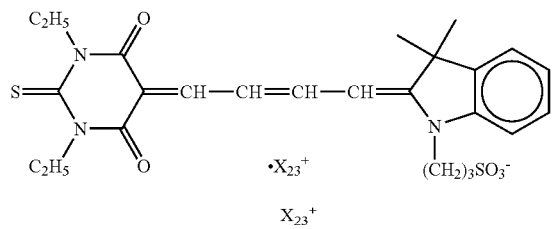

| | $X_{23}^+$ |
|---|---|
| I-27 | C-1 |
| I-28 | C-2 |
| I-29 | C-3 |

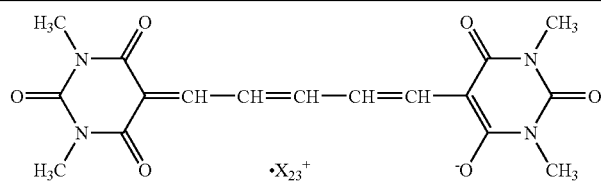

| | $X_{23}^+$ |
|---|---|
| I-30 | C-1 |
| I-31 | C-2 |
| I-32 | C-3 |

13) Metal-Arene Complex Radical-and-Acid Generators

The metal in metal-arene complex radical-and-acid generators is preferably iron or titanium. Suitable examples of such complexes include the iron-arene complexes disclosed in JP-A-1-54440, European Patent Nos. 109851 and 126712, and *Journal of Imaging Science*, vol. 30, p. 174 (1986); the iron arene-organoboron complexes described in *Organometallics*, vol. 8, p. 2737 (1989); and titacenones disclosed in JP-A-61-15197.

14) Sulfonate Acid Generators

Acid generators of the sulfonate type include sulfonic acid esters, imidosulfonate and p-nitrobenzyl arylsulfonates.

More specifically, these generators include benzoin tosylate, pyrogallol trimesylate, o-nitrobenzyl tosylate, 2,6-dinitrobenzyl tosylate, N-tosylphthalimide, α-cyanobenzylidenetosylamine and p-nitrogenzyl-9,10-diethoxyanthracene-2-sulfonate.

15) Other Radical or Acid Generators

Examples of radical or acid generators other than those classified under 1) to 14) groups include organic azide compounds such as 4,4'-diazidochalcone, aromatic carboxylic acids such as N-phenylglycine, polyhalogenated compounds such as $CI_4$, $CHI_3$ and $CBrCl_3$, phenylisooxazolone, silanol-aluminum complex, and the aluminate complexes disclosed in JP-A-3-209477.

Herein, the present radical or acid generators may be classified under three groups, a) radical generators capable of generating radicals, b) acid generators capable of generating acids and c) radical-and-acid generators capable of generating radicals and acids simultaneously.

Suitable examples of a) radical generators capable of generating radicals include:
  1) ketone radical generators,
  2) organic peroxide radical generators,
  3) bisimidazole radical generators,
  4) trihalomethyl-substituted triazine radical generators,
  5) diazonium salt radical generators,
  6) diaryliodonium salt radical generators,
  7) sulfonium salt radical generators,
  8) borate radical generators,
  9) diaryliodonium-organoboron complex radical generators,
  10) sulfonium-organoboron complex radical generators,
  11) cationic two-photon absorption dye-organoboron complex radical generators,
  12) anionic two-photon absorption dye-organoboron complex radical generators, and
  13) metal-arene complex radical generators.

More suitable examples of the radical generators a) include:
  1) ketone radical generators,
  3) bisimidazole radical generators,
  4) trihalomethyl-substituted triazine radical generators,
  6) diaryliodonium salt radical generators,
  7) sulfonium salt radical generators,
  11) cationic two-photon absorption dye-organoboron complex radical generators, and
  12) anionic two-photon absorption dye-organoboron complex radical generators.

Most suitable examples of the radical generators a) include:
  3) bisimidazole radical generators,
  6) diaryliodonium salt radical generators,
  7) sulfonium salt radical generators,
  11) cationic two-photon absorption dye-organoborqn complex radical generators, and
  12) anionic two-photon absorption dye-organoboron complex radical generators.

Acids generated from b) generators capable of generating acids may be Brönsted acids or Lewis acids. Suitable examples of the acid generators b) include:
  4) trihalomethyl-substituted triazine acid generators,
  5) diazonium salt acid generators,
  6) diaryliodonium salt acid generators,
  7) sulfonium salt acid generators, 13) metal-arene complex acid generators, and 14) sulfonate acid generators.

More suitable examples of the acid generators b) include:

6) diaryliodonium salt acid generators, 7) sulfonium salt acid generators, and 14) sulfonate acid generators.

In addition, the acid generators described, e.g., in *UV CURING; SCIENCE AND TECHNOLOGY*, pp. 23-76, edited by S. Peter Pappas, published by A TECHNOLOGY MARKETING PUBLICATION, and B. Klingert, M. Riediker & A. Roloff, *Comments Inorg. Chem.*, vol. 7, No. 3, pp. 109-138 (1988) can be used.

Suitable examples of c) radical-and-acid generators capable of generating radicals and acids simultaneously include:

4) trihalomethyl-substituted triazine radical-and-acid generators, 5) diazonium salt radical-and-acid generators, 6) diaryliodonium salt radical-and-acid generators, 7) sulfonium salt radical-and-acid generators, and 13) metal-arene complex radical-and-acid generators.

More suitable examples of the radical-and-acid generators c) include:

6) diaryliodonium salt radical-and-acid generators, and 7) sulfonium salt radical-and-acid generators.

When the decoloring agent precursor in the present two-photon absorption dye-containing material is an acid generator, the present two-photon absorption dye-containing material may contain an acid proliferater. Suitable examples of such an acid proliferater include those described in Japanese Patent Application No. 2003-182849.

Next the cases where the present decoloring agent precursors function as base generators are illustrated.

The term "base generator" as used in the invention refers to the compounds capable of generating bases (Brönsted bases or Lewis bases) by energy transfer or electron transfer (donation or acceptance of electron) from a two-photon absorption dye in the state of excitation generated by two-photon absorption.

The base generators used in the invention are preferably compounds capable of generating Brönsted bases, preferably generating organic bases. As the organic bases, especially amines are suitable.

The present base generators are preferably represented by the following formulae (21-1) to (21-4):

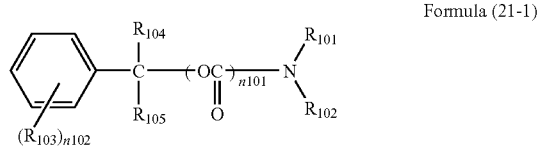

Formula (21-1)

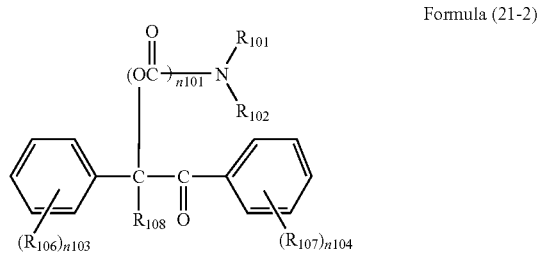

Formula (21-2)

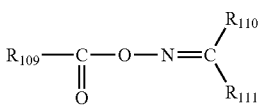

Formula (21-3)

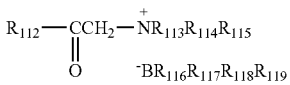

Formula (21-4)

In formulae (21-1) and (21-2) each, $R_{101}$, and $R_{102}$ each independently represents a hydrogen atom, an alkyl group (preferably a 1-20C alkyl group, such as methyl, ethyl, n-propyl, isopropyl, n-butyl, n-pentyl, n-octadecyl, benzyl, 3-sulfopropyl, 4-sulfobutyl, carboxymethyl or 5-carboxypentyl), analkenyl group (preferably a 2-20C alkenyl group, such as vinyl, allyl, 2-butenyl or 1,3-butadienyl), a cycloalkyl group (preferably a 3-20C cycloalkyl group, such as cyclopentyl or cyclohexyl), an aryl group (preferably a 6-20C aryl group, such as phenyl, 2-chlorophenyl, 4-methoxyphenyl, 3-methylphenyl, 1-naphthyl or 2-naphthyl) or a heterocyclic group (preferably a 1-20C heterocyclic group, such as pyridyl, thienyl, furyl, thiazolyl, imidazolyl, pyrazolyl, pyrrolidino, piperidino or morpholino), preferably a hydrogen atom, an alkyl group or a cycloalkyl group, far preferably a hydrogen atom, a methyl group, an ethyl group, a cyclohexyl group or a cyclopentyl group.

On the other hand, $R_{101}$ and $R_{102}$ may combine with each other to form a ring. The heterocyclic ring formed herein is preferably a piperidine ring, a pyrrolidine ring, a piperazine ring, a morpholine ring, a pyridine ring, a quinoline ring or an imidazole ring, far preferably a piperidine ring, a pyrrolidine ring or an imidazole ring, particularly preferably a piperidine ring.

Suitable examples of a combination of $R_{101}$ and $R_{102}$ include the combination of $R_{101}$ as an unsubstituted or substituted cyclohexyl group and $R_{102}$ as a hydrogen atom, the combination of $R_{101}$ as an unsubstituted or substituted alkyl group and $R_{102}$ as a hydrogen atom and the $R_{101}$-$R_{102}$ combination forming a piperidine or imidazole ring.

In formulae (21-1) and (21-2) each, n101 is 0 or 1, preferably 1.

In formula (21-1), $R_{103}$ represents a substituent, with suitable examples including an alkyl group (preferably a 1-20C alkyl group, such as methyl, ethyl, n-propyl, isopropyl, n-butyl, n-pentyl, benzyl, 3-sulfopropyl, 4-sulfobutyl, carboxymethyl or 5-carboxypentyl), analkenyl group (preferably a 2-20C alkenyl group, such as vinyl, allyl, 2-butenyl or 1,3-butadienyl), a cycloalkyl group (preferably a 3-20C cycloalkyl group, such as cyclopentyl or cyclohexyl), an aryl group (preferably a 6-20C aryl group, such as phenyl, 2-chlorophenyl, 4-methoxyphenyl, 3-methylphenyl or 1-naphthyl), a heterocyclic group (preferably a 1-20C heterocyclic group, such as pyridyl, thienyl, furyl, thiazolyl, imidazolyl, pyrazolyl, pyrrolidino, piperidino or morpholino), an alkynyl group (preferably a 2-20C alkynyl group, such as ethynyl, 2-propynyl, 1,3-butadienyl or 2-phenylethynyl), a halogen atom (e.g., F, Cl, Br, I), an amino group (preferably a 0-20C amino group, such as amino, dimethylamino, diethylamino, dibutylamino or anilino), a cyano group, a nitro group, a hydroxyl group, a mercapto group, a carboxyl group, a sulfo group, a phosphono group, an acyl group (preferably a 1-20C acyl group, such as acetyl, benzoyl, salicyloyl or pivarolyl), an alkoxy group (preferably a 1-20C alkoxy group, such as methoxy, butoxy or cyclohexyloxy), an aryloxy group (preferably a 6-26C aryloxy group, such as phenoxy or 1-naphthoxy), an alkylthio group (preferably a 1-20C alkylthio group, such as methylthio or ethylthio), an arylthio group (preferably a 6-20C arylthio group, such as phenylthio or 4-chlorophenylthio), an alkylsulfonyl group (preferably a 1-20C alkylsulfonyl group, such as methanesulfonyl or butanesulfonyl), an arylsulfonyl group (preferably a 6-20C arylsulfonyl group, such as benzenesulfonyl or p-toluenesulfonyl), a sulfamoyl group (preferably a 0-20C sulfamoyl group, such as sulfamoyl, N-methylsulfamoyl or N-phenylsulfamoyl), a carbamoyl group (preferably a 1-20C carbamoyl group, such as carbamoyl, N-methylcarbamoyl, N,N-dimethylcarbamoyl or N-phenylcarbamoyl), an acylamino group (preferably a 1-20C acylamino group, such as acetylmino orbenzoylamino), an imino group (preferably a 2-20C imino group, such as phthalimino), an acyloxy group (preferably a 1-20C acyloxy group, such as acetyloxy or benzoyloxy), an alkoxycarbonyl group (preferably a 2-20C alkoxycarbonyl group, such as methoxycarbonyl orb phenoxycarbonyl) and a carbamoylamino group (preferably a 1-20C carbamoylamino group, such as carbamoylamino, N-methylcarbamoylamino or N-phenylcarbamoylamino). Of these substituents, an alkyl group, an aryl group, a heterocyclic group, a halogen atom, an amino group, a cyano group, a nitro group, a carboxyl group, a sulfo group, an alkoxy group, an alkylthio group, an arylsulfonyl group, a sulfamoyl group, a carbamoyl group or an alkoxycarbonyl group is preferred.

In formula (21-1), $R_{103}$ is preferably a nitro group or an alkoxy group, far preferably a nitro group or a methoxy group, particularly preferably a nitro group.

In formula (21-1), n102 is an integer of 0 to 5, preferably an integer of 0 to 3, far preferably 1 or 2. When n102 is 2 or above, two or more $R_{103}$s may be the same or different, and they may combine with each other to form a ring, preferably a benzene ring or a naphthalene ring.

When $R_{103}$ in formula (21-1) is a nitro group, the nitro group is preferably situated at the 2-position or the 2- and 6-positions. When the $R_{103}$ is an alkoxy group, on the other hand, the alkoxy group is preferably situated at the 3- and 5-positions.

In formula (21-1), $R_{104}$ and $R_{105}$ each independently represents a hydrogen atom or a substituent (suitable examples of which are the same as those of a substituent represented by $R_{103}$), preferably a hydrogen atom, an alkyl group or an aryl group, far preferably a hydrogen atom, a methyl group or a 2-nitrophenyl group.

Suitable examples of a combination of $R_{104}$ and $R_{105}$ include the combination of a hydrogen as $R_{104}$ and a hydrogen atom as $R_{105}$, the combination of a methyl group as $R_{104}$ and a hydrogen atom as $R_{105}$, the combination of a methyl group as $R_{104}$ and a methyl group as $R_{105}$, and the combination of a 2-nitrophenyl group as $R_{104}$ and a hydrogen atom as $R_{105}$, preferably the combination of a hydrogen atom as $R_{104}$ and a hydrogen atom as $R_{105}$.

In formula (21-2), $R_{106}$ and $R_{107}$ each represents a substituent (suitable examples of which are the same as those of a substituent represented by $R_{103}$), preferably an alkoxy group, an alkylthio group, a nitro group organ alkyl group, preferably a methoxy group.

In formula (21-2), n103 and n104 independently represent an integer of 0 to 5, preferably an integer of 0 to 2. When n103 and n 104 are each 2 or above, two or more $R_{106}$s or two or more $R_{107}$s may be the same or different, and they may combine with each other to form a ring, preferably a benzene ring or a naphthalene ring.

In formula (21-2), $R_{106}$s are preferably alkoxy groups situated at the 3- and 5-positions, far preferably methoxy groups situated at the 3- and 5-positions.

In formula (21-2), $R_{108}$ represents a hydrogen atom or a substituent (suitable examples of which are the same as those of a substituent represented by $R_{103}$), preferably an alkyl group, an aryl group or an amino group, far preferably an unsubstituted or substituted alkyl group (notably t-butyl group or benzyl group), a phenyl group, an unsubstituted or substituted anilino group or a cyclohexylamino group.

The compound represented by formula (21-3), incidentally, may be attached to a polymer chain via $R_{109}$ to constitute a polymeric compound.

In formula (21-3), $R_{110}$ and $R_{111}$ independently represent a hydrogen atom or a substitutent (suitable examples of which are the same as those of a substituent represented by $R_{103}$), preferably an alkyl group or an aryl group, far preferably a methyl group, a phenyl group or a 2-naphthyl group.

$R_{110}$ and $R_{111}$ may combine with each other to form a ring, preferably a fluorene ring.

In formula (21-4), $R_{112}$ represents an aryl group or a heterocyclic group, preferably the following aryl or heterocyclic group:

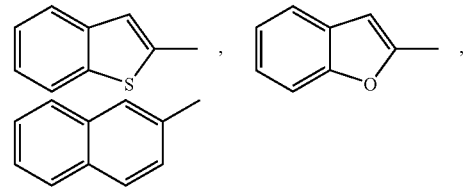

In formula (21-4), $R_{113}$, $R_{114}$ and $R_{115}$ independently represent a hydrogen atom, an alkyl group, an alkenyl group, a cycloalkyl group, an aryl group or a heterocyclic group (suitable examples of these groups are the same as those of the groups $R_{101}$ and $R_{102}$ may represent) preferably an alkyl group, far preferably a butyl group. $R_{113}$, $R_{114}$ and $R_{115}$, incidentally, may combine with each other to form a ring. The hetero ring formed is preferably a piperidine ring, a pyrrolidine ring, a piperazine ring, a morpholine ring, a pyridine ring, a quinoline ring or an imidazole ring, far preferably a piperidine ring, a pyrrolidine ring or an imidazole ring.

In formula (21-4), $R_{116}$, $R_{117}$, $R_{118}$ and $R_{119}$ each independently represents an alkyl group or an aryl group. Herein, it is preferable that all of $R_{116}$, $R_{117}$ and $R_{118}$ are phenyl groups and $R_{119}$ is an n-butyl group.

The base generator for use in the preset invention is a base generator represented preferably by the formula (21-1) or (21-3), far preferably by the formula (21-1).

Suitable examples of the present base generators are illustrated below, but these examples should not be construed as limiting the scope of the invention.

PB-1 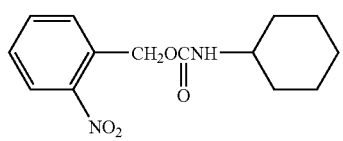
PB-2 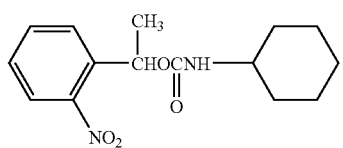
PB-3 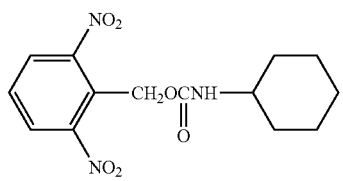
PB-4 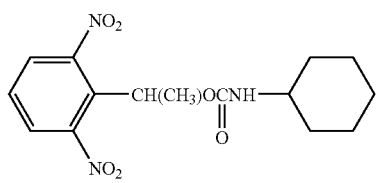
PB-5 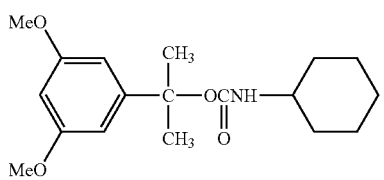
PB-6 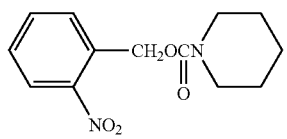
PB-7 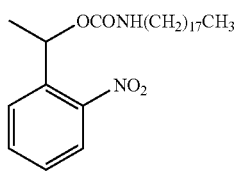
PB-8 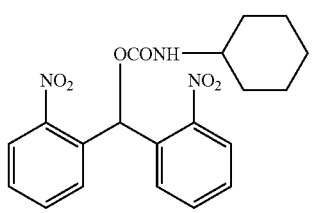

-continued
PB-9
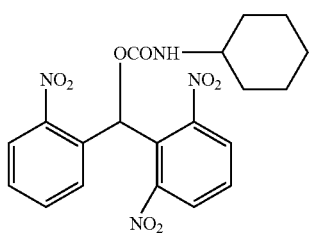
PB-10
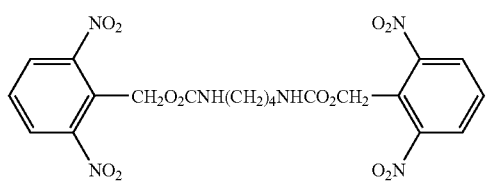
PB-11
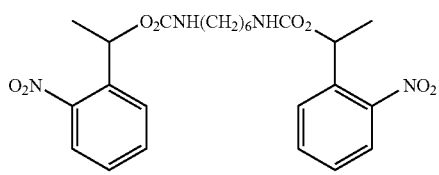
PB-12
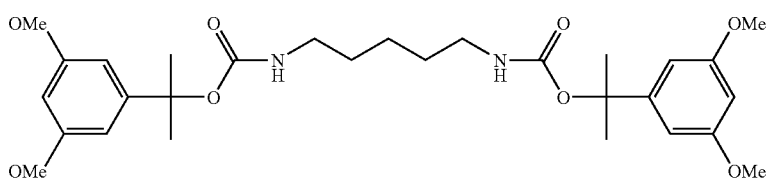
PB-13
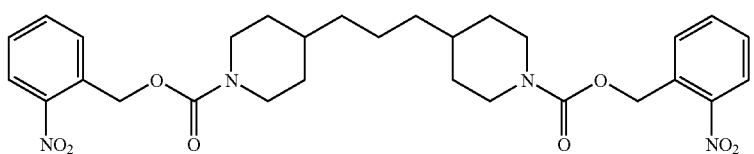
PB-14
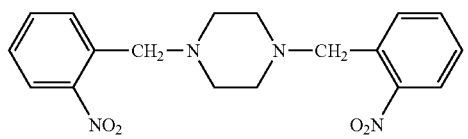
PB-15
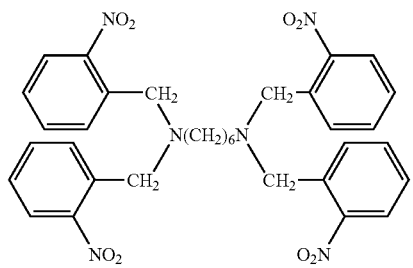

-continued
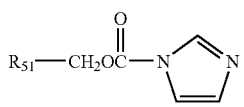
| | $R_{51}$ |
|---|---|
| PB-16 | 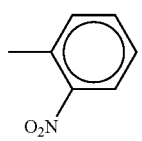 |
| PB-17 | 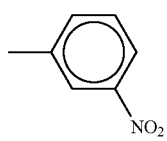 |
| PB-18 | 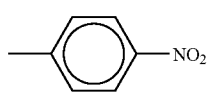 |
| PB-19 | 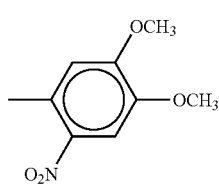 |
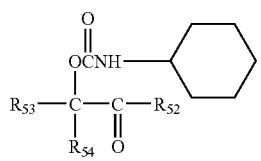
| | $R_{52}$ | $R_{53}$ | $R_{54}$ |
|---|---|---|---|
| PB-20 | 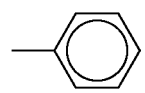 | 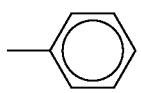 | —H |
| PB-21 | 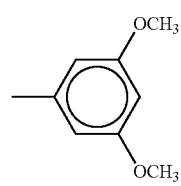 | 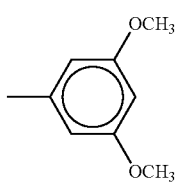 | " |
| PB-22 | 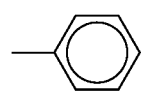 | " | " |
| PB-23 | 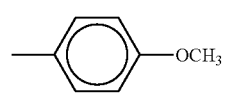 | " | " |
| PB-24 | 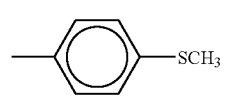 | " | " |

-continued
| | | | |
|---|---|---|---|
| PB-25 | 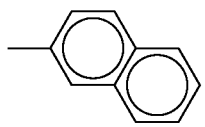 | " | " |
| PB-26 |  | | |
| PB-27 | 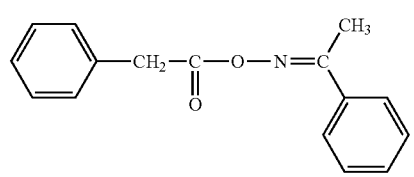 | | |
| PB-28 | 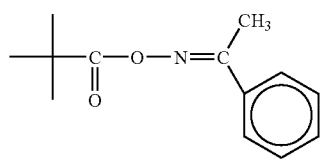 | | |
| PB-29 | 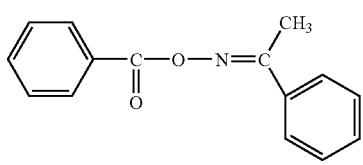 | | |
| PB-30 | 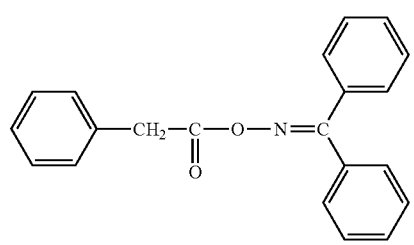 | | |
| PB-31 | 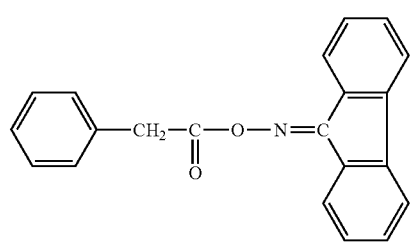 | | |
| PB-32 | 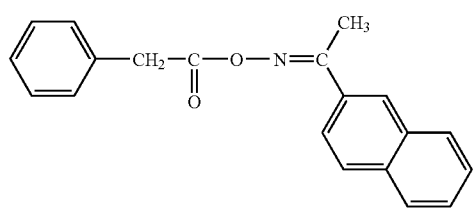 | | |

-continued
PB-33
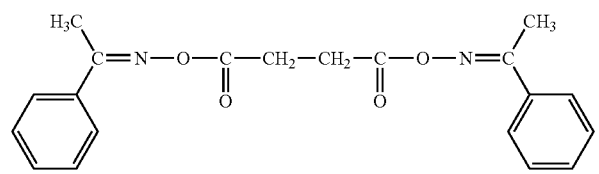
PB-34
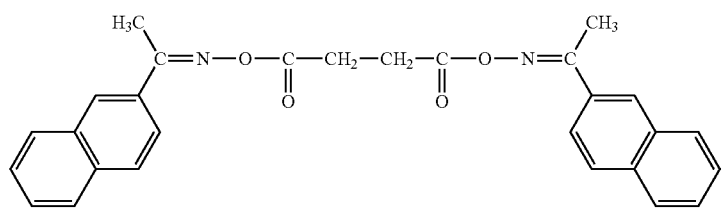
PB-35
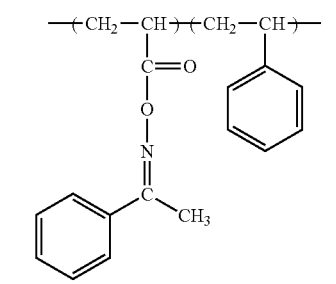
PB-36
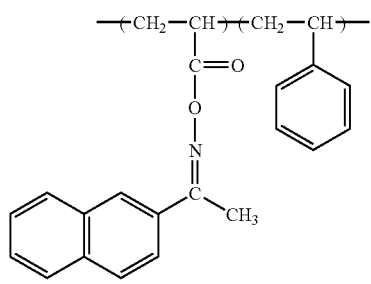
PB-37
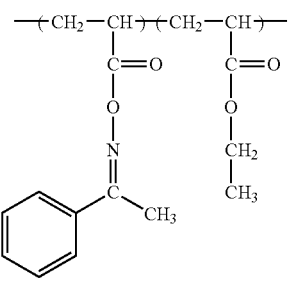
PB-38
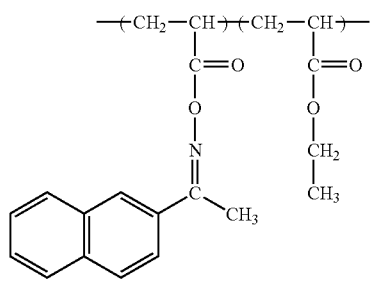

-continued
| | |
|---|---|
| PB-39 | 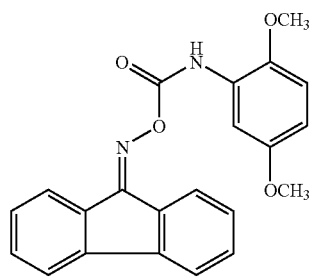 |
| | 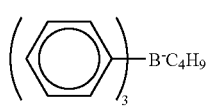 |
| PB-40 | 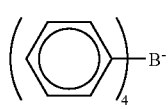 |
| PB-41 | |
| PB-42 |  |
| | 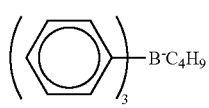 |
| PB-43 | 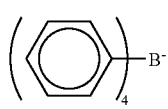 |
| PB-44 | |
| | 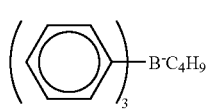 |
| PB-45 | 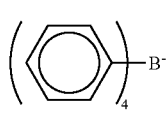 |
| PB-46 | |

-continued
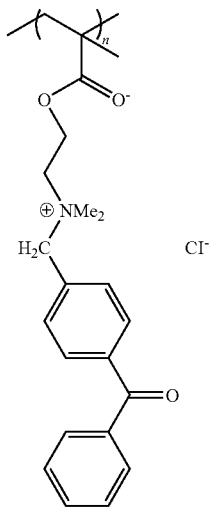
| | |
|---|---|
| PB-47 | 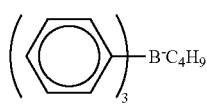 |
| PB-48 | 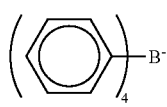 |
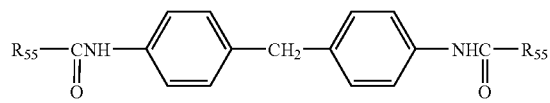
| | $R_{55}$ |
|---|---|
| PB-49 | —H |
| PB-50 | —CH$_3$ |
| PB-51 | 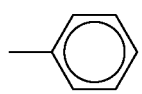 |
| PB-52 | [Co(III)(NH$_3$)$_5$Br](ClO$_4$)$_2$ |
| PB-53 | 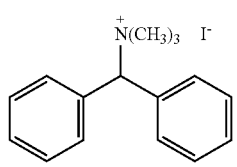 |
| PB-54 | 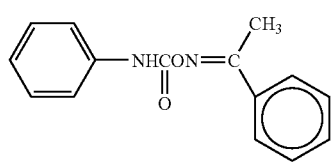 |

-continued

PB-55

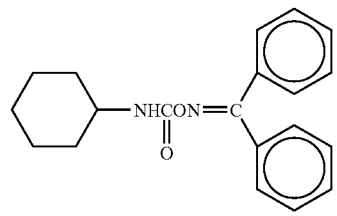

Additionally, these photo-base generators may be used alone or in a condition that two or more of them are mixed in arbitrary proportions, if needed.

When the decoloring agent precursor in the present two-photon absorption dye-containing material is a base generator, the present two-photon absorption dye-containing material may contain a base proliferater. Suitable examples of such a base proliferater include those described in Japanese Patent Application No. 2003-178083.

It is advantageous to use a binder in the present two-photon absorption dye-containing material. Binders are generally used in compositions for the purpose of improving film formability, uniformity of film thickness and storage stability. The binders suitable for use in the invention are those having good compatibility with two-photon absorption dyes and decoloring agent precursors.

As binders used in the invention, thermoplastic polymers soluble in solvents are suitable, and they may be used alone or as combinations of two or more thereof.

Binders may have reactive moieties and, via these reactive moieties, may be cross-linked or cured by undergoing reaction with cross-linking agents or polymerizing monomers or oligomers. When the reaction is radical reaction, suitable examples of such reactive moieties include ethylenic unsaturated groups, notably acryl and methacryl groups. When the reaction is cationic reaction, suitable examples of such reactive moieties include oxirane compounds, oxetane compounds and vinyl ether group. When the reaction is condensation polymerization, suitable examples of such reactive moieties include carboxylic acids, alcohol and amines.

Suitable examples of a binder usable in the invention include acrylic ester and acid polymers and interpolymers prepared from acrylate, α-alkylacrylate, acrylic acid or/and α-alkylacrylic acid (such as polymethylmethacrylate, polyethyl methacrylate, copolymers of methyl metharylate and other alkyl (meth) acrylates), polyvinyl esters (such as polyvinyl acetate, polyvinyl acetate acrylate, polyvinyl acetate methacrylate and partly hydrolyzed polyvinyl acetate), ethylene-vinyl acetate copolymer, saturated and unsaturated polyurethanes, homo- and copolymers of butadiene and isoprene, high molecular weight polyethylene oxide of polyglycol having weight average molecular weight in a range of about 4,000 to about 1,000,000, epoxy compounds (such as epoxy compounds having acrylate or methacrylate groups), polyamides (such as N-methoxymethylpolyhexamethyleneadipamide), cellulose esters (such as cellulose acetate, cellulose acetate succinate and cellulose acetate butyrate), cellulose ethers (such as methyl cellulose, ethyl cellulose and ethylbenzyl cellulose), polycarbonate, polyvinyl acetals (such as polyvinyl butyral and polyvinyl formal), polyvinyl alcohol, polyvinyl pyrrolidone, and the acid-containing homo- and copolymers having appropriate binding functions as disclosed in U.S. Pat. Nos. 3,458,311 and 4,273,857.

Additional examples of a binder usable in the invention include styrene polymers, copolymers of styrene and acrylonitrile, maleic anhydride, acrylic acid, methacrylic acid and/or esters of these acids, vinylidene chloride copolymers (such as vinylidene chloride-acrylonitrile copolymer, vinylidene chloride-methacrylate copolymer and vinylidene chloride-vinyl acetate copolymer), polyvinyl chloride and vinyl chloride copolymers (such as polyvinyl chloride acetate and vinyl chloride-acrylonitrile copolymer), polyvinylbenzal, synthetic rubbers (such as butadiene-acrylonitrile copolymer, acrylonitrile-butadiene-styrene copolymer, methacrylate-acrylonitrile-butadiene-styrene copolymer, 2-chlorobutadiene-1,3 polymers, chlorinated rubber, styrene-butadiene-styrene block copolymer and styrene-isoprene-styrene block copolymer), copolyesters (such as copolyesters produced by reactions of polymethylene glycol (represented by $HO(CH_2)nOH$, wherein n is an integer of 2 to 10) with (1) hexahydrophthalic acid, sebacic acid and terephthalic acid, (2) terephthalic acid, isophthalic acid and sebacic acid, (3) terephthalic acid and sebasic acid, and (4) terephthalic acid and isophthalic acid, and (5) a mixture of copolyesters prepared by reactions of the aforementioned glycol with (i) terephthalic acid, isophthalic acid and sebacic acid and (ii) terephthalic acid, isophthalic acid, sebacic acid and adipic acid), poly-N-vinylcarbazole and copolymers thereof, the carbazole-containing polymers as disclosed in H. Kamogawa, *Journal of Polymer Science: Polymer Chemistry Edition*, vol. 18, pp. 9-18 (1979), and polycarbonates comprising bisphenol and carbonic acid ester.

Further, fluorine-containing high polymers are also suitable as binder shaving low indices of refraction. Favorable ones are organic solvent-soluble polymers which are each prepared from fluoroolefin as an essential constituent and one or more than one unsaturated monomer as a copolymerizing constituent selected from alkyl vinyl ethers, alicyclic vinyl ethers, hydroxyvinyl ethers, olefins, halogenatedolefins, unsaturated carboxylic acids and their esters, or vinyl carboxylates. It is preferable that those polymers have weight average molecular weights of 5,000 to 200,000 and fluorine contents of 5 to 70% by weight.

Examples of fluoroolefins used for preparation of those fluorine-containing polymers include tetrafluoroethylene, chlorotrifluoroethylene, vinyl fluoride and vinylidene fluoride. Examples of the alkyl vinyl ether as a copolymerizing constituent include ethyl vinyl ether, isobutyl vinyl ether and n-butyl vinyl ether. Examples of the alicyclic vinyl ether include cyclohexyl vinyl ether and derivatives thereof, those of the hydroxyvinyl ether include hydroxybutyl vinyl ether, those of the olefin and the halogenated olefin include ethylene, propylene, isobutylene, vinyl chloride and vinylidene chloride, those of the vinyl carboxylate include vinyl acetate and vinyl n-butyrate, and those of the unsaturated carboxylic acid and its ester include unsaturated carboxylic acids such as (meth)acrylic acid and crotonic acid, 1-18C alkyl esters of unsaturated carboxylic acids such as methyl (meth)acrylate, ethyl (meth)acrylate, propyl (meth)acrylate, isopropyl (meth) acrylate, butyl (meth)acrylate, hexyl (meth)acrylate, octyl (meth)acrylate and lauryl (meth)acrylate, 2-8C hydroxyalkyl esters of unsaturated carboxylic acids such as hydroxyethyl (meth) acrylate and hydroxypropyl (meth) acrylate, N,N-dimethylaminoethyl (meth)acrylate and N,N-diethylaminoethyl. (meth)acrylate. These radical polymerizable monomers may be used alone or as combinations of two or more thereof, or part of those monomers may be replaced with other radical polymerizable monomers, e.g., vinyl compounds such as styrene, α-methylstyrene, vinyltoluene and (meth)acrylonitrile. In addition, fluoroolefins containing carboxylic acid groups and vinyl ethers containing glycidyl groups are also usable as other monomer derivatives.

As an example of the aforementioned fluorine-containing high polymer, there is known an organic solvent-soluble fluoropolymer containing hydroxyl groups, LUMIFLON series (e g., LUMIFLON LF200, weight average molecular weight of about 50,000, produced by ASAHI GLASS CO., LTD.). In addition, the organic solvent-soluble fluorine-containing high polymers produced by DAIKIN INDUSTRIES, LTD., CENTRAL GLASS CO., LTD. and Pennwalt Corporation are on the market, and they are also usable polycarbonates comprising bisphenol and carbonic acid ester.

Binders having refractive indices of 1.5 or below are preferably used in the present two-photon absorption dye-containing materials.

Additives, such as a polymerizable monomer, a polymerizable oligomer, a cross-linking agent, a thermal stabilizer, a plasticizer and a solvent, can be used as appropriate in the present two-photo absorption dye decoloring materials.

Examples of a polymerizable monomer, a polymerizable oligomer and a cross-linking agent suitable for use in the present two-photon absorption dye-containing materials include those described in Japanese Patent Application No. 2003-82732.

For the purpose of improving their shelf lives, the present two-photon absorption dye-containing materials can contain a thermal stabilizer as an additive.

Examples of a thermal stabilizer useful for the foregoing purpose include hydroquinone, phenidone, p-methoxyphenol, alkyl- and aryl-substituted hydroquinones and quinones, catechol, t-butylcatechol, pyrogallol, 2-naphthol, 2,6-di-t-butyl-p-cresol, phenothiazine, and chloranil. Additionally, the dinitroso dimers disclosed in U.S. Pat. No. 4,168,982 to Pazos are also useful as thermal stabilizers.

Plasticizers are used for modifying adhesion properties, flexibility, hardness and other mechanical properties of the present two-photon absorption dye-containing materials. Examples of such plasticizers include triethylene glycol dicaprylate, triethylene glycol bis(2-ethylhexanoate), tetraethylene glycol diheptanoate, diethyl sebacate, dibutyl suberate, tris(2-ethylhexyl) phosphate, tricresyl phosphate and dibutyl phthalate.

The present two-photon absorption dye-containing materials maybe prepared in usual manners. For instance, they can be prepared by admixing the aforementioned essential ingredients and arbitrary ingredients as they are, or together with a solvent as required.

Examples of such a solvent include ketone solvents, such as methyl ethyl ketone, methyl iosobutyl ketone, acetone and cyclohexanone; ester solvents, such as ethyl acetate, butyl acetate, ethylene glycol diacetate, ethyl lactate and cellosolve acetate; hydrocarbon solvents, such as cyclohexane, toluene and xylene; ether solvents, such as tetrahydrofuran, dioxane and diethyl ether; cellosolve solvents, such as methyl cellosolve, ethyl cellosolve, butyl cellosolve and dimethyl cellosolve; alcohol solvents, such as methanol, ethanol, n-propanol, 2-propanol, n-butanol and diacetone alcohol; fluorine solvents, such as 2,2,3,3-tetrafluoropropanol; halogenated hydrocarbon solvents, such as dichloromethane, chloroform and 1,2-dichloroethane; and amide solvents, such as N,N-dimethylformamide, nitrile solvents, such as acetonitrile and propionitrile.

The present two-photon absorption dye-containing materials can be applied directly to supports, or can be deposited using a spin coating technique, or can be cast into films and then laminated on supports in usual manners. Used solvents can be evaporated and removed at the time of drying.

In general the refractive index of a two-photon absorption dye has a high value from the vicinity of the linear absorption maximum wavelength ($\lambda$max) to a wavelength region longer than the $\lambda$max, and it has a very high value from the $\lambda$max to the wavelength region longer than $\lambda$max by the order of 200 nm in particular. In such a range, some dyes have refractive indices higher than 2, or exceeding even 2.5.

On the other hand, the refractive indices of decomposition or reaction products of two-photon absorption dyes and organic compounds other than dyes, such as binders, are generally of the order of 1.4-1.6.

When decoloring is caused by excitation energy gained from two-photon absorption in accordance with the methods as mentioned hereinbefore, there occurs a large refractive-index difference between the laser focused region (recorded region) and the out-of-focus region (unrecorded region), and refractive index modulation with a very high spatial resolution can take place at arbitrary positions in three-dimensional space.

As a result, laser irradiation of the recorded materials enables reproduction (playback) by reflectivity or transmittance changes based on the refractive-index modulation, and it becomes possible to apply the present decoloring materials to three-dimensional optical recording medium regarded as the ultimate high-density recording medium. Incidentally, it is appropriate that the reproduction be performed by reading reflectivity changes under irradiation with light of wavelengths in the region of which the two-photon absorption dyes have their individual maximum refractive indices, namely their respective long wavelength ends of linear absorption spectra.

Moreover, the present two-photon absorption dye-containing materials are practicable because the information recorded therein can be read nondestructively and kept for long time in a good condition since they are irreversible materials. In particular, they offer promise of application to write-once (recordable) three-dimensional optical recording medium.

In addition to such an application, the present two-photon absorption dye-containing materials are applicable to three-dimensional displays.

The information recorded in the three-dimensional optical recording medium in accordance with the invention can be reproduced by taking advantage of not only refractive-index modulation but also absorption-index differences between recorded (decolored) and unrecorded (unreacted two-photon absorption dye) regions. And the present two-photon absorption dye-containing materials can also offer three-dimensional displays utilizing such absorption-index differences.

It is preferable that the present two-photon absorption dye-containing materials are decolored by taking advantage of two-photon absorption induced by irradiation with laser light of wavelengths free of linear absorption as well as longer than linear absorption wavelength bands of the two-photon absorption dyes.

Laser suitable for use in the invention, though it has no particular restriction, includes solid laser and fiber laser having their center lasing wavelengths in the vicinity of 1, 000 nm, such as Ti-sapphire; semiconductor laser, solid laser and fiber laser as used for CD-R, which have their lasing wavelengths in the vicinity of 780nm; semiconductor laser and solid laser as used for DVD-R, which have their lasing wavelengths in the range of 620 to 680 nm; and GaN laser having its lasing wavelength in the vicinity of 405 nm.

In addition, solid SHG laser having their lasing wavelengths in the visible region, such as YAG SHG lasers and semiconductor SHG laser can be preferably used, too.

The laser used in the invention may be pulse oscillation laser or CW (continuous-wave) laser.

When the present two-photon absorption dye-containing materials are applied to three-dimensional optical recording medium, a method of utilizing reflectivity or transmittance differences based on refractive-index modulation or a method of utilizing absorption-index differences is adopted in reproducing information by irradiation with light. The light used herein is preferably laser light, especially the same laser light as used in recording the information, though the power or the pulse shape thereof may be the same or different. In the case of applying the present two-photon absorption dye-containing materials to three-dimensional optical recording medium, therefore, it is preferable that the two-photon absorption dyes have their individual refractive index maxima in the vicinity of the wavelength of laser used for write and reproduction. The refractive index of the film formed of a two-photon absorption dye alone at the wavelength of two-photon absorption is preferably at least 1.8, far preferably at least 2.0, particularly preferably at least 2.2.

Examples of the invention are illustrated below on the basis of experimental results of course, the invention should not be construed as being limited to these examples.

EXAMPLE 1

Syntheses of Present Two-Photon Absorption Dyes (1) Synthesis of D-73:

The two-photon absorption dye D-73 according to the invention can be synthesized in the following manner.

Synthesis Process of D-73

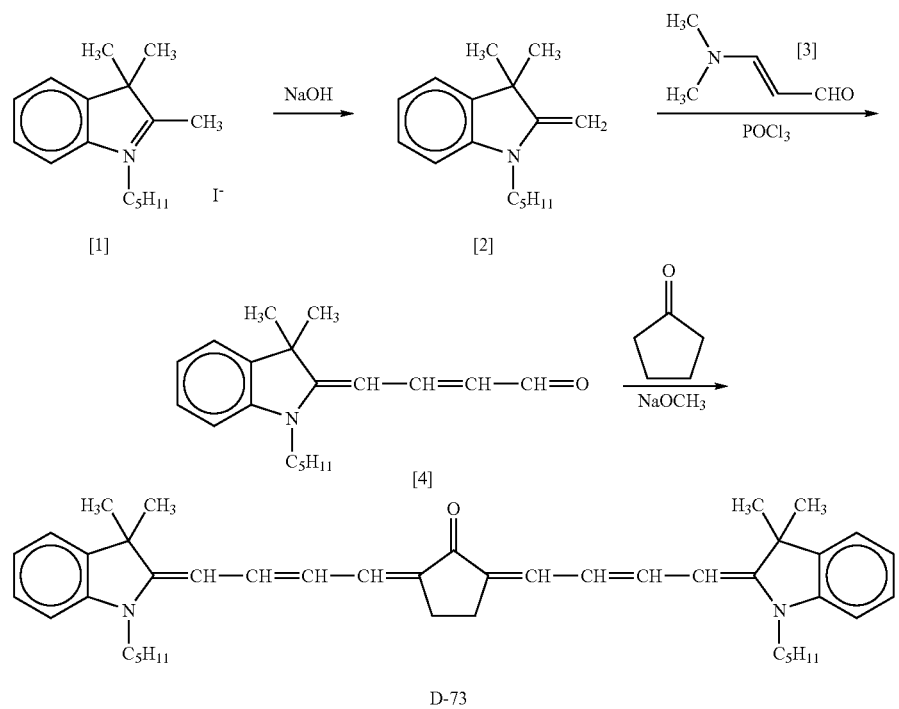

The foregoing quaternary salt [1] in an amount of 14.3 g (40 mmol) was dissolved into 50 ml of water, admixed with 1.6 g (40=mol) of sodium hydroxide, and stirred for 30 minutes at room temperature. The resultant solution was extracted with ethyl acetate for three times, dried with magnesium sulfate, and then concentrated to give 9.2 g of the methylene base [2] shown above, an oily substance, in a 100% yield.

Dimethylaminoacrolein [3] in an amount of 3.97 g (40 mmol) was dissolved into 50 ml of acetonitrile. While cooling the acetonitrile solution of [3] to 0° C., 6.75 g (44 mmol) of phosphorus oxychloride was added dropwise thereto. The resultant mixture was stirred for 10 minutes at 0° C. Successively thereto, an acetonitrile solution containing 9.2 g of the methylene base [2] was further added dropwise, and stirred for 4 hours at 35° C. The reaction mixture obtained was poured into 100 ml of ice-cold water, admixed with 16 g of sodium hydroxide, and then refluxed for 10 minutes. After cooling, the resultant solution was extracted with ethyl acetate for three times, dried with magnesium sulfate, and then concentrated. The concentrate obtained was purified by column chromatography on silica gel (developing solvent:

ethyl acetate/hexane=1/10→⅓) to give 4.4 g of the aldehyde [4] shown above, an oily substance, in a 39% yield.

A mixture of 0.126 g (1.5 mmol) of cyclopentanone and a 0.85 g (3 mmol) portion of the aldehyde [4] was dissolved into 30 ml of dehydrated methanol, and refluxed under an atmosphere of nitrogen in a dark room till the solution became homogeneous. Then, the resultant solution was admixed with 0.63 g (3.6 mmol) of a 28% methanol solution of sodium methoxide, and refluxed again for 6 hours. After cooling, a crystalline precipitate separated out. The precipitate was filtered off, and washed with methanol to give 0.50 g of D-73, a dark green crystal, in a 54% yield. The structural formula of the crystal was ascertained by NMR spectrum and MS spectrum measurements and elemental analysis.

(2) Synthesis of D-84:

The two-photon absorption dye D-84 according to the invention can be synthesized in the following manner.

Synthesis Process of D-84

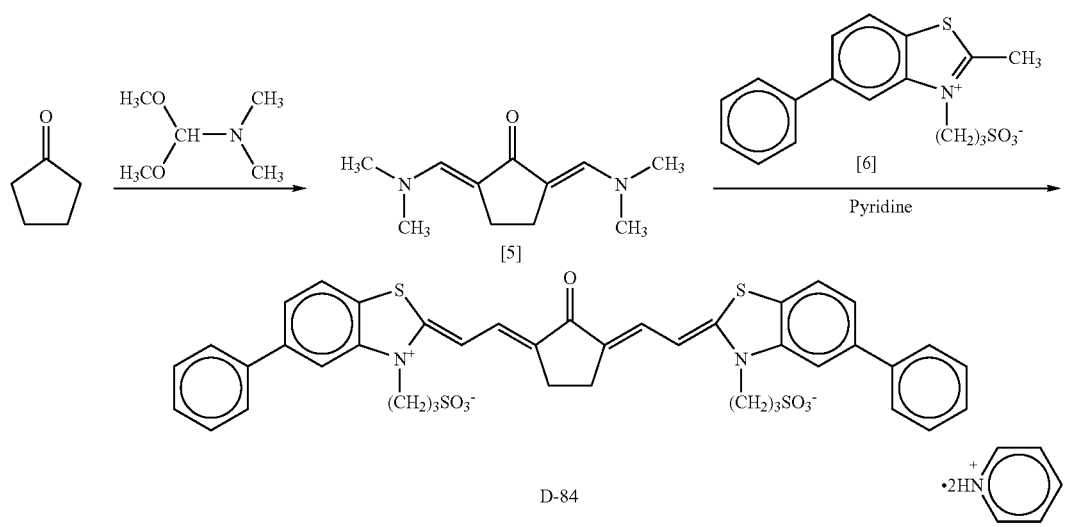

D-84

Cyclopentanone in an amount of 33.6 g (0.4 mol), 2 ml of DBN and 400 g N,N-dimethylforamide dimethylacetatl were refluxed for 5 days. After concentration, the concentrate was admixed with acetone and cooled, thereby depositing a crystalline precipitate. The precipitate was filtered off, and washed with cold acetone to give 32.4 g of [5], a crystalline substance, in a 42% yield.

A 0.78 g (4 mmol) portion of [5], 2.78 g (8 mmol) of the quaternary salt [6] shown above and 20 ml of pyridine were refluxed for 4 hours under an atmosphere of nitrogen in a dark room. After cooling, the resultant solution was admixed with ethyl acetate to deposit a crystalline precipitate. The precipitate was dispersed in methanol, and filtered off to give 2.14 g of the intended D-84, a dark blue crystal, in a 56% yield.

Incidentally, the structural formula of the crystal was ascertained by NMR spectrum and MS spectrum measurements and elemental analysis.

Other two-photon absorption dyes represented by the present formula (1) can also be synthesized in conformance with the synthesis processes of D-73 and D-84 or the methods described in *Tetrahedron Lett.*, vol. 42, p. 6129 (2001).

(3) Synthesis of D-1:

The two-photon absorption dye D-1 according to the invention can be synthesized in the following manner.

Synthesis Process of D-1

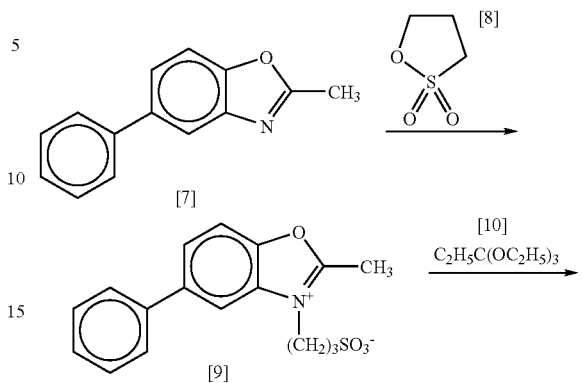

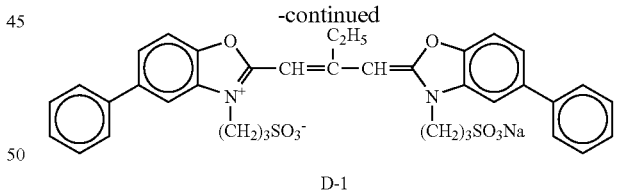

D-1

The foregoing benzoxazole [7] in an amount of 52.25 g (0.2 mol) and 45.75 g (0.375 mol) of propane sultone [8] were stirred for 4 hours under heating at 140° C. After cooling, the reaction mixture was admixed with acetone to deposit a crystalline precipitate. The precipitate was filtered off, and washed with acetone to give 70.42 g of the quaternary salt [9] shown above in an 85% yield.

A 66.2 g portion of the quaternary salt [9], 200 ml of triethyl orthopropionate [10], 200 ml of pyridine and 80 ml of acetic acid were stirred for 1 hour under heating at 120° C. After cooling, a precipitated reaction product was washed three times with ethyl acetate by decantation, and then dissolved in 100 ml of methanol. Thereto, 20 ml of a methanol solution containing 4.0 g of sodium acetate was added with stirring, thereby depositing a crystalline precipitate. The precipitate was filtered off, dispersed into methanol, and further filtered off to give 31.36 g of the intended D-1, a cinnabar red crystal, in a 43.4% yield.

Incidentally, the structural formula of the crystal was ascertained by NMR spectrum and MS spectrum measurements and elemental analysis.

(4) Synthesis of D-42:

The two-photon absorption dye D-42 according to the invention can be synthesized in the following manner.

Synthesis Process of D-42

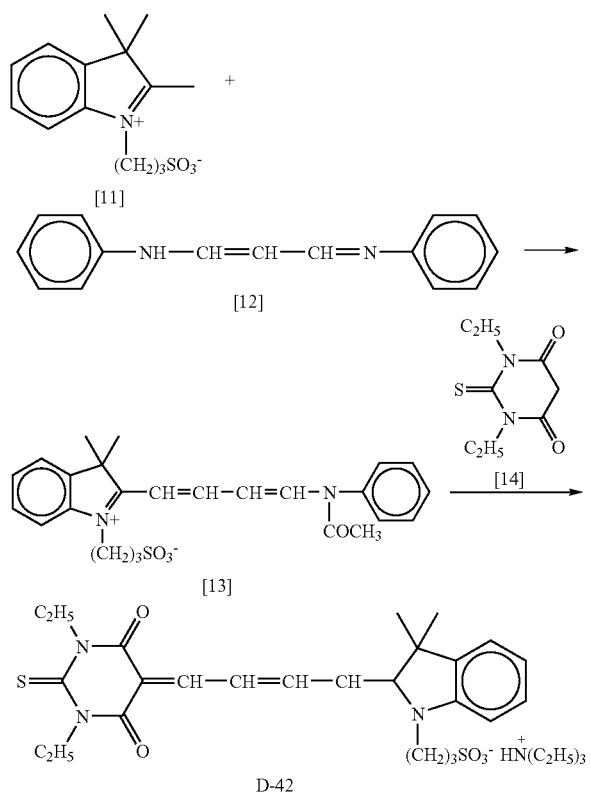

The foregoing quaternary salt [11] in an amount of 2.81 g (10 mmol), 6.67 g (30 mmol) of [12], 10 g of acetic anhydride and 50 ml of acetonitrile were refluxed for 30 minutes. After concentration, the concentrate was washed with ethyl acetate by decantation to give a crude product of the anil body [13] shown above.

To the crude product of the anil body [13], 2.00 g (10 mmol) of thiobarbituric acid [14], 3.0 g (30 mmol) of triethylamine and 100 ml of ethanol were added, and refluxed for 1 hour. After concentration, the concentrate obtained was purified by column chromatography on silica gel (developing solvent: chloroform/methanol=20/1→10/1), and further recrystallized from a methonol/isopropyl alcohol mixture to give 2.55 g of the intended D-42, a crystalline substance, in a 41.3% total yield.

Incidentally, the structural formula of the crystal was ascertained by NMR spectrum and MS spectrum measurements and elemental analysis.

(5) Synthesis of D-56:

The two-photon absorption dye D-56 according to the invention can be synthesized in the following manner.

Synthesis Process of D-56

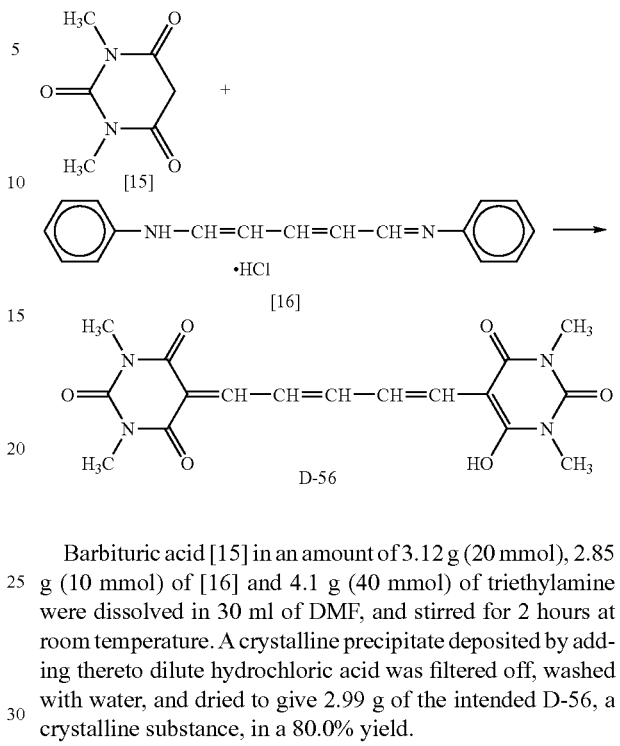

Barbituric acid [15] in an amount of 3.12 g (20 mmol), 2.85 g (10 mmol) of [16] and 4.1 g (40 mmol) of triethylamine were dissolved in 30 ml of DMF, and stirred for 2 hours at room temperature. A crystalline precipitate deposited by adding thereto dilute hydrochloric acid was filtered off, washed with water, and dried to give 2.99 g of the intended D-56, a crystalline substance, in a 80.0% yield.

Incidentally, the structural formula of the crystal was ascertained by NMR spectrum and MS spectrum measurements and elemental analysis.

And other cyanine dyes, merocyanine dyes and oxonol dyes according to the invention can also be synthesized using the methods described, e.g., in F. A. Harmer, *Heterocyclic Compounds —Cyanine Dyes and Related Compounds*, John & Wiley & Sons, New York, London (1964); and D. M. Sturmer, *Heterocyclic Compounds —Special Topics in Heterocyclic Chemistry*, chap. 18, par. 14, pp. 482-515, John & Wiley & Sons, New York, London.

However, the synthesis methods of the present two-photon absorption dyes should not be construed as being limited to the methods as mentioned above.

Many of the present decoloring agent precursors are commercially available, or can be synthesized using known methods.

EXAMPLE 2

Evaluations of Three-Dimensional Refractive-Index Modulation and Absorption-Index Modulation Caused in Two-Photon Absorption Dye-Containing Materials A method of causing three-dimensional refractive-index modulation and absorption-index modulation in the present two-photon absorption dye-containing materials through decoloring of two-photon absorption dyes which occurs under two-photon absorption is illustrated below.

A two-photon absorption polymerizable composition according to the invention, Sample No. 101, and a comparative composition, Comparative Sample No. 1, were prepared according to the following formulae, respectively.

<Sample No. 101: Composition of Present Two-Photon Absorption Dye-Containing Material>

Two-photon absorption dye: D-128 17 parts by mass
Decoloring agent precursor: Diphenyl iodonium hexafluorophosphate 28 parts by mass
Binder: Polymethyl methacrylate (average molecular weight: $1.2 \times 10^5$, produced by Aldrich) 55 parts by mass
Solvent: Chloroform 300 parts by mass <Comparative Sample No.1: Composition of Comparative Material>

Decoloring agent precursor: Diphenyl iodonium hexafluorophosphate 28 parts by mass
Binder: Polymethyl methacrylate (average molecular weight: $1.2 \times 10^5$, produced by Aldrich) 55 parts by mass
Solvent: Chloroform 300 parts by mass Sample No.101 and Comparative Sample No.1 were each bar-coated on a prepared slide glass. After removing the solvent by drying, each coating was surmounted by a prepared slide glass. In this manner, evaluation samples were made. Herein, the coating thickness was about 10 μm.

When a refractive index of the coating of Sample No.101 was measured with an ellipsometer, it was found to be 1.58 at 720 nm. Incidentally, the refractive index of the coating of D-128 alone at 720 nm was 2.24.

In performance evaluation of the present two-photon absorption polymerizable composition, Ti:sapphire pulse laser (pulse width: 100 fs, repetition: 80 MHz, average power: 1 W, peak power: 100 kW) enabling measurements in the wavelength range of 700 nm to 1,000 nm was used for irradiation and focused onto the polymerizable composition through a lens having NA=0.6.

A wavelength at which a $10^{-4}$ M solution of the two-photon absorption dye had the maximum two-photon absorption cross section δ was adopted as the wavelength of laser light used for irradiation.

Two-photon absorption was induced in Sample No.101 by irradiation with 720-nm laser light. As a result, it was ascertained that the two-photon absorption dye in Sample No.101 was decolored at the focas region of the laser used for irradiation. By measurement with the ellipsometer, the refractive index in the decolored region was found to be 1.49, which was substantially low in comparison with the refractive index in the two-photon absorption dye remaining region. Further, it was confirmed that there were reflectivity differences between the recorded regions, wherein the two-photon absorption dye was decolored, and the unrecorded regions under irradiation with 720 nm laser light. In addition, absorption-index variations between the recorded and unrecorded regions were also confirmed by visual observation.

On the other hand, the irradiation with 720-n laser light caused no changes in Comparative Sample No. 1, wherein the present two-photon absorption dye D-128 was not contained. Therefore, it was apparent that the decoloring occurred in the two-photon absorption dye via the excited state induced by two-photon absorption.

Further, it was confirmed that decoloring of the present composition at arbitrary positions in three dimensions became possible by scanning the composition with laser light while moving the focus position of the laser light in the horizontal and depth directions, thereby effecting three-dimensional refractive-index and absorption-index modulations.

In addition, it was ascertained that decoloring was caused in the same way as mentioned above even when the two-photon absorption dye D-128 was replaced with any of D-1, D-5, D-22, D-41, D-42, D-56, D-58, D-73, D-75, D-77, D-84, D-117, D-118, D-123, D-132, D-142 and D-143, and/or the decoloring agent precursor was replaced with any of Irgacure 651, o-Cl-HABI, 2-(4'-methoxyphenyl)-4,6-bis(tri-chloromethyl)-1,3,5-triazi ne, 4-diethylaminophenyldiazonium tetrafluoroborate, di(t-butylphenyl)iodonium tetra(penta-fluorophenyl)borate, tris(4-methylphenyl)sulfonium tetra (pentafluorophenyl)borate, triphenylsulfonium methanesulfonate, triphenylsulfonium perfluoropentanoate, bis(1-(4-dipenylsulfonium)phenyl)sulfide ditriflate, I-2, I-4, I-6, I-12, I-13, I-18, I-19, I-22, benzoin tosylate, 2,6-dinitrobenzyl tosylate, N-tosylphthalimide, PB-3, PB-23, PB-33, and/or the binder was replaced with any of copolymer of butyl methacrylate and isobutyl methacrylate, copolymer of methyl methacrylate and ethyl acrylate, polyvinyl acetate, cellulose acetate butyrate, polystyrene and polycarbonate.

The present application claims foreign priority based on Japanese Patent Application Nos. JP2003-276684 and JP2004-199005, filed July 18 of 2003 and July 6 of 2004, respectively the contents of which is incorporated herein by reference.

What is claimed is:

1. A two-photon absorption dye-containing material, comprising at least a two-photon absorption dye capable of decoloring itself through two-photon absorption and a decoloring agent precursor, wherein the two-photon absorption dye is a cyanine dye, a merocyanine dye, an oxonol dye, a phthalocyanine dye or a compound represented by the following formula (1):

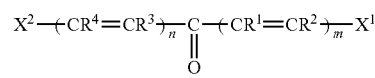

wherein $R^1$, $R^2$, $R^3$ and $R^4$ each represents a hydrogen atom or a substituent independently, or some of $R^1$, $R^2$, $R^3$ and $R^4$ combine to form a ring; n and m each independently represents an integer of 0 to 4, provided that at least one of m and n is not zero, and when m is 2 or more, $R^3$s and $R^4$s are independently the same or different, and when n is 2 or more, $R^1$s and $R^2$s are independently the same or different; and $X^1$ and $X^2$ each independently represents an aryl group, a heterocyclic group or a group represented by the following formula (2):

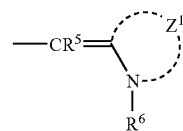

wherein $R^5$ represents a hydrogen atom or a substituent, $R^6$ represents a hydrogen atom, an alkyl group, an alkenyl group, an aryl group or a heterocyclic group, and $Z^1$ represents atoms forming a 5- or 6-membered ring.

2. A two-photon absorption dye-containing material according to claim 1, wherein the decoloring agent precursor is at least one selected from the group consisting of a radical generator, an acid generator, a base generator, a nucleophilic agent generator, an electrophilic agent generator and a triplet-state oxygen.

3. A two-photon absorption dye-containing material according to claim 1, wherein the decoloring agent precursor is at least one selected the group consisting of (1) a radical generator containing a ketone, (2) a radical generator containing an organic peroxide, (3) a radical generator containing a bisimidazole, (4) a radical-and-acid generator containing a trihalomethyl-substituted triazine, (5) a radical-and-acid generator containing a diazonium salt, (6) a radical-and-acid generator containing a diaryliodonium salt, (7) a radical-and-acid generator containing a sulfonium salt, (8) a radical generator containing a borate, (9) a radical generator containing a diaryliodonium-organoboron complex, (10) a radical generator containing a sulfonium-organoboron complex, (11) a radical generator containing a organoboron complex which is a cationic two-photon absorption dye, (12) a radical generator containing an onium salt complex which is an anionic two-photon absorption dye, (13) a radical-and-acid generator containing a metal-arene complex and (14) an acid generator containing a sulfonate.

4. A two-photon absorption dye-containing material according to claim 1, wherein the decoloring agent precursor is a compound represented by the following formula (21-1), (21-2), (21-3) or (21-4):

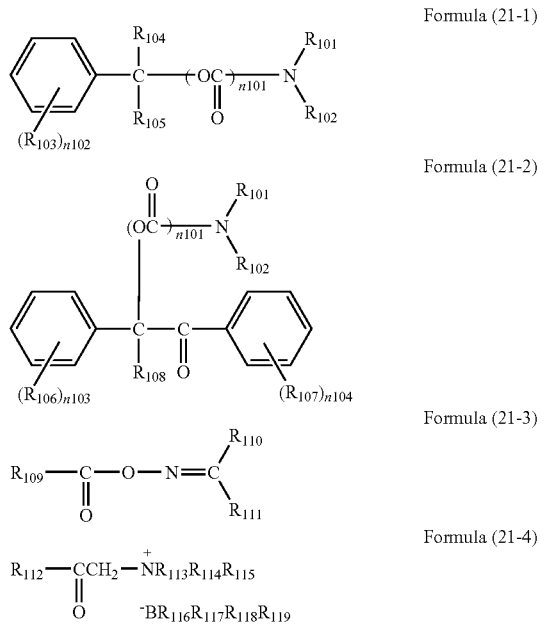

wherein $R_{101}$, $R_{102}$, $R_{113}$, $R_{114}$ and $R_{115}$ each independently represents a hydrogen atom, an alkyl group, an alkenyl group, a cycloalkyl group, an aryl group or a heterocyclic group, or $R_{101}$ and $R_{102}$ combine to form a ring, or $R_{113}$, $R_{114}$ and $R_{115}$ combine to form a ring; $R_{103}$, $R_{106}$, $R_{107}$ and $R_{109}$ each independently represents a substituent; $R_{104}$, $R_{105}$, $R_{108}$, $R_{110}$ and $R_{111}$ each independently represents a hydrogen atom or a substituent, or $R_{110}$ and $R_{111}$ combine to form a ring; $R_{116}$, $R_{117}$, $R_{118}$ and $R_{119}$ each independently represents an alkyl group or an aryl group; $R_{112}$ represents an aryl group or a heterocyclic group; n101 represents 0 or 1; and n102, n103 and n104 each independently represents an integer of 0 to 5.

5. A two-photon absorption dye-containing material according to claim 1, which is for a three-dimensional refractive index modulation material.

6. A two-photon absorption dye-containing material according to claim 1, which is for a three-dimensional absorption index modulation material.

7. A two-photon absorption dye-containing material according to claim 1, which is for a three-dimensional optical recording material.

8. A method for three-dimensional refractive index modulation, comprising decoloring a two-photon absorption dye capable of decoloring itself through two-photon absorption,
wherein the two-photon absorption is caused by irradiating the dye with a laser light, and the laser light has a wavelength free of linear absorption for the dye and a longer wavelength than a linear absorption band of the dye,
and wherein the two-photon absorption dye is a cyanine dye, a merocyanine dye, an oxonol dye, a phthalocyanine dye or a compound represented by the following formula (1):

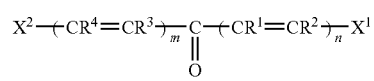

wherein $R^1$, $R^2$, $R^3$ and $R^4$ each represents a hydrogen atom or a substituent independently, or some of $R^1$, $R^2$, $R^3$ and $R^4$ combine to form a ring; n and m each independently represents an integer of 0 to 4, provided that at least one of m and n is not zero, and when m is 2 or more, $R^3$s and $R^4$s are independently the same or different, and when n is 2 or more, $R^1$s and $R^2$s are independently the same or different; and $X^1$ and $X^2$ each independently represents an aryl group, a heterocyclic group or a group represented by the following formula (2):

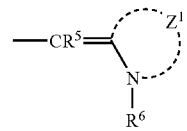

wherein $R^5$ represents a hydrogen atom or a substituent, $R^6$ represents a hydrogen atom, an alkyl group, an alkenyl group, an aryl group or a heterocyclic group, and $Z^1$ represents atoms forming a 5- or 6-membered ring.

9. A three-dimensional optical recording method, comprising decoloring a two-photon absorption dye capable of decoloring itself through two-photon absorption,
wherein the two-photon absorption is caused in a region where a laser light is focused, and the laser light has a wavelength free of linear absorption for the dye and a longer wavelength than a linear absorption band of the dye, so as to make a difference in a refractive or absorption index between the region and a region where the laser light is not focused,
and wherein the two-photon absorption dye is a cyanine dye, a merocyanine dye, an oxonol dye, a phthalocyanine dye or a compound represented by the following formula (1):

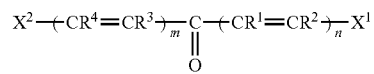

wherein $R^1$, $R^2$, $R^3$ and $R^4$ each represents a hydrogen atom or a substituent independently, or some of $R^1$, $R^2$, $R^3$ and $R^4$ combine to form a ring; n and m each independently represents an integer of 0 to 4, provided that at least one of m and n is not zero, and when m is 2 or more, $R^3$s and $R^4$s are independently the same or different, and when n is 2 or more, $R^1$s and $R^2$s are independently the same or different; and $X^1$ and $X^2$ each independently represents an aryl group, a heterocyclic group or a group represented by the following formula (2):

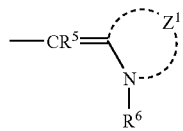

wherein $R^5$ represents a hydrogen atom or a substituent, $R^6$ represents a hydrogen atom, an alkyl group, an alkenyl group, an aryl group or a heterocyclic group, and $Z^1$ represents atoms forming a 5- or 6-membered ring.

10. A three-dimensional optical reproducing method, comprising:
  irradiating a two-photon absorption dye-containing material with a light, wherein the two-photon absorption dye-containing material has a recorded region where a two-photon absorption dye is decolored through two-photon absorption and an unrecorded region where a two-photon absorption dye is not decolored; and
  detecting a difference in a reflectivity, a transmittance or an absorption index between the recorded region and the unrecorded region,
  and wherein the two-photon absorption dye is a cyanine dye, a merocyanine dye, an oxonol dye, a phihalocyanine dye or a compound represented by the following formula (1):

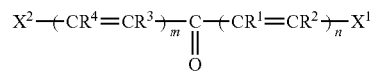

wherein $R^1, R^2, R^3$ and $R^4$ each represents a hydrogen atom or a substituent independently, or some of $R^1, R^2, R^3$ and $R^4$ combine to form a ring; n and m each independently represents an integer of 0 to 4, provided that at least one of m and n is not zero, and when m is 2 or more, $R^3$s and $R^4$s are independently the same or different, and when n is 2 or more, $R^1$s and $R^2$s are independently the same or different; and $X^1$ and $X^2$ each independently represents an aryl group, a heterocyclic group or a group represented by the following formula (2):

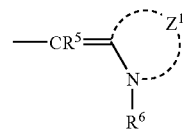

wherein $R^5$ represents a hydrogen atom or a substituent, $R^6$ represents a hydrogen atom, an alkyl group, an alkenyl group, an aryl group or a heterocyclic group, and $Z^1$ represents atoms forming a 5- or 6-membered ring.

* * * * *